(12) United States Patent
Ikeda

(10) Patent No.: US 11,429,200 B2
(45) Date of Patent: Aug. 30, 2022

(54) GLASSES-TYPE TERMINAL

(71) Applicant: Hiroyuki Ikeda, Tokyo (JP)

(72) Inventor: Hiroyuki Ikeda, Tokyo (JP)

( * ) Notice: Subject to any disclaimer, the term of this patent is extended or adjusted under 35 U.S.C. 154(b) by 0 days.

(21) Appl. No.: 17/450,599

(22) Filed: Oct. 12, 2021

(65) Prior Publication Data
US 2022/0113813 A1 Apr. 14, 2022

(30) Foreign Application Priority Data

Oct. 13, 2020 (JP) .............................. JP2020-172691
Apr. 21, 2021 (JP) .............................. JP2021-072057
Jul. 16, 2021 (JP) .............................. JP2021-118164

(51) Int. Cl.
*G06F 3/03* (2006.01)
*G06V 40/18* (2022.01)
(Continued)

(52) U.S. Cl.
CPC ....... *G06F 3/0304* (2013.01); *G02B 27/0093* (2013.01); *G02B 27/0103* (2013.01);
(Continued)

(58) Field of Classification Search
CPC ...... G06F 3/0304; G06F 3/013; G06F 3/0488; G06F 2203/04803; G06F 2203/04808;
(Continued)

(56) References Cited

U.S. PATENT DOCUMENTS 9,030,425 B2 * 5/2015 Stafford ................ G06F 3/0488
345/173
9,245,389 B2 1/2016 Sako et al.
(Continued)

FOREIGN PATENT DOCUMENTS

JP 7-5978 A 1/1995
JP 7-110735 A 4/1995
(Continued)

OTHER PUBLICATIONS

Extended European Search Report issued in European Application No. 21201733.9 dated Feb. 28, 2022 (six (6) pages).
(Continued)

*Primary Examiner* — Dmitriy Bolotin
(74) *Attorney, Agent, or Firm* — Crowell & Moring LLP

(57) ABSTRACT

When an image capturing apparatus captures an image of an original screen and a finger reflected on an eye of a user, an operation determination unit determines the content of an operation performed with the finger based on image data of the captured image. An operation position identification unit generates data representing a position of the finger on the original screen based on the image data of the captured image. An input control unit recognizes a content of an input instruction corresponding to the operation performed with the finger, based on data on the content of the operation obtained by the operation determination unit, data on the position generated by the operation position identification unit, and data on the original screen stored in a storage unit, and controls the original screen to be displayed on a display apparatus according to the recognized content of the input instruction.

24 Claims, 45 Drawing Sheets

(51) Int. Cl.
  *G02B 27/00* (2006.01)
  *G02B 27/01* (2006.01)
  *G06F 3/01* (2006.01)
  *G06F 3/0488* (2022.01)
  *G06T 19/00* (2011.01)
(52) U.S. Cl.
  CPC ......... *G02B 27/0172* (2013.01); *G06F 3/013* (2013.01); *G06F 3/0488* (2013.01); *G06T 19/006* (2013.01); *G06V 40/193* (2022.01); *G02B 2027/0105* (2013.01); *G02B 2027/0138* (2013.01); *G02B 2027/0174* (2013.01); *G02B 2027/0178* (2013.01)
(58) Field of Classification Search
  CPC ...... G06F 1/1626; G06F 1/163; G06F 1/1643; G06F 1/1686; G06F 1/169; G06F 1/1698; G06F 3/0482; G06F 3/04842; G06F 3/04883; G06F 3/04886; G06F 3/011; G02B 27/0093; G02B 27/0103; G02B 27/0172; G02B 2027/0105; G02B 2027/0138; G02B 2027/0174; G02B 2027/0178; G02B 2027/014; G02B 2027/0187; G06T 19/006; G06V 40/193; H04M 1/724097
  See application file for complete search history.

(56) References Cited

U.S. PATENT DOCUMENTS

| | | | |
|---|---|---|---|
| 2009/0267921 A1 | 10/2009 | Pryor | |
| 2010/0156787 A1 | 6/2010 | Katayama | |
| 2011/0012874 A1 | 1/2011 | Kurozuka | |
| 2011/0221656 A1 | 9/2011 | Haddick et al. | |
| 2014/0115520 A1 | 4/2014 | Itani | |
| 2014/0160129 A1 | 6/2014 | Sako et al. | |
| 2014/0266988 A1* | 9/2014 | Fisher | G02B 27/017 345/8 |
| 2015/0002676 A1* | 1/2015 | Yoo | G02B 27/017 348/159 |
| 2015/0009103 A1 | 1/2015 | Ito et al. | |
| 2015/0128251 A1 | 5/2015 | Yoon et al. | |
| 2015/0146925 A1* | 5/2015 | Son | G06V 20/00 382/103 |
| 2016/0025983 A1 | 1/2016 | Ikeda | |
| 2016/0140768 A1 | 5/2016 | Sako et al. | |
| 2018/0032131 A1 | 2/2018 | Yasuda et al. | |
| 2018/0217672 A1 | 8/2018 | Ito | |
| 2019/0107724 A1 | 4/2019 | Ikeda | |
| 2019/0121522 A1* | 4/2019 | Davis | H04N 9/3147 |
| 2019/0146222 A1 | 5/2019 | Hiroi | |
| 2020/0410755 A1 | 12/2020 | Nakata | |
| 2022/0100270 A1* | 3/2022 | Pastrana Vicente | G06F 3/04842 |
| 2022/0101612 A1* | 3/2022 | Palangie | G06T 19/003 |
| 2022/0121344 A1* | 4/2022 | Pastrana Vicente | G06F 3/04815 |
| 2022/0121884 A1* | 4/2022 | Zadeh | G06F 16/953 |
| 2022/0174276 A1* | 6/2022 | Ikeda | H04N 19/159 |

FOREIGN PATENT DOCUMENTS

| | | |
|---|---|---|
| JP | 8-160340 A | 6/1996 |
| JP | 11-98227 A | 4/1999 |
| JP | 2008-9490 A | 1/2008 |
| JP | 2009-251154 A | 10/2009 |
| JP | 2010-145860 A | 7/2010 |
| JP | 2013-114375 A | 6/2013 |
| JP | 2013-190926 A | 9/2013 |
| JP | 2013-206412 A | 10/2013 |
| JP | 2014-48775 A | 3/2014 |
| JP | 2014-56462 A | 3/2014 |
| JP | 2014-115457 A | 6/2014 |
| JP | 2016-31761 A | 3/2016 |
| JP | 2019-82891 A | 5/2019 |
| JP | 2019-121191 A | 7/2019 |
| JP | 2021-5157 A | 1/2021 |
| WO | WO 2009/101960 A1 | 8/2009 |
| WO | WO 2009/133698 A1 | 11/2009 |
| WO | WO 2013/009482 A2 | 1/2013 |
| WO | WO 2016/139850 A1 | 9/2016 |
| WO | WO 2017/018388 A1 | 2/2017 |

OTHER PUBLICATIONS

Japanese-language Office Action issued in Japanese Application No. 2021-118164 dated Nov. 22, 2021 with English translation (four (4) pages).

* cited by examiner

FIG. 36
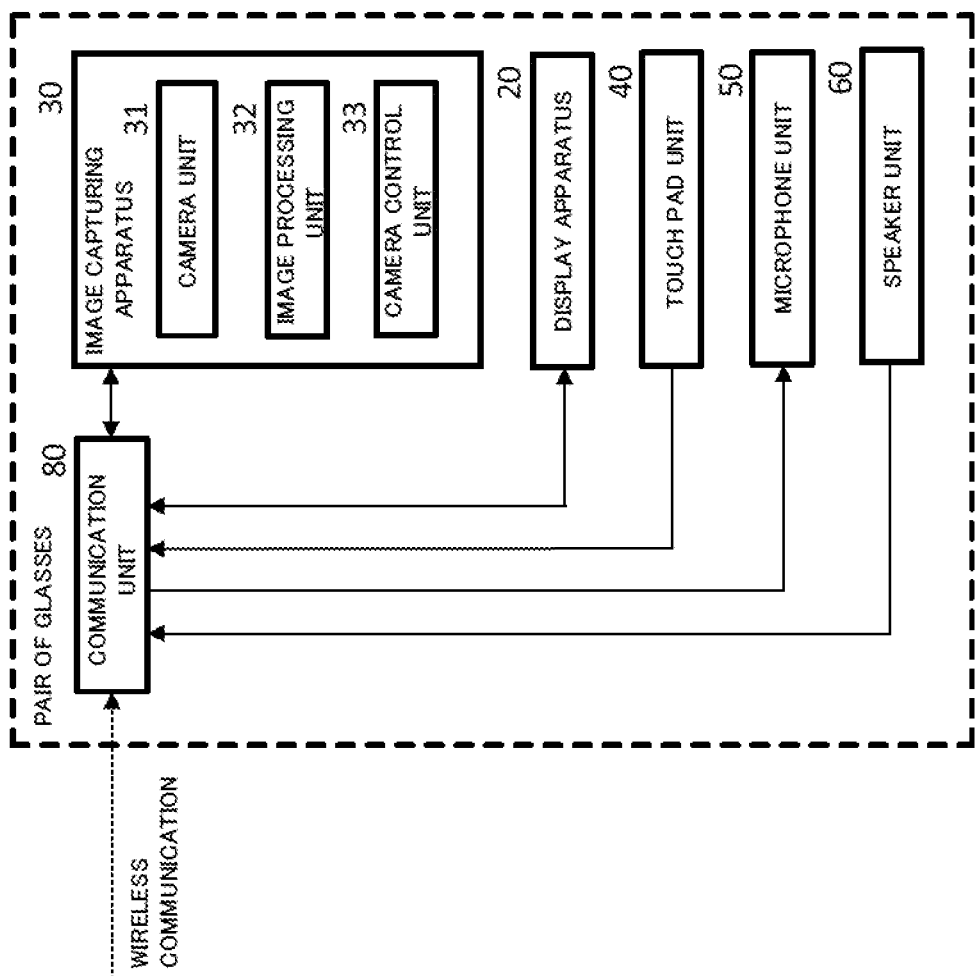
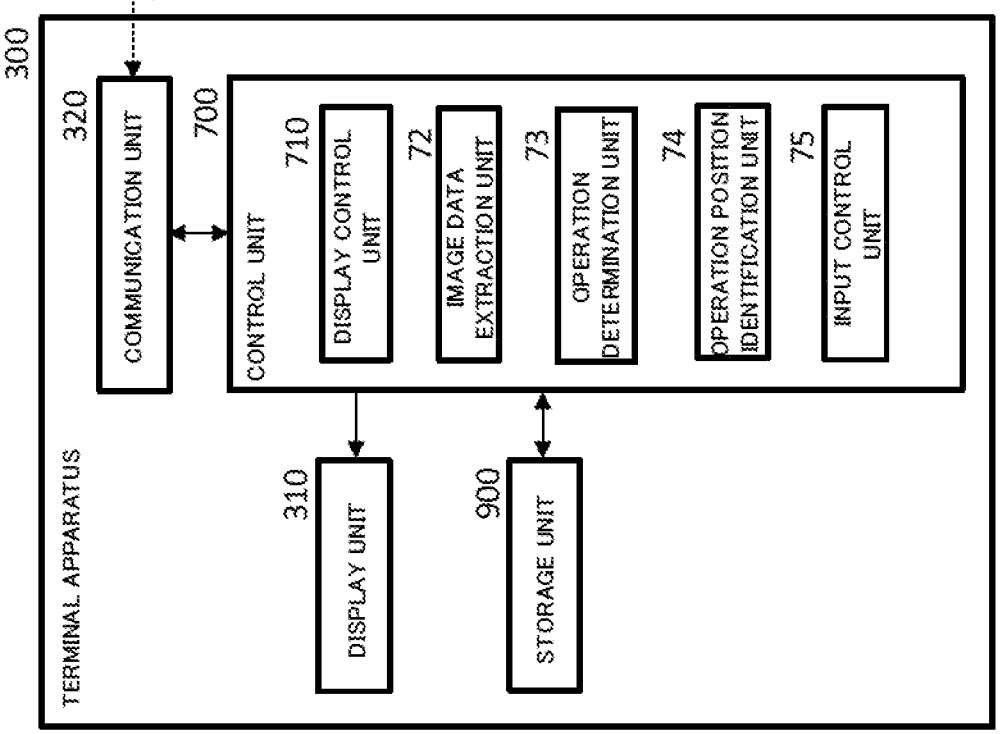

FIG. 44
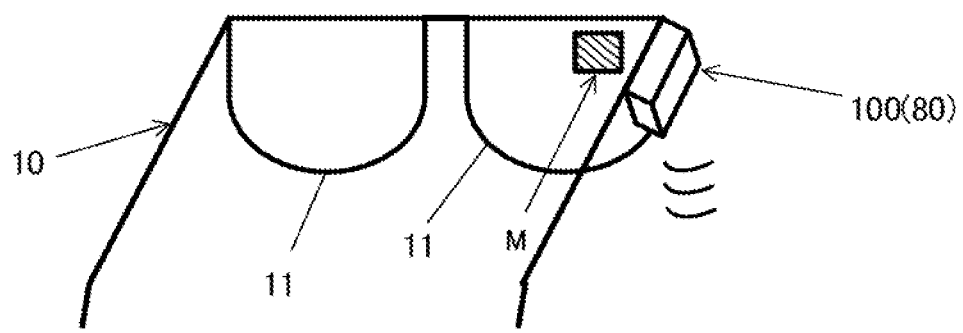
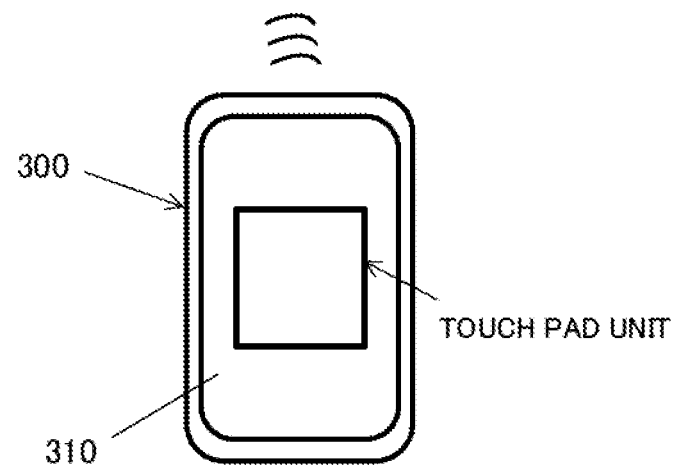

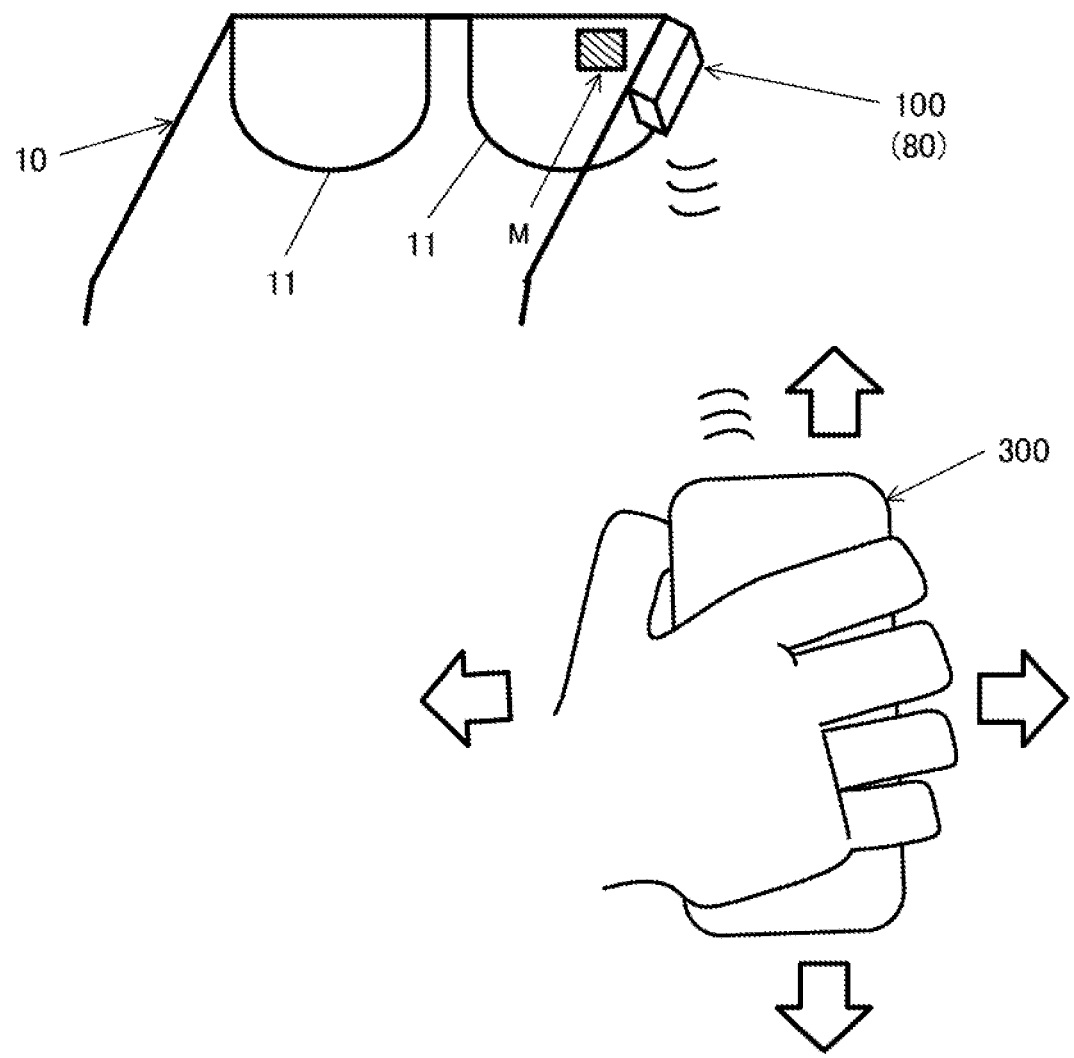

GLASSES-TYPE TERMINAL

BACKGROUND OF THE INVENTION

Field of the Invention

The present invention relates to a wearable glasses-type terminal.

Description of the Related Art

In recent years, wearable terminals, for example, glasses-type terminals such as Google Glass from Google Inc. have been developed and marketed (see, for example, Patent Literature 1). In this Google Glass, a very small display using a prism is located in front of the right eye glass of the main body of the pair of glasses. Google Glass allows users to see the screen displayed on this display together with the actual surrounding scenery at the same time. The user with wearing this glasses-type terminal, while walking, for example, on the street, can see information, for example, a map of the vicinity, displayed on a screen which appears to be floating in the field of view of the right eye of the user. Further, an advertisement of, for example, a store, a restaurant, or the like in the vicinity of the user can be displayed on the screen to the user. The use of this glasses-type terminal will bring the start of a new digital life.

RELATED ART DOCUMENTS

Patent Literature

Patent Literature 1: Japanese Unexamined Patent Application Publication No. H11-98227

SUMMARY OF THE INVENTION

Problems to be Solved by the Invention

Incidentally, with the glasses-type terminals currently being developed and marketed, the user of the glasses-type terminal operates the screen displayed such as by issuing a voice instruction or tapping a touch pad provided at the base of a temple of the pair of glasses. However, when the users perform, for example, voice operations to input characters on the screen (visual (virtual) confirmation screen) appearing to the users to be floating in the field of view, all the users do not always successfully input the characters because there are many homonyms in words and there are individual differences in pronunciation. Further, voice operations may fail to cause the glasses-type terminal to correctly recognize the content of the voice due to external noise or the like. In addition, the touch pad provided on the temple of the pair of glasses is not large enough to input characters. For such reasons, the conventional glasses-type terminals have a problem that it is difficult to input characters for, for example, an e-mail, by using a screen displayed in the field of view.

The present invention has been made in view of the foregoing, and an object of the present invention is to provide a glasses-type terminal capable of easily and accurately performing operations such as character input on a screen displayed in a field of view.

Means of Solving the Problems

To achieve the object described above, a glasses-type terminal according to the present invention includes a main body worn by a user in a same manner as a pair of glasses; and a display apparatus mounted on the main body and configured to display an original screen corresponding to a visual (virtual) confirmation screen appearing to the user to be floating in midair. The glasses-type terminal is used by the user who wears the main body to perform various types of operations on the visual confirmation screen. The glasses-type terminal further includes: a storage unit configured to store various types of data including data on the original screen; an image capturing apparatus mounted on the main body and configured to capture an image of an eye of the user to acquire an image of the original screen and a finger of the user or a specific input pointer reflected on the eye of the user when performing an operation on the visual confirmation screen with the finger or the input pointer; an operation determination unit configured such that when the image capturing apparatus captures the image of the original screen and the finger or the input pointer reflected on the eye of the user, the operation determination unit determines what content of the operation is performed with the finger or the input pointer among various types of operations, based on a series of image data of images thus captured; an operation position identification unit configured such that when the image capturing apparatus captures the image of the original screen and the finger or the input pointer reflected on the eye of the user, the operation position identification unit identifies a position on the original screen where the operation is performed with the finger or the input pointer, based on a series of image data of images thus captured; and an input control unit configured such that when the user performs the operation on the visual confirmation screen with the finger or the input pointer, the input control unit recognizes a content of an input instruction corresponding to the operation performed on the visual confirmation screen with the finger or the input pointer, based on data on the content of the operation performed with the finger or the input pointer, obtained by the operation determination unit, data on the position on the original screen where the operation is performed with the finger or the input pointer, obtained by the operation position identification unit, and the data on the original screen stored in the storage unit, and controls the original screen to be displayed on the display apparatus according to the recognized content of the input instruction.

In this way, an image capturing apparatus of the glasses-type terminal according to the present invention is mounted on a main body and is configured to capture an image of an eye of the user to acquire an image of the original screen and a finger of the user or a specific input pointer reflected on the eye of the user when performing an operation on the visual confirmation screen with the finger or the input pointer. An operation determination unit of the glasses-type terminal is configured such that when the image capturing apparatus captures the image of the original screen and the finger or the input pointer reflected on the eye of the user, the operation determination unit determines what content of the operation is performed with the finger or the input pointer among the various types of operations, based on a series of image data of images thus captured. An operation position identification unit of the glasses-type terminal is configured such that when the image capturing apparatus captures the image of the original screen and the finger or the input pointer reflected on the eye of the user, the operation position identification unit identifies a position on the original screen where the operation is performed with the finger or the input pointer, based on a series of image data of images thus captured. In addition, an input control unit of the glasses-type terminal is configured such that when the user performs the operation on the visual confirmation screen with the finger or the input pointer, the input control unit recognizes a content of an input instruction corresponding to the operation performed on the visual confirmation screen with the finger or the input pointer, based on data on the content of the operation performed with the finger or the input pointer, obtained by the operation determination unit, data on the position on the original screen where the operation is performed with the finger or the input pointer, obtained by the operation position identification unit, and the data on the original screen stored in the storage unit, and controls the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the glasses-type terminal according to the present invention makes it possible for the user to easily and accurately perform character input operations and various screen operations such as enlargement and reduction by operating the visual confirmation screen in the same manner as in typical smartphone terminals or tablet terminals.

The operation position identification unit may be configured such that when the image capturing apparatus captures the image of the original screen and the finger or the input pointer reflected on the eye of the user, the operation position identification unit obtains a range of the original screen within an image capture range capturable by the image capturing apparatus and a position of the finger or the input pointer within the image capture range, based on a series of image data of images thus captured, and identifies the position on the original screen where the operation is performed with the finger or the input pointer, based on the obtained range of the original screen within the image capture range and the obtained position of the finger or the input pointer within the image capture range.

Further, in the glasses-type terminal according to the present invention, the image capturing apparatus may be configured to focus on the eye of the user in advance, or the image capturing apparatus may include an autofocus control unit configured to automatically focus on the eye of the user. In either case, the image capturing apparatus can capture an image of the original screen and the finger or the input pointer reflected on the eye of the user in a focused state.

The glasses-type terminal according to the present invention preferably further includes an image data extraction unit configured to extract image data including an image of the finger or the input pointer from the series of image data captured by the image capturing apparatus. The operation determination unit is preferably configured to determine what content of the operation is performed with the finger or the input pointer among the various types of operations, based on a series of the image data extracted by the image data extraction unit. The operation position identification unit is preferably configured to identify the position on the original screen where the operation is performed with the finger or the input pointer, based on the series of the image data extracted by the image data extraction unit. As a result, the series of the image data extracted by the image data extraction unit includes only the image data including the image of the finger or the input pointer, so that the operation determination unit and the operation position identification unit can each perform the corresponding processing efficiently.

With this configuration, the glasses-type terminal according to the present invention may further include an iris and pupil image data generation unit configured such that when the image capturing apparatus captures an image of the eye of the user before the display apparatus displays the original screen, the iris and pupil image data generation unit generates image data of an iris and pupil based on image data of the captured image and stores the generated image data in the storage unit; and an image difference extraction unit configured such that when the image capturing apparatus captures the image of the original screen and the finger or the input pointer reflected on the eye of the user, the image difference extraction unit performs a process of extracting a difference between image data of the captured image and the image data of the iris and pupil stored in the storage unit to generate image data in which an image of the iris and pupil is removed. The image data extraction unit may be configured to perform a process of extracting the image data by using a series of the image data generated by the image difference extraction unit. As a result, the image data generated by the image difference extraction unit include no image of the iris and the pupil, so that the image data extraction unit can easily perform the process of extracting the image data including the image of the finger or the input pointer.

In particular, in the case where the user wears a contact lens, the image difference extraction unit is preferably configured to generate image data in which the image of the contact lens is removed as well as the image of the iris and the pupil. Specifically, the glasses-type terminal according to the present invention may further include an iris and pupil image data generation unit configured such that when the image capturing apparatus captures an image of the eye of the user who wears a contact lens before the display apparatus displays the original screen, the iris and pupil image data generation unit generates image data of the contact lens, iris, and pupil based on image data of the captured image and stores the generated image data in the storage unit; and an image difference extraction unit configured such that when the image capturing apparatus captures the image of the original screen and the finger or the input pointer reflected on the eye of the user, the image difference extraction unit performs a process of extracting a difference between image data of the captured image and the image data of the contact lens, iris, and pupil stored in the storage unit to generate image data in which an image of the contact lens, iris, and pupil is removed. The image data extraction unit may be configured to perform a process of extracting the image data by using a series of the image data generated by the image difference extraction unit. As a result, the image data generated by the image difference extraction unit include no image of the contact lens, the iris, and the pupil, so that the image data extraction unit can easily perform the process of extracting the image data including the image of the finger or the input pointer.

The glasses-type terminal according to the present invention may preferably further include an image conversion unit configured to perform image conversion on the image data of the images captured by the image capturing apparatus such that the image of the original screen and the finger or the input pointer reflected on the eye of the user having a spherical shape in nature becomes an image imaged on a plane. The image data extraction unit is preferably configured to use a series of image data subjected to the image conversion by the image conversion unit to perform a process of extracting the image data. As a result, the series of image data extracted by the image data extraction unit has been subjected to distortion correction, so that the operation position identification unit can accurately identify the position on the original screen where the operation is performed with the finger or the input pointer.

The glasses-type terminal according to the present invention preferably further includes an eye presence/absence determination unit configured to determine whether or not the image data of the image captured by the image capturing apparatus includes an image of the eye of the user to detect that image data not including the image of the eye of the user has been continuously acquired by the image capturing apparatus for a certain period of time; and a notification control unit configured such that when the eye presence/absence determination unit detects that image data not including the image of the eye of the user has been continuously acquired by the image capturing apparatus for the certain period of time, the notification control unit controls a notification device to output sound or vibration from the notification device. As a result, for example, in a case where a driver of an automobile wears the glasses-type terminal according to the present invention, when the eye presence/absence determination unit detects that image data not including an image of an eye of the driver has been continuously acquired by the image capturing apparatus for the certain period of time, the notification control unit determines that the driver is sleeping and accordingly causes the notification device to output an alarm or vibration, so that it is possible to prevent dozing driving.

In the glasses-type terminal according to the present invention, the original screen displayed on the display apparatus may include a screen corresponding to an operation unit for a remote controller for a remotely controllable device. Then the glasses-type terminal may further include a remote control unit configured to cause the display apparatus to display a screen corresponding to the operation unit for the remote controller as the original screen, generate, when an operation is performed on the visual confirmation screen corresponding to the original screen, an instruction signal indicating a content of the operation, and wirelessly transmit the generated instruction signal to the remotely controllable device.

In the glasses-type terminal according to the present invention, the display apparatus may be a transmissive or transparent display device, and the display device may be located in front of a face of the user and within a range of a field of view of the user.

In the glasses-type terminal according to the present invention, the display apparatus may include a projector including a display device, an optical system, and a projected unit onto which the original screen displayed on the display device is projected via the optical system. Examples of the projected unit may use a translucent screen, a transmissive screen, a hologram sheet, a hologram film, a hologram optical element, or a half mirror.

In the glasses-type terminal according to the present invention, the display apparatus may include a projector including a display device, an optical system, and a projected unit onto which the original screen displayed on the display device is projected via the optical system. Examples of the optical system may use a prism, a light guide plate, or a waveguide.

In the glasses-type terminal according to the present invention, a pair of glasses is typically used as the main body, but the main body is not limited to a pair of glasses and may be a face shield. The main body may be worn on any site of a head of the user other than ears of the user, instead of being worn over the ears of the user in the same manner as a pair of glasses.

The glasses-type terminal according to the present invention may further include a terminal apparatus that is separate from the main body and is equipped with a display unit, and the terminal apparatus may be connected to the display apparatus by wireless or wire, and have a function of controlling the display apparatus such that a screen displayed on the display unit is displayed on the display apparatus as the original screen. With such a configuration in which the main body and the terminal apparatus are separate from each other, an existing mobile terminal such as a smartphone or a tablet terminal can be used as the terminal apparatus. Such a use of an existing mobile terminal or the like as the terminal apparatus makes it possible to reduce the number of parts of the main body, resulting in a simplified main body. In addition, the use of a commercially available smartphone or the like as the terminal apparatus makes it possible to perform the operation using such a smartphone or the like that is familiar to the user, so that the operability can be improved.

The terminal apparatus may include a position detection unit configured to detect a touch position where a touch operation is performed on the screen of the display unit and output touch position information indicating the detected touch position to the input control unit. The storage unit may store data on an image of a touch pad to be displayed on the display unit. The input control unit may be configured such that when the original screen is displayed on the display apparatus and the image of the touch pad is displayed on the display unit, in response to the user performing a touch operation on the image of the touch pad, the input control unit recognizes a content of the touch operation based on the touch position information transmitted from the position detection unit in response to the touch operation and the data on the image of the touch pad stored in the storage unit, and controls the original screen displayed on the display apparatus according to the recognized content of the touch operation.

The terminal apparatus may include a movement information output unit configured to detect a movement direction of the terminal apparatus, measure a movement amount of the terminal apparatus, and output movement information indicating the detected movement direction and the measured movement amount to the input control unit. The storage unit may store data representing a correspondence between the movement information of the terminal apparatus and an operation related to a cursor displayed on the display apparatus. The input control unit may be configured such that when the original screen is displayed on the display apparatus and the user moves the terminal apparatus, the input control unit recognizes a content of an operation related to the cursor based on the movement information of the movement transmitted from the movement information output unit and the data representing the correspondence stored in the storage unit, and controls the original screen displayed on the display apparatus according to the recognized content of the operation.

Effects of the Invention

In the glasses-type terminal according to the present invention, an image capturing apparatus is mounted on a main body and is configured to capture an image of an eye of a user to acquire an image of an original screen and a finger of the user or a specific input pointer reflected on the eye of the user when performing an operation on a visual confirmation screen with the finger or the input pointer. An operation determination unit of the glasses-type terminal is configured to determine what content of the operation is performed with the finger or the input pointer among the various types of operations, based on a series of image data of images captured by the image capturing apparatus. Further, an operation position identification unit of the glasses-type terminal is configured to identify a position on the original screen where the operation is performed with the finger or the input pointer, based on a series of image data of images captured by the image capturing apparatus. Further, an input control unit of the glasses-type terminal is configured to recognize a content of an input instruction corresponding to the operation performed on the visual confirmation screen with the finger or the input pointer, based on data on the content of the operation performed with the finger or the input pointer, obtained by the operation determination unit, data on the position on the original screen where the operation is performed with the finger or the input pointer, obtained by the operation position identification unit, and the data on the original screen stored in the storage unit, and control the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the glasses-type terminal according to the present invention makes it possible for the user to easily and accurately perform character input operations and various screen operations such as enlargement and reduction by operating the visual confirmation screen in the same manner as in typical smartphone terminals or tablet terminals.

BRIEF DESCRIPTION OF THE DRAWINGS

FIGS. 32A and 32B illustrate examples of an original screen of an operation screen for making a call with a mobile phone;

FIG. 36 is a schematic block diagram of the glasses-type terminal according to the fifth embodiment;

FIG. 44 illustrates a state where a screen of a terminal apparatus is used as a touch pad unit in a case where a smartphone is used as the terminal apparatus in the fifth embodiment; and FIG. 45 illustrates a state where a terminal apparatus is used as a mouse to instruct the movement of a cursor in a case where a smartphone is used as the terminal apparatus in the fifth embodiment.

DESCRIPTION OF THE EMBODIMENTS

Embodiments of the invention according to the present application will be described below with reference to the drawings.

First Embodiment

Figure 1A:
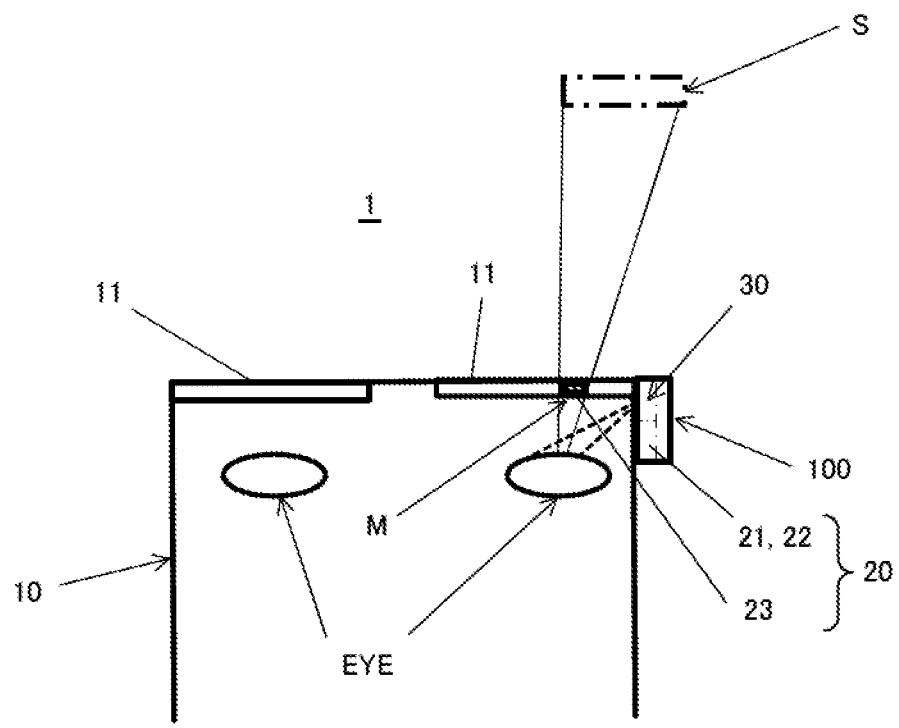
FIG. 1A is a schematic plan view of a glasses-type terminal according to a first embodiment of the present invention.
Figure 1B:
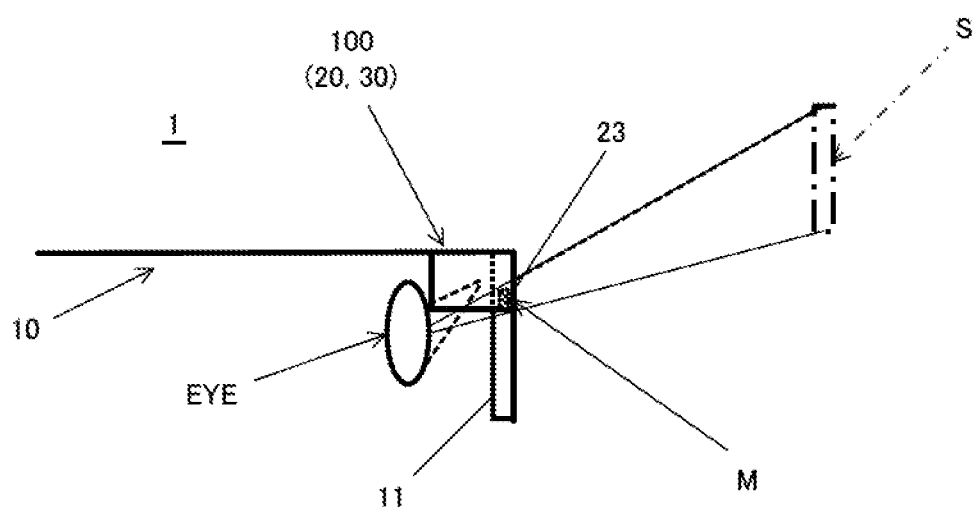
FIG. 1B is a schematic right side view of the glasses-type terminal.
Figure 2A:
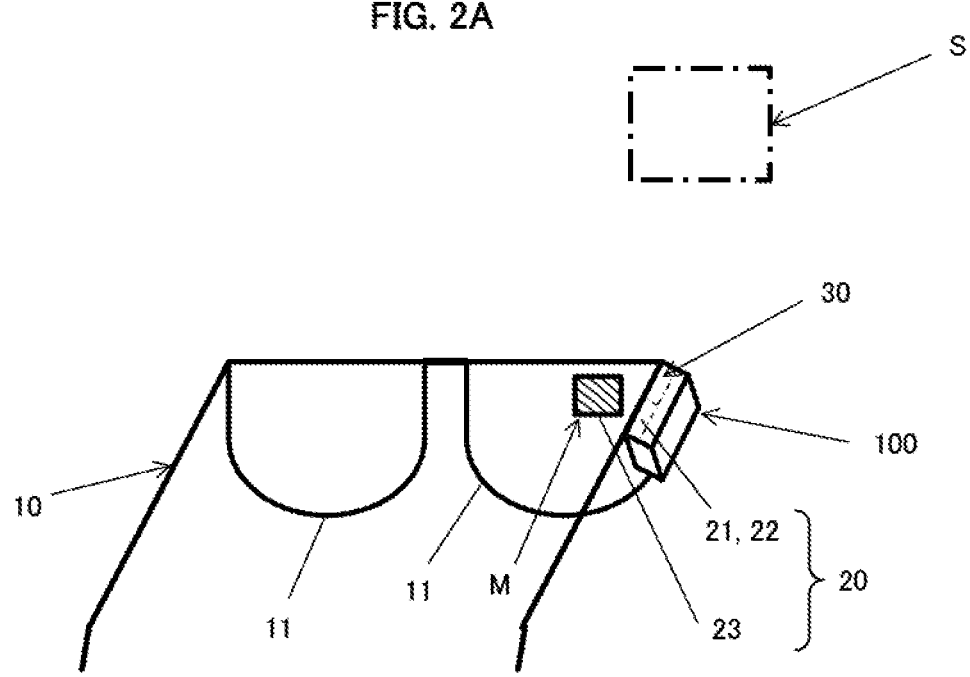
FIG. 2A is a schematic perspective view of the glasses-type terminal according to the first embodiment.
Figure 2B:
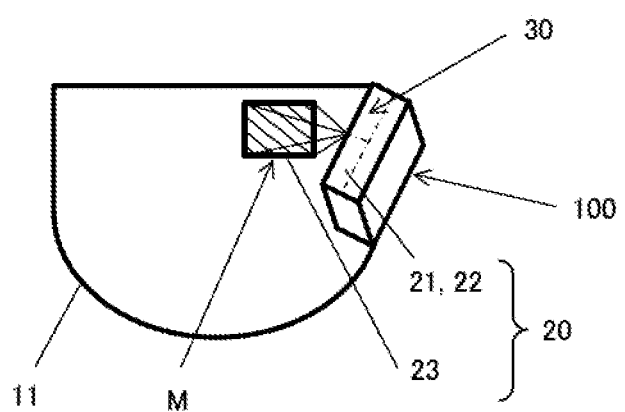
FIG. 2B is a schematic view for explaining how an original screen is projected onto a display apparatus in the glasses-type terminal.
Figure 3:
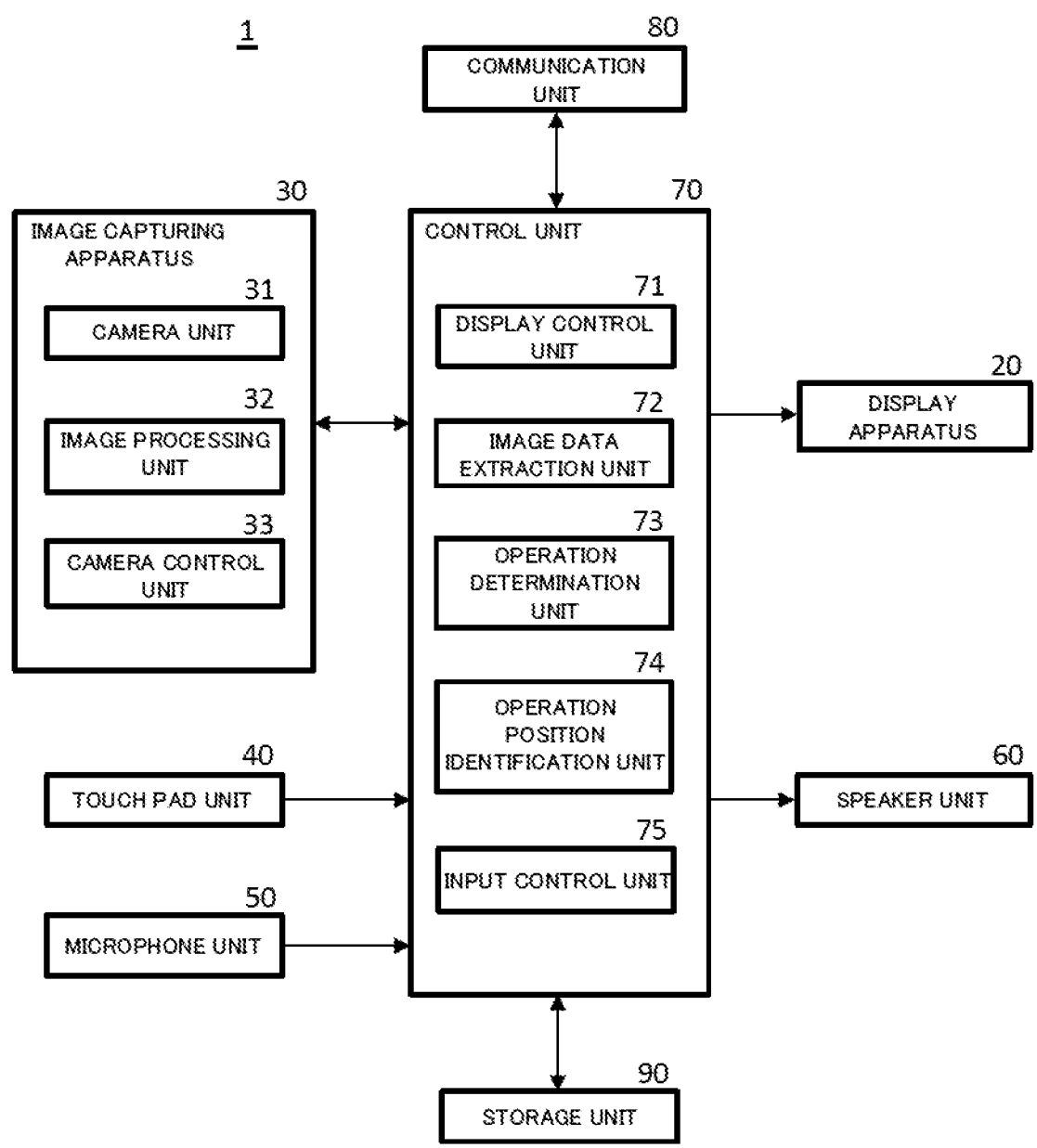
FIG. 3 is a schematic block diagram of the glasses-type terminal according to the first embodiment.

First, a glasses-type terminal according to a first embodiment of the present invention will be described. FIG. 1A is a schematic plan view of the glasses-type terminal according to the first embodiment of the present invention, and FIG. 1B is a schematic right side view of the glasses-type terminal. FIG. 2A is a schematic perspective view of the glasses-type terminal according to the first embodiment, and FIG. 2B is a schematic view for explaining how an original screen is projected onto a display apparatus in the glasses-type terminal. Further, FIG. 3 is a schematic block diagram of the glasses-type terminal according to the first embodiment.

The glasses-type terminal of the first embodiment is a wearable terminal, such as Google Glass from Google Inc., which is worn and used by a user in the same manner as a pair of glasses. As illustrated in FIGS. 1, 2A, and 3, the glasses-type terminal 1 includes a main body (a pair of glasses) 10 having lens parts to which lenses are attached, a display apparatus 20 mounted on the main body 10, an image capturing apparatus 30 for capturing an image of an eye of the user, a touch pad unit 40, a microphone unit 50, a speaker unit 60, a control unit 70, a communication unit 80, and a storage unit 90.

As illustrated in FIGS. 1 and 2A, the main body 10 is a general pair of glasses having two lens parts 11. The lens to be attached to the lens part 11 may be a convex lens or a concave lens for correcting visual acuity, may be a simple glass or plastic having no visual acuity correction function, or may be a lens for a pair of sunglasses to protect eyes from sunlight.

As illustrated in FIGS. 1 and 2A, the display apparatus 20 includes a small projector 21 having, for example, a liquid crystal panel (display device), an optical system 22, and a hologram sheet (or hologram film) 23 that reflects part of light (video). Here, the hologram sheet (or hologram film) 23 serves as a projected unit onto which an image displayed on the liquid crystal panel is projected via the optical system 22. The small projector 21 and the optical system 22 are arranged in a single housing 100, and the housing 100 is attached to a temple portion of the main body 10. The image capturing apparatus 30 is also arranged in the housing 100. In the first embodiment, the housing 100 is attachable to and detachable from the main body 10. Specifically, the small projector 21, the optical system 22, and the image capturing apparatus 30 are each attachable to and detachable from the main body 10.

As the small projector 21, for example, a LCD (liquid crystal display) projector or a LCOS (liquid crystal on silicon) projector can be used. The hologram sheet 23 is stuck to the lens part 11 for the right eye in the main body 10. The hologram sheet 23 used herein has a rectangular shape (e.g., 1 cm in width and 1.5 cm in length), and the hologram sheet 23 is stuck to an upper portion of the lens part 11 on the slightly right side in a state where it is horizontally long. An image or a video displayed on the liquid crystal panel of the small projector 21 is projected onto the hologram sheet 23 via the optical system 22 as illustrated in FIG. 2B. In particular, in the first embodiment, an image or a video displayed on the liquid crystal panel of the small projector 21 is projected onto the entire hologram sheet 23. In other words, the hologram sheet 23 itself is the projection range of an image or the like projected by the small projector 21. As illustrated in FIG. 1, the user can see an image or a video reflected by the hologram sheet 23. Actually, a very small screen is displayed on the hologram sheet 23. By using the glasses-type terminal 1, the user can see a translucent screen, which is an image of the very small screen displayed on the hologram sheet 23, to be floating in midair. This translucent screen appearing to be floating is equivalent to a 25-inch screen viewed 8 feet away for the user. In the first embodiment, a case will be described in which this screen appearing to be floating is translucent, but in general, the screen does not have to be translucent. Further, in the first embodiment, a case will be described in which this screen appearing to be floating is displayed in the upper right position of the field of view of the user as illustrated in FIGS. 1 and 2, but in general, the screen may be displayed in the center, upper left, lower right, or lower left position of the field of view of the user. In the following, the very small screen displayed on the hologram sheet 23 will be referred to as the "original screen", and the screen appearing to be floating in midair for the user who uses the glasses-type terminal 1 will be referred to as the "visual (virtual) confirmation screen".

Note that, in general, instead of the hologram sheet (or hologram film) 23, for example, a translucent screen or a transmissive screen can be used.

Figure 4:
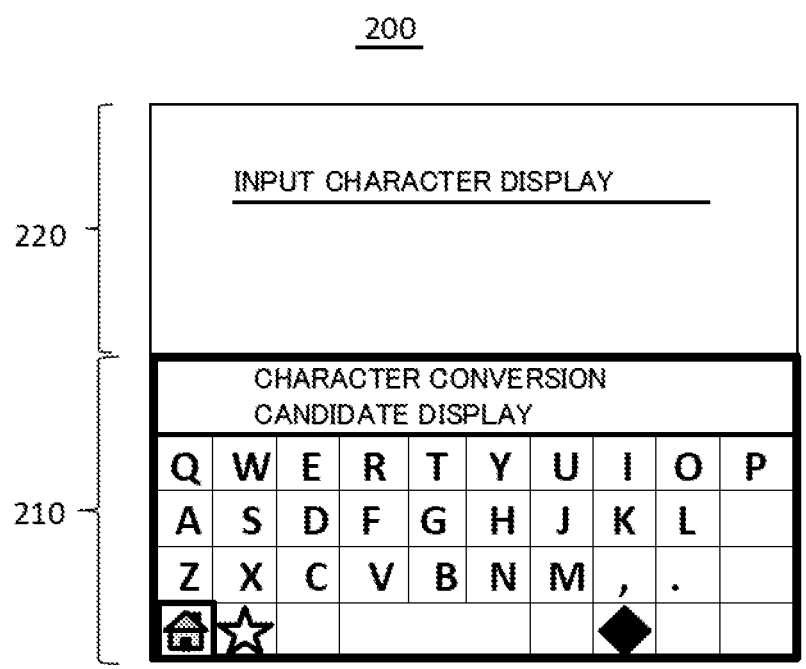
FIG. 4 illustrates an example of a character input screen.
Figure 5:
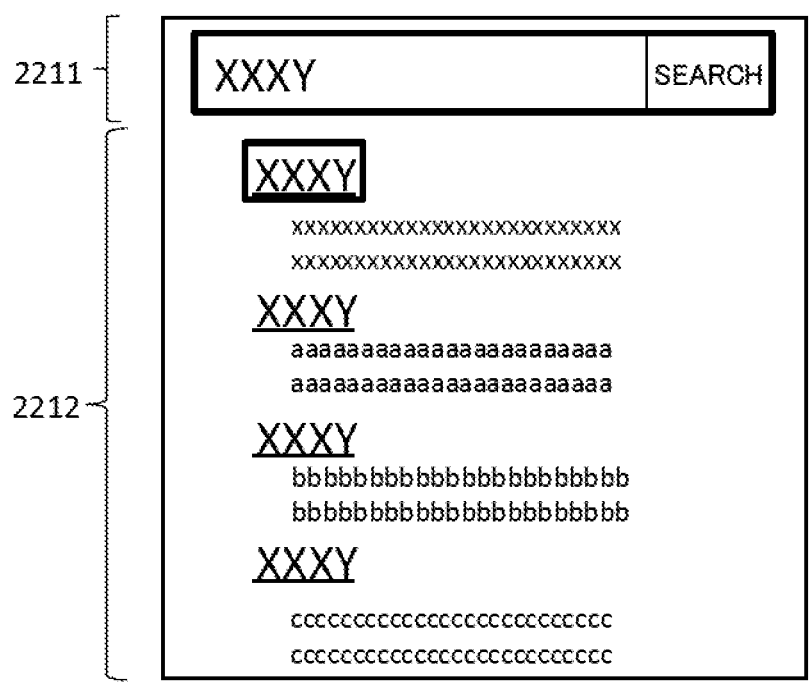
FIG. 5 illustrates an example of a search screen displayed in the character input screen.

Specifically, the display apparatus 20 displays various screens such as a character input screen. FIG. 4 illustrates an example of the character input screen. As illustrated in FIG. 4, the character input screen 200 has a keyboard image 210 and a display area 220 for displaying input characters and the like. The keyboard image 210 includes a plurality of character key images associated with characters (including symbols) and a plurality of function key images to which specific functions are assigned. In the example of FIG. 4, the QWERTY layout is adopted as the layout of the character key images in the keyboard image 210. Note that the keyboard image 210 may be a keyboard image having a hiragana 50-sound layout in Japanese, a keyboard image in the corresponding country's language, a numeric keypad image, a key image similar to the key layout of a mobile phone or a smartphone, or the like. Further, for example, a search screen is displayed in the display area 220. FIG. 5 illustrates an example of the search screen displayed in the display area 220 of the character input screen 200. The search screen 221 is for searching Internet sites, and has a keyword input field 2211 and a search result display field 2212 for displaying search results. When the user looks at the character input screen 200 as a visual confirmation screen S, the user can use the key images of the keyboard image 210 to input a keyword in the keyword input field 2211.

In the glasses-type terminal according to the first embodiment, as will be described in detail later, the user can perform a touch operation on the visual confirmation screen S with a finger of the user to issue various instructions to the control unit 70. In response to this, the control unit 70 recognizes the content of the instruction and controls an original screen M to be displayed on the display apparatus 20 according to the recognized content of the instruction. Here, in the first embodiment, the touch operation includes various operations like touch operations performed on a typical touch panel, such as tap, double tap, long press (long tap), drag, flick, pinch-in, and pinch-out operations.

As illustrated in FIGS. 1 and 2, the image capturing apparatus 30 is mounted on a temple portion of the main body 10. In the first embodiment, the image capturing apparatus 30 is arranged in the housing 100 together with the small projector 21 and the optical system 22 of the display apparatus 20. As illustrated in FIG. 3, the image capturing apparatus 30 includes a camera unit 31, an image processing unit 32, and a camera control unit 33. The camera unit 31 has a lens and an imaging element. The image processing unit 32 performs, based on the image data of an image captured by the camera unit 31, a process of correcting the color and gradation of the captured image, and performs image processing such as compression of the image data. The camera control unit 33 controls the image processing unit 32 and controls the exchange of image data between the camera control unit 33 and the control unit 70. Note that, in the present embodiment, a case will be described in which the image processing unit 32 is provided in the image capturing apparatus 30, but the image processing unit 32 may be provided in the control unit 70 instead of the image capturing apparatus 30.

Figure 6A:
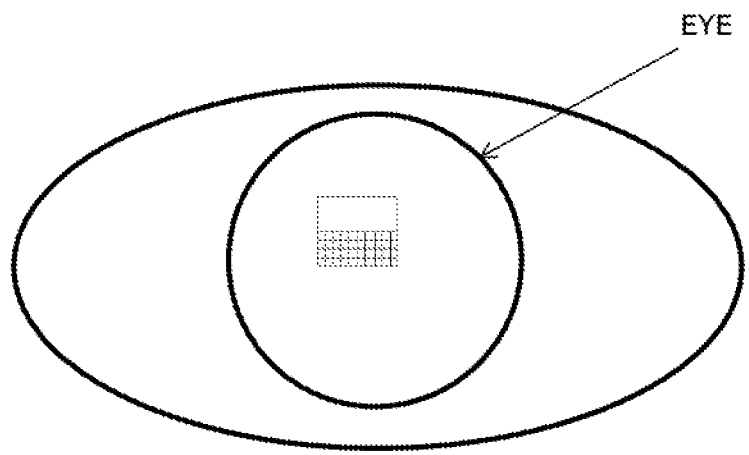
FIG. 6A illustrates an example of the original screen reflected on an eye.
Figure 6B:
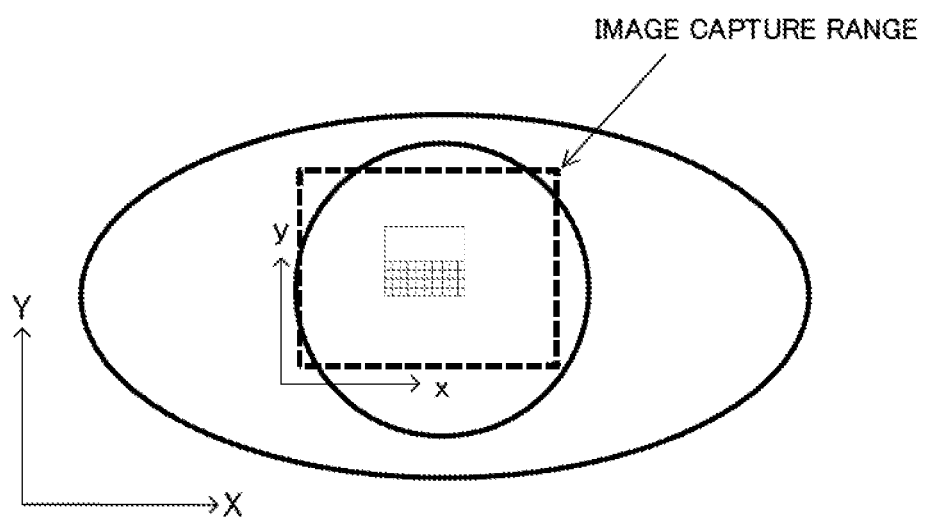
FIG. 6B illustrates an example of an image capture range of an image capturing apparatus.

Further, the image capturing apparatus 30 captures an image of an eye of the user (at least a part of the eye) to obtain an image of the original screen and a finger reflected on the eye of the user when the user operates the visual confirmation screen S with the finger. Here, the original screen displayed on the display apparatus 20 or the finger of the user who operates the visual confirmation screen is usually reflected on a part of the eye that can be seen from the outside and is also composed of a colored iris and a pupil. For this reason, the image capturing apparatus 30 actually captures an image of a portion composed of the iris and pupil of the eye of the user (or a part of the portion) to acquire an image of the original screen and the finger. In the first embodiment, the image capturing apparatus 30 is configured to focus on the eye of the user in advance. Specifically, the image capturing apparatus 30 is attached to the main body 10 so that the eye of the user is positioned on the optical axis of the lens of the camera unit 31, and the focus position is adjusted so that the eye is in focus. Further, the image capture range in which the image capturing apparatus 30 can capture images is a range that includes at least a part of the eye. FIG. 6A illustrates an example of the original screen reflected on an eye, and FIG. 6B illustrates an example of the image capture range of the image capturing apparatus 30. Therefore, when the user operates the visual confirmation screen S with a finger of the user, the image capturing apparatus 30 can capture an image of the original screen and the finger reflected on the eye of the user in a focused state. The image data of the image captured by the image capturing apparatus 30 is transmitted to the control unit 70, and is stored in the storage unit 90 by the control unit 70. Further, the image capturing apparatus 30 of the first embodiment has a still image capturing function and a moving image capturing function, so that the control unit 70 can acquire still image data and moving image data as image data, as needed.

As illustrated in FIG. 3, the main body 10 is provided with the touch pad unit 40, the microphone unit 50, the speaker unit 60 which is a bone conduction type, various sensor units, a battery unit, and the like. In FIGS. 1 and 2, the details of these units are omitted for simplification of the drawings. The touch pad unit 40 issues various instructions to the control unit 70 in response to the user performing a touch operation. The microphone unit 50 receives a user's voice in order to operate the glasses-type terminal 1 by a voice instruction. The voice information received by the microphone unit 50 is transmitted to the control unit 70, and the control unit 70 analyzes the voice information. Further, the speaker unit 60 transmits voice information to the user by utilizing the vibration of the bone. In general, the speaker unit 60 is not limited to transmitting voice information to the user by utilizing the vibration of the bone, and may be a normal speaker, earphone, headphone, or the like. The various sensor units, battery units, and the others are not directly related to the present invention, so that detailed description thereof will be omitted in the present embodiment.

Figure 7A:
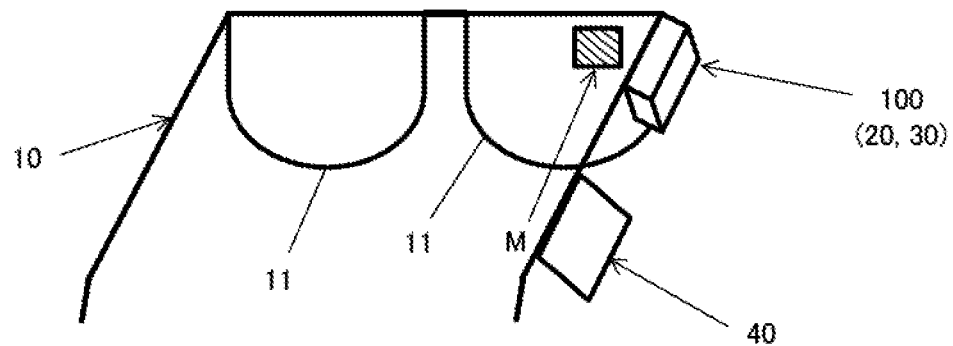
FIGS. 7A-7C illustrate examples of a location where a touch pad unit is mounted.
Figure 7B:
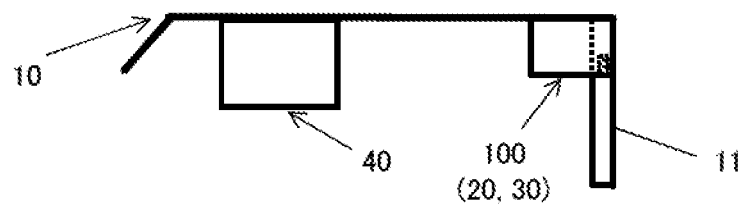
Figure 7C:
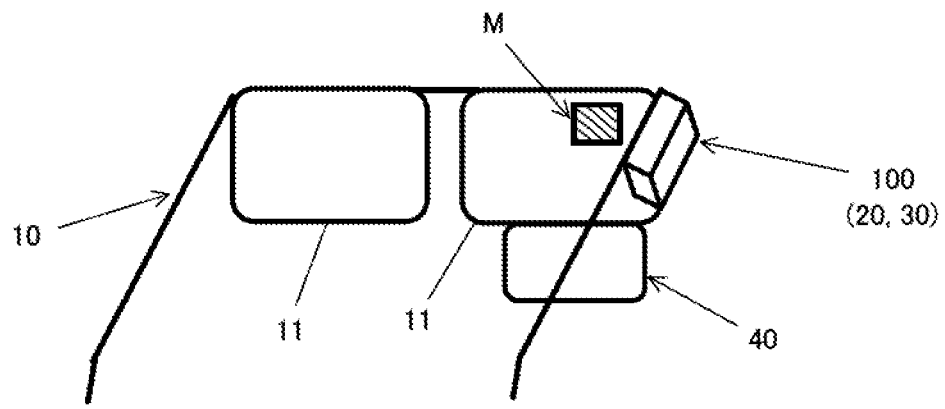
Figure 8A:
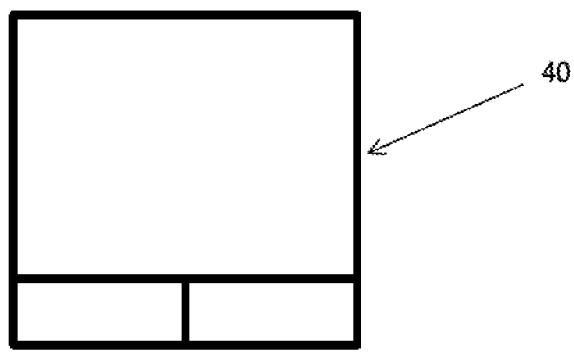
FIGS. 8A and 8B illustrate configuration examples of the touch pad unit.
Figure 8B:
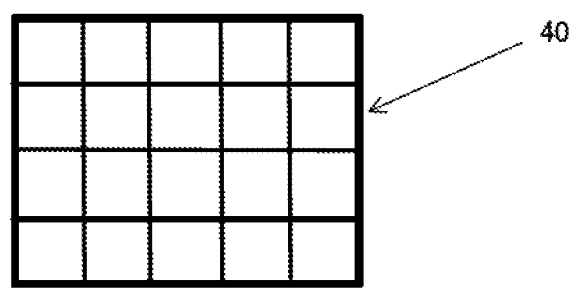

The touch pad unit 40 used in the glasses-type terminal according to the first embodiment will now be described in detail. FIG. 7 illustrates examples of a location where the touch pad unit 40 is mounted, and FIG. 8 illustrates configuration examples of the touch pad unit 40. The touch pad unit 40 is attached to the temple on the right side of the main body 10 as illustrated in FIGS. 7A and 7B, or is attached to the bottom portion of the lens part 11 for the right eye as illustrated in FIG. 7C. Here, FIG. 7A is a schematic perspective view of a glasses-type terminal including the touch pad unit 40 attached to the temple, and FIG. 7B is a schematic side view of the glasses-type terminal. Further, FIG. 7C is a schematic perspective view of a glasses-type terminal including the touch pad unit 40 attached to the lens part. The touch pad unit 40 is fixedly attached to the corresponding portion, but may be attachable to and detachable from that portion. Further, the touch pad unit 40 as used may have a mouse function as illustrated in FIG. 8A, and may have a simple keyboard function as illustrated in FIG. 8B. Further, the touch pad unit 40 is not limited to such examples, and may have a numeric key panel, an operation panel, or the like.

In the glasses-type terminal 1 according to the first embodiment, the control unit 70, the communication unit 80, and the storage unit 90 are arranged in the housing 100 together with the image capturing apparatus 30, and the housing 100 is attached to the main body 10. Further, as will be described in detail later, various data including data related to the original screen are stored in the storage unit 90. Note that, in the first embodiment, a case will be described in which the control unit 70, the communication unit 80, the storage unit 90, and the image capturing apparatus 30 are arranged in the housing 100 and the housing 100 is attached to the main body 10. However, the control unit 70, the communication unit 80, the storage unit 90, and the image capturing apparatus 30 may be directly attached to the main body 10 without going through a housing. Further, one or some of the control unit 70, the communication unit 80, the storage unit 90, and the image capturing apparatus 30 may be arranged in the housing 100 so that the housing 100 is attached to the main body 10 and the remaining units are directly attached to the main body 10.

The control unit 70 includes a central processing unit (CPU) and the like, and controls the entire glasses-type terminal 1. For example, the control unit 70 controls the display apparatus 20 to display the original screen M, and controls the image capturing apparatus 30 to capture images. When the touch pad unit 40 is operated, the control unit 70 recognizes the content of the instruction issued by the operation, and executes processing according to the recognized content. When the microphone unit 50 receives voice, the control unit 70 recognizes the content of the received voice information, and executes processing according to the recognized content. Further, the control unit 70 controls the voice information output from the speaker unit 60. Specifically, as illustrated in FIG. 3, the control unit 70 includes a display control unit 71, an image data extraction unit 72, an operation determination unit 73, an operation position identification unit 74, and an input control unit 75.

When the user gives a voice instruction through the microphone unit 50 or an instruction through an operation of the touch pad unit 40, the display control unit 71 selects a content of the original screen M to be displayed on the display apparatus 20 according to the content of the instruction, and controls the display of the selected original screen M. As a result, the original screen M indicated by the instruction of the user is displayed on the display apparatus 20, so that the user can see the visual confirmation screen S corresponding to the original screen M to be floating in midair.

When the image capturing apparatus 30 captures images of the original screen M reflected on the eye of the user, the image data extraction unit 72 extracts image data including an image of a finger from a series of image data of the captured images. A general image recognition method is used to determine whether or not the image data includes an image of a finger. Further, the operation determination unit 73 and the operation position identification unit 74 perform processing based on the image data extracted by the image data extraction unit 72.

When the image capturing apparatus 30 captures images of the original screen M and the finger reflected on the eye of the user, the operation determination unit 73 determines what content of the operation is performed with the finger among various types of operations, based on a series of image data of the captured images that is extracted by the image data extraction unit 72. In this determination, for example, a general image recognition method is used. As a result, the operation determination unit 73 can recognize which of the tap, double tap, and long press operations, and others is the operation performed with the finger. The data on the recognized content of the operation performed with the finger is stored in the storage unit 90. In order for the operation determination unit 73 to accurately recognize the content of the operation, it is preferable that the user performs various touch operations on the visual confirmation screen S slowly and exaggeratedly.

When the image capturing apparatus 30 captures images of the original screen M and the finger reflected on the eye of the user, the operation position identification unit 74 identifies the position on the original screen M where the operation is performed with the finger, based on a series of image data of the captured images that is extracted by the image data extraction unit 72. Specifically, in the present embodiment, the operation position identification unit 74 first identifies the original screen M and the finger which are included in the image based on the image data by using a general image recognition method. Next, the operation position identification unit 74 retrieves the position where the finger is within the range of the identified original screen M, and thus generates data representing the position where the operation is performed with the finger on the original screen M. The generated data is stored in the storage unit 90.

When the user performs an operation on the visual confirmation screen S with a finger, the input control unit 75 recognizes the content of an input instruction corresponding to the operation performed with the finger, based on data on the content of the operation performed with the finger, determined by the operation determination unit 73, data on the position on the original screen M where the operation is performed with the finger, obtained by the operation position identification unit 74, and the data on the original screen M stored in the storage unit 90, and controls the original screen M to be displayed on the display apparatus 20 according to the recognized content of the input instruction.

Actually, when the user performs a touch operation on the visual confirmation screen S with a finger in the same manner as when the visual confirmation screen S is displayed on the touch panel, the input control unit 75 recognizes an instruction corresponding to the touch operation. For example, in the case where the visual confirmation screen S is the character input screen 200 illustrated in FIG. 4, it is assumed that the user has performed an operation of tapping a desired character key image on the character input screen 200 with a finger. In this case, the input control unit 75 recognizes that this operation is a tap operation based on the data on the content of the operation with the finger obtained by the operation determination unit 73. Further, the input control unit 75 can recognize, based on the data on the original screen M corresponding to the character input screen 200, the content of the character input screen 200

(e.g., the arrangement of the keyboard image 210 in the character input screen 200, the layout of the character key images, etc.). Accordingly, based on the data representing the position on the original screen M where the operation is performed with the finger, obtained by the operation position identification unit 74, the input control unit 75 can identify the operated character key by retrieving a position corresponding the position represented by that data in the character input screen 200. In this way, since the tap operation is performed by the user and the operation is performed on the identified character key, the input control unit 75 can recognize that this operation indicates that an instruction to input the character represented by the character key is issued. As a result, the input control unit 75 displays on the display apparatus 20 the original screen M in which the character represented by the character keys is input in the display area 220 of the character input screen 200.

Further, when the user performs a double tap operation on the visual confirmation screen S with a finger, the input control unit 75 recognizes an instruction to enlarge or reduce the original screen M corresponding to the visual confirmation screen S. When the user performs a long press operation on the visual confirmation screen S with a finger, the input control unit 75 recognizes an instruction to display an option menu screen as the original screen M. When the user performs a drag or flick operation on the visual confirmation screen S with a finger, the input control unit 75 recognizes an instruction to scroll and display the original screen M.

In this way, the glasses-type terminal 1 according to the first embodiment makes it possible for the user to input an instruction corresponding to an operation by performing, on the visual confirmation screen S that the user looks at, the same operation as in operating a screen displayed on a typical touch panel.

Figure 9A:
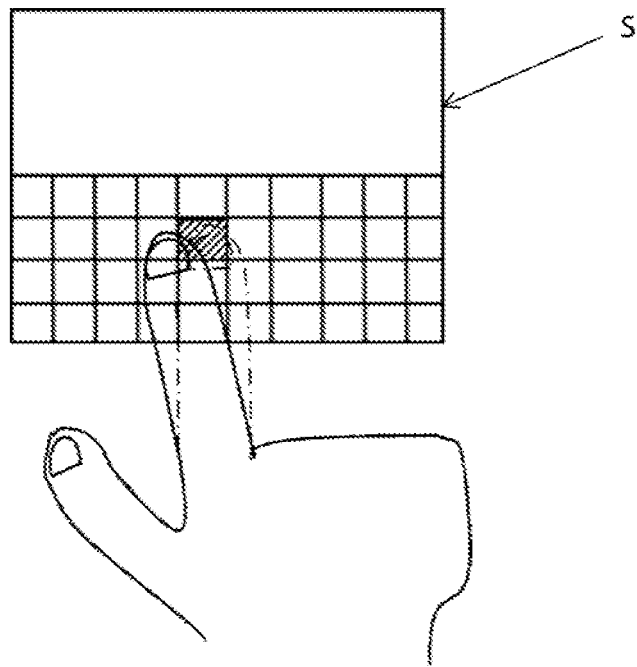
FIGS. 9A and 9B illustrate examples of how to perform a touch operation on a visual confirmation screen.
Figure 9B:
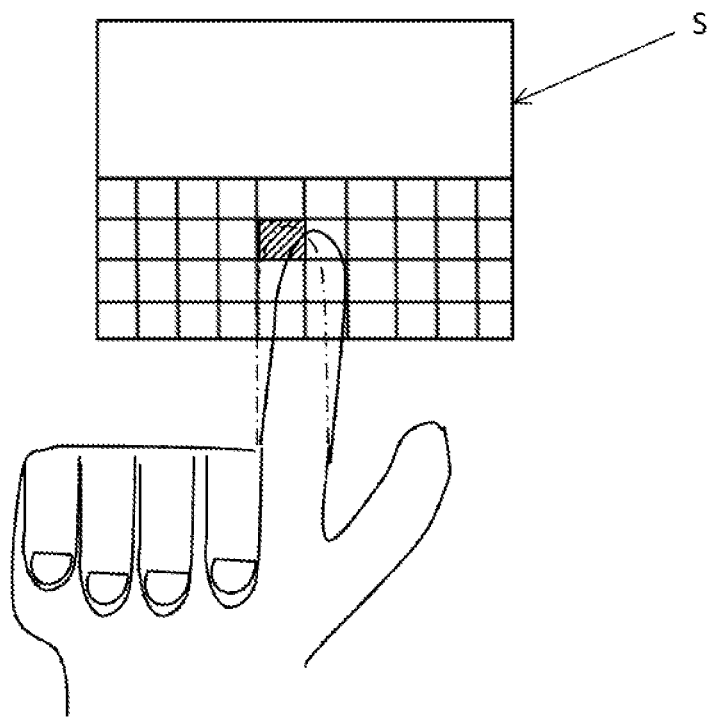
Figure 10A:
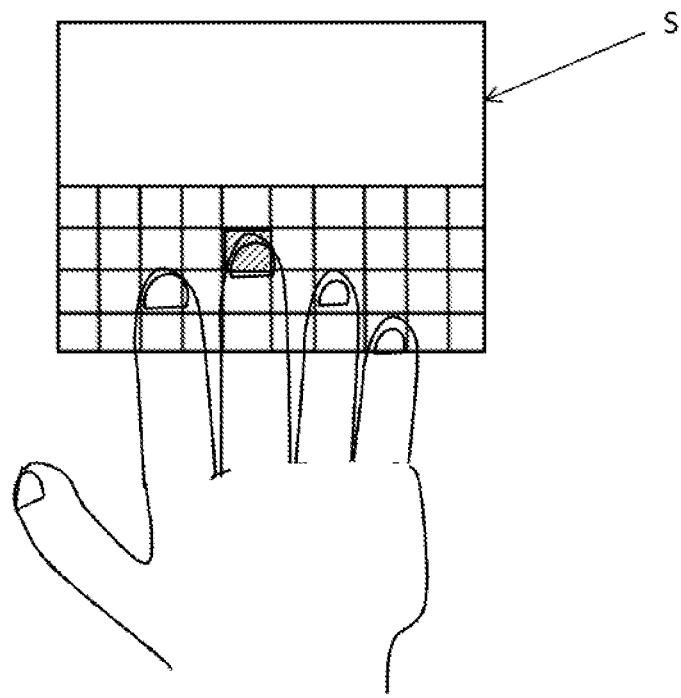
FIGS. 10A and 10B illustrate examples of how to perform a touch operation on a visual confirmation screen.
Figure 10B:
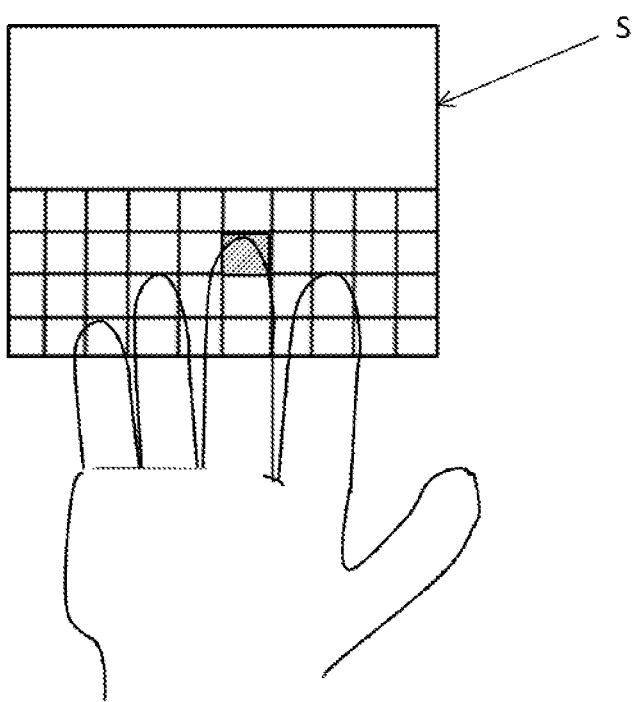

In the first embodiment, since the user performs a touch operation on the visual confirmation screen S appearing to be floating in midair with a finger, the user can also perform a touch operation in a manner that is impossible to perform a touch operation on a screen displayed on a normal touch panel. FIGS. 9 and 10 illustrate examples of how to perform a touch operation on the visual confirmation screen S. The user usually performs a touch operation with one finger from the front side of the visual confirmation screen S as illustrated in FIG. 9A. The user can also perform a touch operation with one finger from the back side of the visual confirmation screen S as illustrated in FIG. 9B. Further, the user can perform a touch operation with multiple fingers from the front side of the visual confirmation screen S as illustrated in FIG. 10A, and perform a touch operation with multiple fingers from the back side of the visual confirmation screen S as illustrated in FIG. 10B.

The communication unit 80 communicates information with external devices. The storage unit 90 stores various programs, data, and the like. Examples of the programs stored in the storage unit 90 include a character input processing program for performing a character input process based on an operation performed on the character input screen 200 in the case where the original screen M is the character input screen 200, and a screen display processing program for performing a screen display process such as enlargement, reduction, and switching of the original screen M corresponding to the visual confirmation screen S based on an operation performed on the visual confirmation screen S. Examples of the data stored in the storage unit 90 include image data of various original screens M and data on each original screen M (specifically, data indicating the size, shape, content, arrangement, and the like of the original screen M). Further, the storage unit 90 is also used as a working memory.

Figure 11:
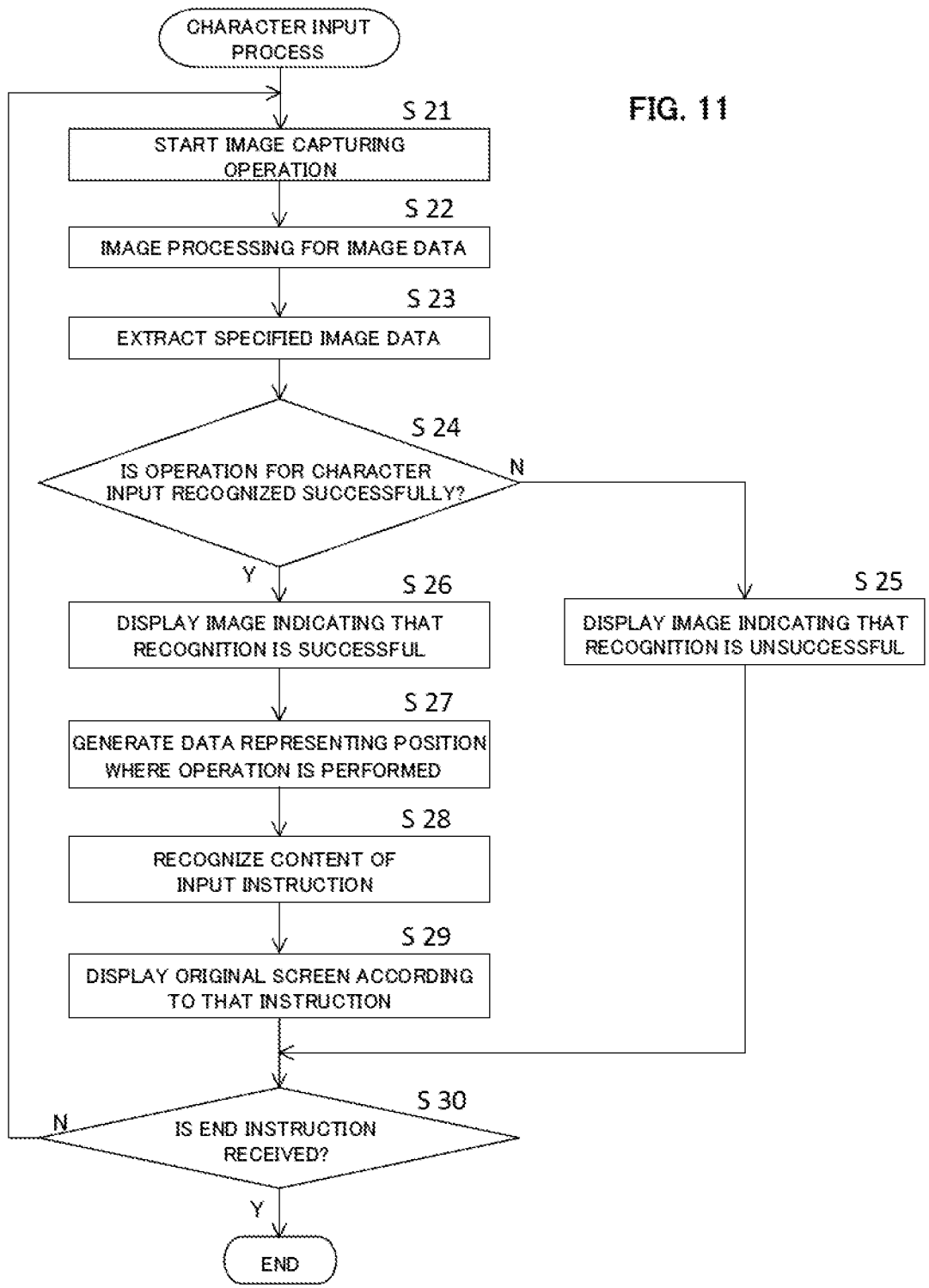
FIG. 11 is a flowchart of the procedure for a character input process in the glasses-type terminal according to the first embodiment.

Next, the character input process in the glasses-type terminal 1 according to the first embodiment will be described. FIG. 11 is a flowchart of the procedure for the character input process in the glasses-type terminal 1 according to the first embodiment. It is assumed herein that the character input screen 200 is previously displayed on the display apparatus 20 as the original screen M.

The user issues an instruction to input characters by voice through the microphone unit 50, or to input characters through an operation using the touch pad unit 40. In response to receiving the instruction, the control unit 70 reads the character input processing program from the storage unit 90 to perform the character input process according to the processing flow illustrated in FIG. 11. Note that the character input process may be started manually or automatically when the character input screen 200 is displayed on the display apparatus 20 as the original screen M.

According to the processing flow illustrated in FIG. 11, the control unit 70 first controls the image capturing apparatus 30 to start an image capturing operation for capturing an image of the eye of the user (S21). The user performs a predetermined operation, for example, a tap operation on the keyboard image 210 of the character input screen 200, which is the visual confirmation screen S corresponding to the original screen M currently displayed on the display apparatus 20, with a finger. Here, the reason why the user performs the predetermined operation is to inform the control unit 70 of the position on which the user performs the operation. At the time of such an operation by the user, the original screen M, or the original screen M and a finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70 (S22).

Next, the image data extraction unit 72 determines whether or not the transmitted image data includes an image of a finger by using a general image recognition method to extract image data that includes the image of the finger from a series of the image data of images captured by the image capturing apparatus 30 (S23). In other words, the image data extraction unit 72 extracts only the image data representing a content in which the user performs an operation with a finger. Next, the operation determination unit 73 determines whether or not the operation performed with the finger is a predetermined operation (a tap operation as used herein) based on the image data extracted by the image data extraction unit 72. This determination is made within a predetermined time. Then, the operation determination unit 73 determines that the operation for character input is successfully recognized if the operation performed with the finger is a tap operation; the operation determination unit 73 determines that the operation for character input is unsuccessfully recognized if the operation performed by the finger is not a tap operation (S24). When the operation determination unit 73 determines that the operation for character input is successfully recognized, the operation determination unit 73 stores the data on the content of the operation performed with the finger in the storage unit 90, and also transmits to the display control unit 71 a signal indicating that the operation for character input is successfully recognized. In response to receiving the signal, the display control unit 71 adds to the original screen M an image of a green light indicating that the operation for character input is successfully recognized, and displays the resulting image on the display apparatus 20 (S26). Note that the display control unit 71 may add to the original screen M an image of characters or figures indicating that the operation for character input is successfully recognized, in addition to or instead of the image of a green light. Alternatively, the control unit 70 may output a specific notification sound from the speaker unit 60 in addition to or instead of displaying such an image indicating that the operation for character input is successfully recognized.

On the other hand, when the operation determination unit 73 determines in the process of step S24 that the operation for character input is unsuccessfully recognized within a predetermined time, the operation determination unit 73 transmits a signal indicating unsuccessful to the display control unit 71. At this time, for example, also when image data including an image of a finger is not transmitted from the image data extraction unit 72 within a predetermined time, the operation determination unit 73 determines that the tap operation is unsuccessfully recognized. In response to receiving the signal indicating unsuccessful, the display control unit 71 adds to the original screen M an image of a red light indicating that the operation for character input is unsuccessfully recognized, and displays the resulting image on the display apparatus 20 (S25). After that, the process proceeds to step S30. Note that, at this time, the display control unit 71 may add to the original screen M an image of characters or figures indicating that the operation for character input is unsuccessfully recognized, in addition to or instead of the image of a red light. Alternatively, the control unit 70 may output a specific notification sound from the speaker unit 60 in addition to or instead of displaying such an image indicating that the operation for character input is unsuccessfully recognized.

After the process of step S26, the operation position identification unit 74 identifies, based on the image data determined by the operation determination unit 73 that the operation performed with the finger is a tap operation, a position on the original screen M where the operation is performed with the finger, and generates data representing the position on the original screen where the operation is performed with the finger (S27). This generated data representing the position where the operation is performed is stored in the storage unit 90.

Next, the input control unit 75 recognizes a content of an input instruction corresponding to the operation performed with the finger, based on data on the content of the operation performed with the finger, obtained by the operation determination unit 73, data on the position on the original screen M where the operation is performed with the finger, obtained by the operation position identification unit 74, and the data on the original screen M stored in the storage unit 90 (S28). For example, when the user performs a tap operation on a character key image in the keyboard image 210 with a finger, the input control unit 75 can determine which of the areas of the character key images in the keyboard image 210 corresponds to the position of the finger obtained from the data representing the position where the operation is performed with the finger, thus identify the character key on which the tap operation is performed, and then recognize an instruction issued to input the identified character key. After that, the input control unit 75 transmits a signal indicating the content of the recognized input instruction to the display control unit 71, and the display control unit 71 displays an original screen M corresponding to the content of the input instruction on the display apparatus 20 (S29).

After the process of step S29 or step S25, the control unit 70 determines whether or not an instruction to end the character input has been received from the user (S30). If the instruction to end the character input has been received, the character input process ends. Contrary to this, if the instruction to end the character input has not been received, the process proceeds to step S21 to continue the character input process. The user issues an instruction to end the character input by, for example, voice or a touch operation on the touch pad unit 40.

Figure 12:
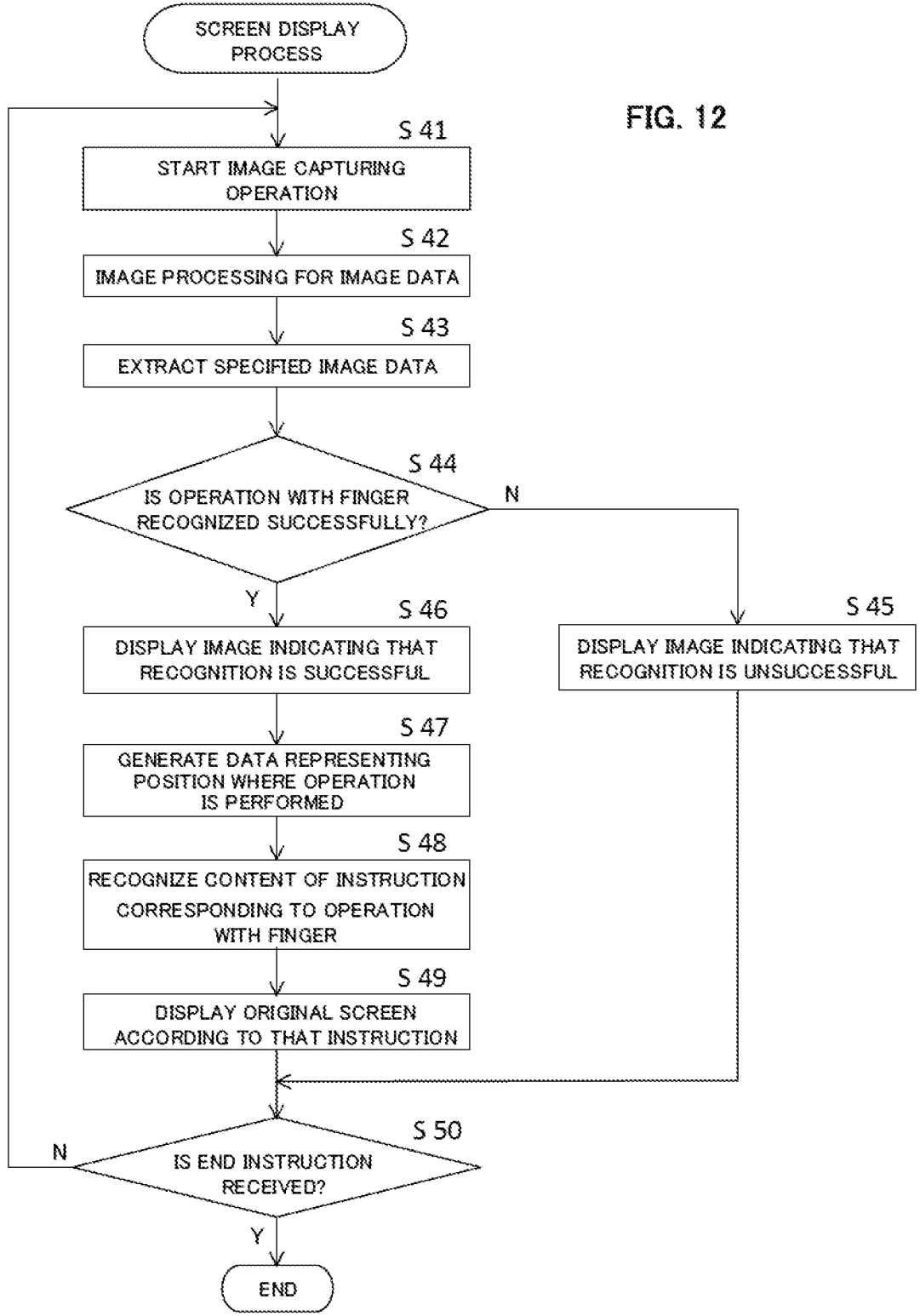
FIG. 12 is a flowchart of the procedure for a screen display process in the glasses-type terminal according to the first embodiment.

Next, the screen display process in the glasses-type terminal 1 according to the first embodiment will be described. FIG. 12 is a flowchart of the procedure for the screen display process in the glasses-type terminal 1 according to the first embodiment.

The user issues an instruction to perform an operation for screen display by voice through the microphone unit 50, or an instruction to perform an operation for screen display by an operation using the touch pad unit 40 or the like. In response to receiving the instruction, the control unit 70 reads the screen display processing program from the storage unit 90 to perform the screen display process according to the processing flow illustrated in FIG. 12. Note that the screen display process may be started manually or automatically when the original screen M is displayed on the display apparatus 20.

According to the processing flow illustrated in FIG. 12, the control unit 70 first controls the image capturing apparatus 30 to start an image capturing operation for capturing an image of the eye of the user (S41). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70 (S42).

Next, the image data extraction unit 72 determines whether or not the transmitted image data includes an image of a finger by using a general image recognition method to extract image data that includes the image of the finger from a series of the image data of images captured by the image capturing apparatus 30 (S43). In other words, the image data extraction unit 72 extracts only the image data representing a content in which the user performs an operation with a finger. Next, the operation determination unit 73 determines the content of the operation performed with the finger based on the image data extracted by the image data extraction unit 72. This determination is made within a predetermined time. Then, the operation determination unit 73 determines whether or not the operation performed with the finger is successfully recognized (S44). When the operation determination unit 73 determines that the operation performed with the finger is successfully recognized, the operation determination unit 73 stores the data on the content of the operation performed with the finger in the storage unit 90, and also transmits to the display control unit 71 a signal indicating that the operation performed with the finger is successfully recognized. In response to receiving the signal, the display control unit 71 adds to the original screen M an image of a green light indicating that the operation performed with the finger is successfully recognized, and displays the resulting image on the display apparatus 20 (S46). Note that the display control unit 71 may add to the original screen M an image of characters or figures indicating that the operation performed with the finger is successfully recognized, in addition to or instead of the image of a green light. Alternatively, the control unit 70 may output a specific notification sound from the speaker unit 60 in addition to or instead of displaying such an image indicating that the operation performed with the finger is successfully recognized.

On the other hand, when the operation determination unit 73 determines in the process of step S44 that the operation performed with the finger is unsuccessfully recognized, the operation determination unit 73 transmits a signal indicating unsuccessful to the display control unit 71. At this time, for example, also when image data including an image of a finger is not transmitted from the image data extraction unit 72 within a predetermined time, the operation determination unit 73 determines that the operation performed with the finger is unsuccessfully recognized. In response to receiving the signal, the display control unit 71 adds to the original screen M an image of a red light indicating that the operation performed with the finger is unsuccessfully recognized, and displays the resulting image on the display apparatus 20 (S45). After that, the process proceeds to step S50. Note that, at this time, the display control unit 71 may add to the original screen M an image of characters or figures indicating that the operation performed with the finger is unsuccessfully recognized, in addition to or instead of the image of a red light. Alternatively, the control unit 70 may output a specific notification sound from the speaker unit 60 in addition to or instead of displaying such an image indicating that the operation performed with the finger is unsuccessfully recognized.

After the process of step S46, the operation position identification unit 74 identifies, based on the image data in which the content of the operation performed with the finger is determined by the operation determination unit 73, a position on the original screen M where the operation is performed with the finger, and generates data representing the position on the original screen M where the operation is performed with the finger (S47). This generated data representing the position where the operation is performed is stored in the storage unit 90.

Next, the input control unit 75 recognizes a content of an instruction corresponding to the operation performed with the finger, based on data on the content of the operation performed with the finger, obtained by the operation determination unit 73, data on the position on the original screen M where the operation is performed with the finger, obtained by the operation position identification unit 74, and the data on the original screen M stored in the storage unit 90 (S48). For example, when the user performs a double tap operation on the visual confirmation screen S with a finger, the input control unit 75 identifies that this operation is a double tap operation, and recognizes that an instruction to enlarge (or reduce) the original screen M has been received. After that, the input control unit 75 transmits a signal indicating the content of the recognized instruction to the display control unit 71, and the display control unit 71 displays an original screen M corresponding to the content of the instruction on the display apparatus 20 (S49).

After the process of step S49 or step S45, the control unit 70 determines whether or not an instruction to end the operation for screen display has been received from the user (S50). If the instruction to end the operation for screen display has been received, the screen display process ends. Contrary to this, if the instruction to end the operation for screen display has not been received, the process proceeds to step S41 to continue the screen display process. The user issues an instruction to end the operation for screen display by, for example, voice or a touch operation on the touch pad unit 40.

Note that the above-described examples are described for the case where the control unit 70 performs the character input process in response to an instruction to input characters from the user, and also the control unit 70 performs the screen display process in response to an instruction to perform an operation for screen display from the user, but the control unit 70 may automatically switch between the character input process and the screen display process.

In the glasses-type terminal according to the first embodiment, an image capturing apparatus is mounted on a main body and is configured to capture an image of an eye of a user to acquire an image of an original screen and a finger of the user reflected on the eye of the user when performing an operation on a visual confirmation screen with the finger. Further, an operation determination unit of the glasses-type terminal is configured such that when the image capturing apparatus captures the image of the original screen and the finger reflected on the eye of the user, the operation determination unit determines what content of the operation is performed with the finger among the various types of operations, based on a series of image data of images thus captured. Further, an operation position identification unit of the glasses-type terminal is configured such that when the image capturing apparatus captures the image of the original screen and the finger reflected on the eye of the user, the operation position identification unit identifies a position on the original screen where the operation is performed with the finger, based on a series of image data of images thus captured. In addition, an input control unit of the glasses-type terminal is configured such that when the user performs an operation on the visual confirmation screen with the finger, the input control unit recognizes the content of an input instruction corresponding to the operation performed on the visual confirmation screen with the finger, based on data on the content of the operation performed with the finger, obtained by the operation determination unit, data on the position on the original screen where the operation is performed with the finger, obtained by the operation position identification unit, and the data on the original screen stored in the storage unit, and controls the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the glasses-type terminal according to the first embodiment makes it possible for the user to easily and accurately perform character input operations and various screen operations such as enlargement and reduction by operating the visual confirmation screen in the same manner as in typical smartphone terminals or tablet terminals.

Second Embodiment

Figure 13:
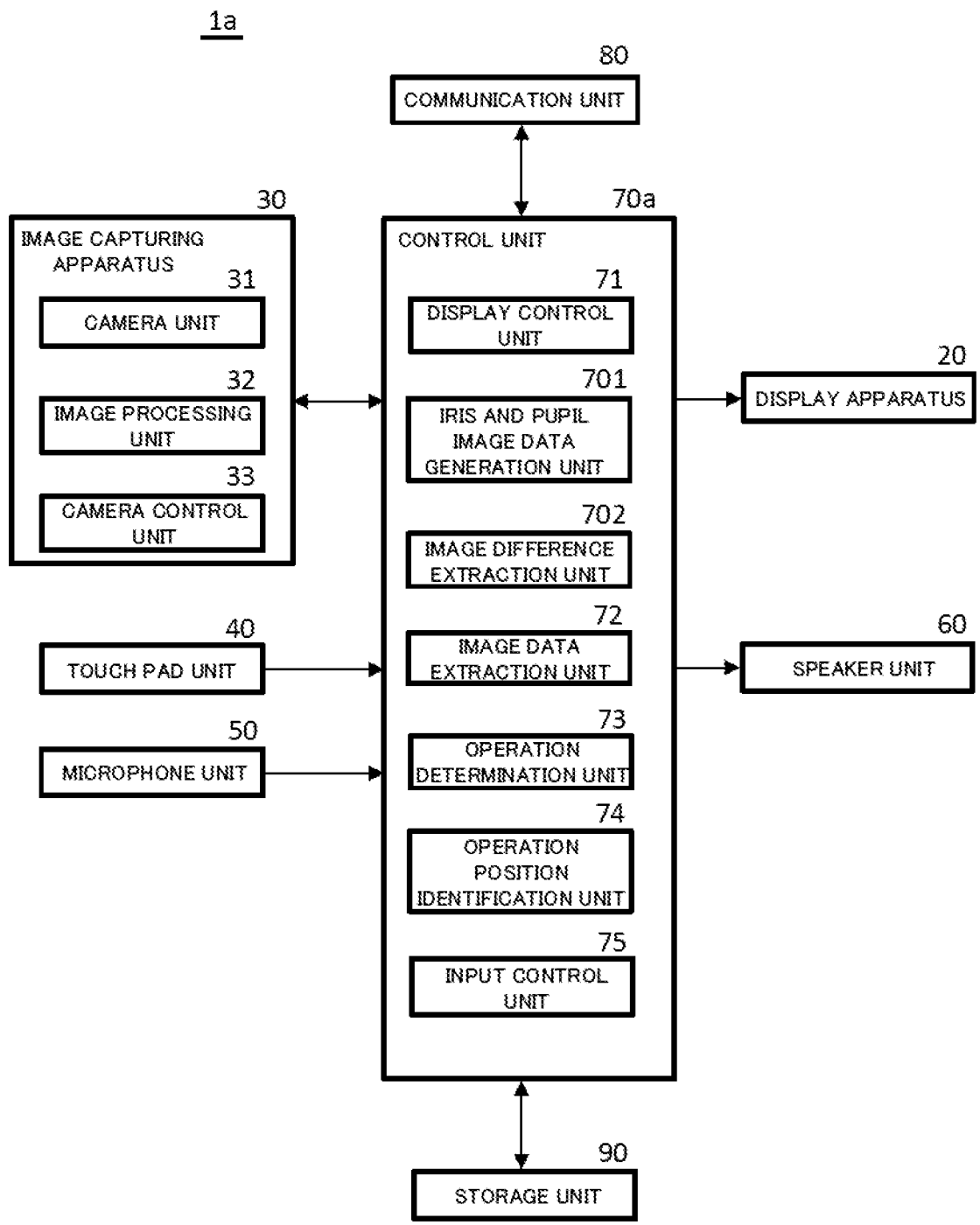
FIG. 13 is a schematic block diagram of a glasses-type terminal according to a second embodiment of the present invention.

Next, a glasses-type terminal according to a second embodiment of the present invention will be described. FIG. 13 is a schematic block diagram of the glasses-type terminal according to the second embodiment of the present invention. In the second embodiment, the apparatuses/units having the same functions as those of the first embodiment described above are designated by the same reference numerals, and detailed description thereof will be omitted.

As illustrated in FIG. 13, the glasses-type terminal 1a according to the second embodiment includes the main body 10 having lens parts to which lenses are attached, the display apparatus 20 mounted on the main body 10, the image capturing apparatus 30 for capturing an image of an eye of the user, the touch pad unit 40, the microphone unit 50, the speaker unit 60, a control unit 70a, the communication unit 80, and the storage unit 90. Further, the control unit 70a includes the display control unit 71, an iris and pupil image data generation unit 701, an image difference extraction unit 702, the image data extraction unit 72, the operation determination unit 73, the operation position identification unit 74, and the input control unit 75.

This glasses-type terminal 1a according to the second embodiment mainly differs from the glasses-type terminal 1 according to the first embodiment in that the control unit 70a includes the iris and pupil image data generation unit 701 and the image difference extraction unit 702.

When the image capturing apparatus 30 captures an image of an eye of the user before the original screen M is displayed on the display apparatus 20, the iris and pupil image data generation unit 701 generates image data of the iris and pupil based on the image data of the captured image, and stores the generated image data in the storage unit 90. Here, it is preferable that the timing at which the image capturing apparatus 30 captures the image for the image data is immediately before the original screen M is displayed on the display apparatus 20. This is because the state of the iris and pupil of the user included in the image data of the iris and pupil generated by the iris and pupil image data generation unit 701 needs to be almost the same as the state when the user performs an operation on the visual confirmation screen S. Further, when the image capturing apparatus 30 captures an image of the original screen M and the finger reflected on the eye of the user, the image difference extraction unit 702 performs a process of extracting a difference between the image data of the captured image and the image data of the iris and pupil stored in the storage unit 90 to generate image data in which an image of the iris and pupil is removed. Accordingly, the image data from which the difference is extracted is the image data in which the image of the iris and pupil of the user unnecessary for performing image recognition is removed and thus only the original screen M and the finger remain. In the second embodiment, the image data extraction unit 72 performs an image data extraction process using a series of image data generated by the image difference extraction unit 702.

Figure 14:
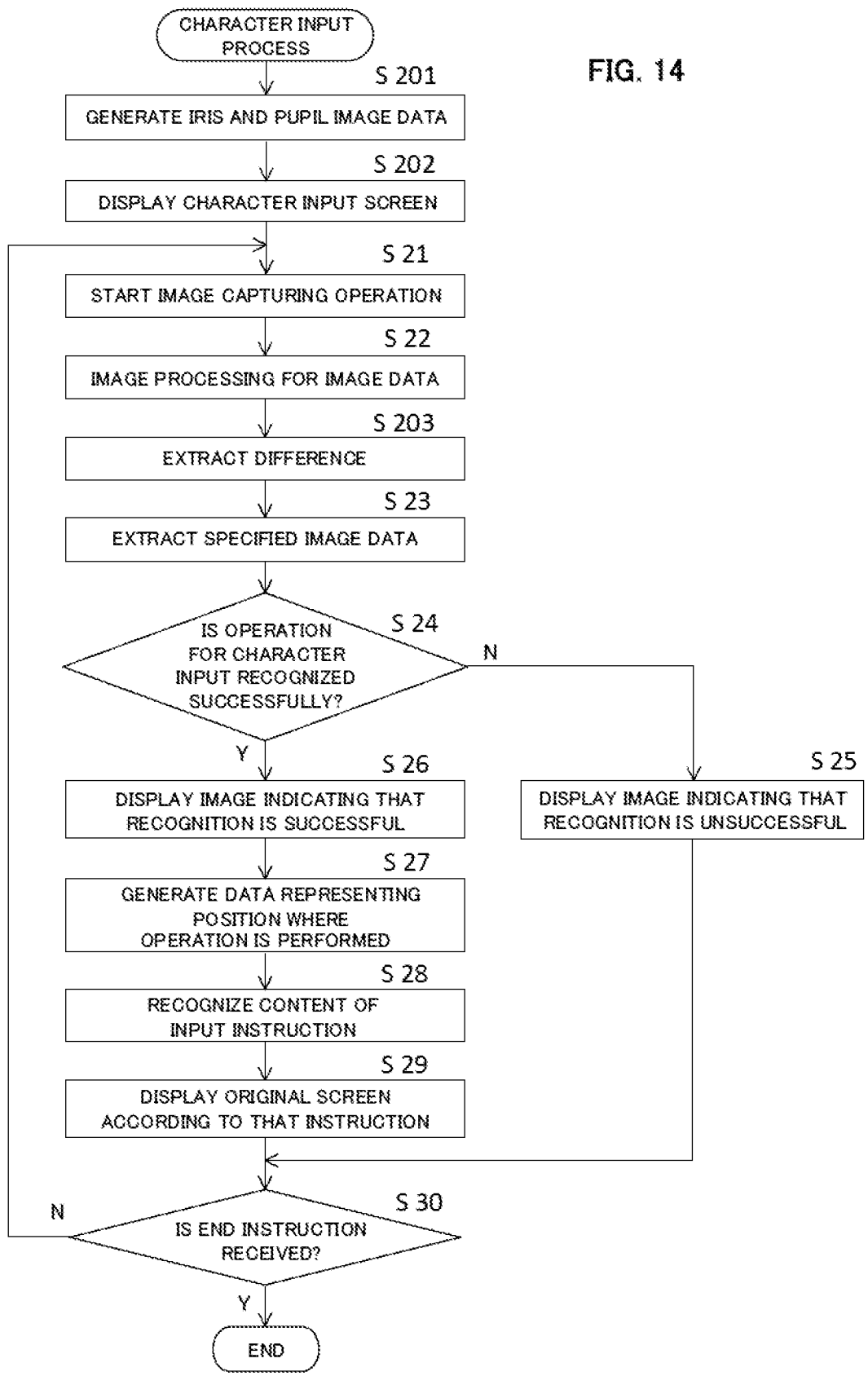
FIG. 14 is a flowchart of the procedure for a character input process in the glasses-type terminal according to the second embodiment.

Next, a character input process in the glasses-type terminal 1a according to the second embodiment will be described. FIG. 14 is a flowchart of the procedure for the character input process in the glasses-type terminal 1a according to the second embodiment. In the flowchart of FIG. 14, the processing having the same content as the flowchart of FIG. 11 in the above-described first embodiment is given the same step reference numerals, and detailed description thereof will be omitted.

The user issues an instruction to input characters by voice through the microphone unit 50, or to input characters through an operation using the touch pad unit 40 or the like. In response to receiving the instruction, the control unit 70a reads the character input processing program from the storage unit 90 to perform the character input process according to the processing flow illustrated in FIG. 14.

According to the processing flow illustrated in FIG. 14, the control unit 70a first causes the speaker unit 60 to output voice "Look in the direction in which the original screen is displayed for a few seconds." As a result, the user looks in the direction in which the original screen is displayed according to that voice instruction. At this time, the control unit 70a controls the image capturing apparatus 30 to capture an image of an eye of the user by the image capturing apparatus 30. Then, the iris and pupil image data generation unit 701 generates image data of the iris and pupil based on the image data of the image of the eye of the user captured by the image capturing apparatus 30 (S201). The generated image data of the iris and pupil are stored in the storage unit 90. When the image data of the iris and pupil is generated in this way, the display control unit 71 displays the character input screen 200 as the original screen M on the display apparatus 20 (S202). This makes it possible for the user to see the visual confirmation screen S corresponding to the original screen M to be floating in midair. After that, the control unit 70a controls the image capturing apparatus 30 to start an image capturing operation for capturing an image of the eye of the user (S21). The user performs a predetermined operation, for example, a tap operation on the keyboard image 210 of the character input screen 200, which is the visual confirmation screen S, with a finger. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70a (S22).

Next, the image difference extraction unit 702 performs the process of extracting a difference between the image data of the image captured by the image capturing apparatus 30 and the image data of the iris and pupil stored in the storage unit 90 (S203). As a result, image data in which the image of the iris and pupil is removed can be obtained. Next, the image data extraction unit 72 determines whether or not the image data generated by the image difference extraction unit 702 includes an image of a finger by using a general image recognition method to extract image data that includes the image of the finger from a series of the image data generated by the image difference extraction unit 702 (S23). Here, since the image data extracted by the image data extraction unit 72 includes a finger, the image data includes the image of the original screen M and the finger reflected on the eye of the user. After that, the process proceeds to step S24. The processes of step S24 and the subsequent steps are the same as the processing according to the flowchart of FIG. 11 in the first embodiment.

Figure 15:
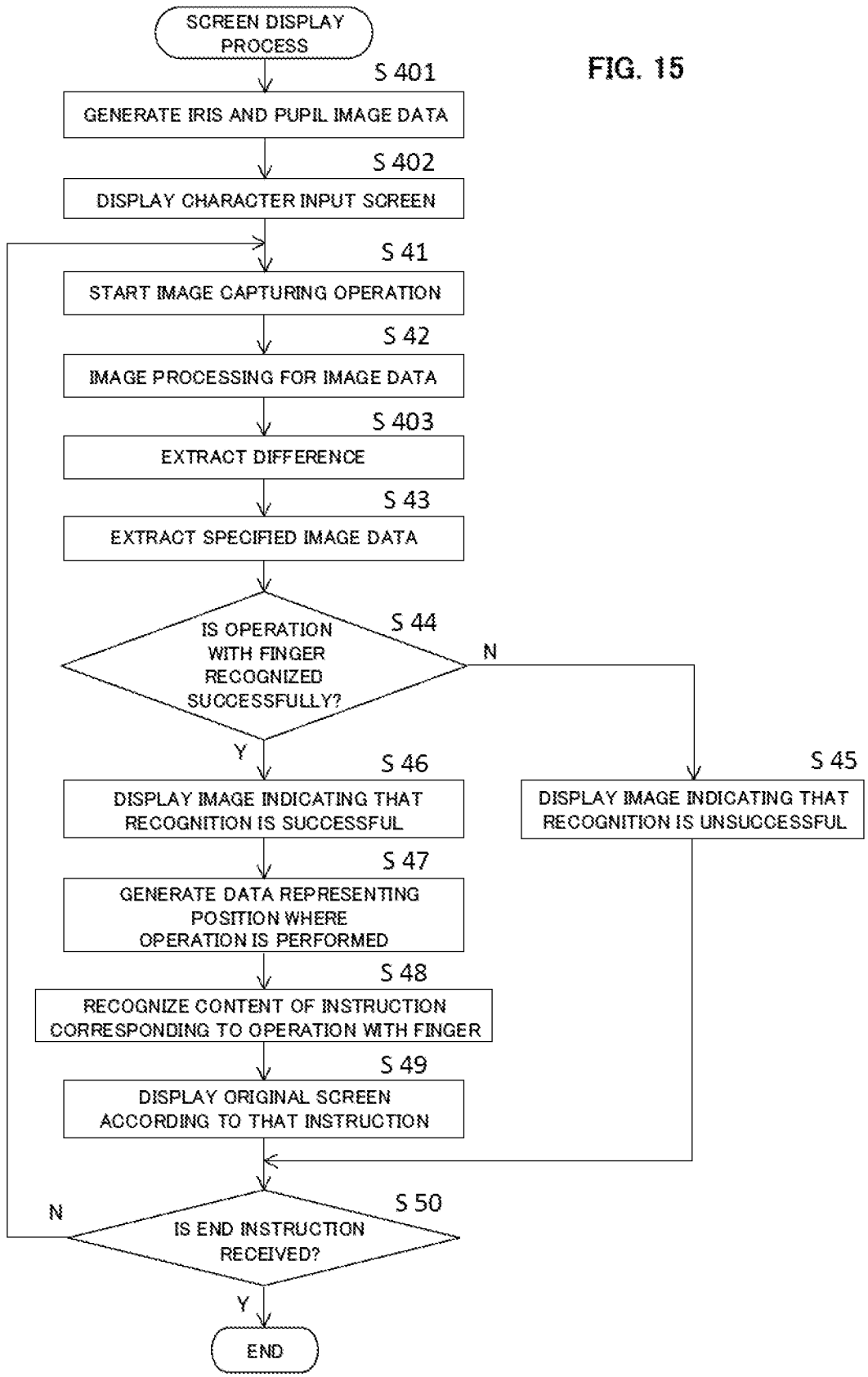
FIG. 15 is a flowchart of the procedure for a screen display process in the glasses-type terminal according to the second embodiment.

Next, a screen display process in the glasses-type terminal 1a according to the second embodiment will be described. FIG. 15 is a flowchart of the procedure for the screen display process in the glasses-type terminal 1a according to the second embodiment. In the flowchart of FIG. 15, the processing having the same content as the flowchart of FIG. 12 in the above-described first embodiment is given the same step reference numerals, and detailed description thereof will be omitted.

The user issues an instruction to perform an operation for screen display by voice through the microphone unit 50, or an instruction to perform an operation for screen display by an operation using the touch pad unit 40 or the like. In response to receiving the instruction, the control unit 70a reads the screen display processing program from the storage unit 90 to perform the screen display process according to the processing flow illustrated in FIG. 15.

According to the processing flow illustrated in FIG. 15, the control unit 70a first causes the speaker unit 60 to output voice "Look in the direction in which the original screen is displayed for a few seconds." As a result, the user looks in the direction in which the original screen is displayed according to that voice instruction. At this time, the control unit 70a controls the image capturing apparatus 30 to capture an image of an eye of the user by the image capturing apparatus 30. Then, the iris and pupil image data generation unit 701 generates image data of the iris and pupil based on the image data of the image of the eye of the user captured by the image capturing apparatus 30 (S401). The generated image data of the iris and pupil are stored in the storage unit 90. When the image data of the iris and pupil is generated in this way, the display control unit 71 displays the original screen M on the display apparatus 20 (S402). This makes it possible for the user to see the visual confirmation screen S corresponding to the original screen M to be floating in midair. After that, the control unit 70a controls the image capturing apparatus 30 to start an image capturing operation for capturing an image of the eye of the user (S41). The user performs a desired operation on the visual confirmation screen S with a finger. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70a (S42).

Next, the image difference extraction unit 702 performs the process of extracting a difference between the image data of the image captured by the image capturing apparatus 30 and the image data of the iris and pupil stored in the storage unit 90 (S403). As a result, image data in which the image of the iris and pupil is removed can be obtained. Next, the image data extraction unit 72 determines whether or not the image data generated by the image difference extraction unit 702 includes an image of a finger by using a general image recognition method to extract image data that includes the image of the finger from a series of the image data generated by the image difference extraction unit 702 (S43). Here, since the image data extracted by the image data extraction unit 72 includes a finger, the image data includes the image of the original screen M and the finger reflected on the eye of the user. After that, the process proceeds to step S44. The processes of step S44 and the subsequent steps are the same as the processing according to the flowchart of FIG. 12 in the first embodiment.

The glasses-type terminal according to the second embodiment has the same advantageous effects as the first embodiment. Accordingly, using the glasses-type terminal according to the second embodiment makes it possible for the user to easily and accurately perform character input operations and various screen operations such as enlargement and reduction by operating the visual confirmation screen in the same manner as in typical smartphone terminals or tablet terminals.

In particular, the glasses-type terminal according to the second embodiment includes an iris and pupil image data generation unit configured such that when the image capturing apparatus captures an image of the eye of the user before the display apparatus displays the original screen, the iris and pupil image data generation unit generates image data of an iris and pupil based on image data of the captured image and stores the generated image data in the storage unit; and an image difference extraction unit configured such that when the image capturing apparatus captures the image of the original screen and the finger reflected on the eye of the user, the image difference extraction unit performs a process of extracting a difference between image data of the captured image and the image data of the iris and pupil stored in the storage unit to generate image data in which an image of the iris and pupil is removed. The image data extraction unit is configured to perform a process of extracting the image data by using a series of the image data generated by the image difference extraction unit. As a result, the image data generated by the image difference extraction unit include no image of the iris and the pupil, so that the image data extraction unit can easily perform the process of extracting the image data including the image of the finger.

Incidentally, in the case where the user wears a contact lens, the image difference extraction unit may be configured to generate image data in which the image of the contact lens is removed as well as the image of the iris and the pupil. Specifically, the iris and pupil image data generation unit may be configured such that when the image capturing apparatus captures an image of the eye of the user who wears a contact lens before the display apparatus displays the original screen, the iris and pupil image data generation unit generates image data of the contact lens, iris, and pupil based on image data of the captured image and stores the generated image data in the storage unit. The image difference extraction unit may be configured such that when the image capturing apparatus captures the image of the original screen and the finger reflected on the eye of the user, the image difference extraction unit performs a process of extracting a difference between image data of the captured image and the image data of contact lens, iris, and pupil stored in the storage unit to generate image data in which an image of the contact lens, iris and pupil is removed. As a result, the image data generated by the image difference extraction unit include no image of the contact lens, the iris, and the pupil, so that the image data extraction unit can easily perform the process of extracting the image data including the image of the finger.

Third Embodiment

Figure 16:
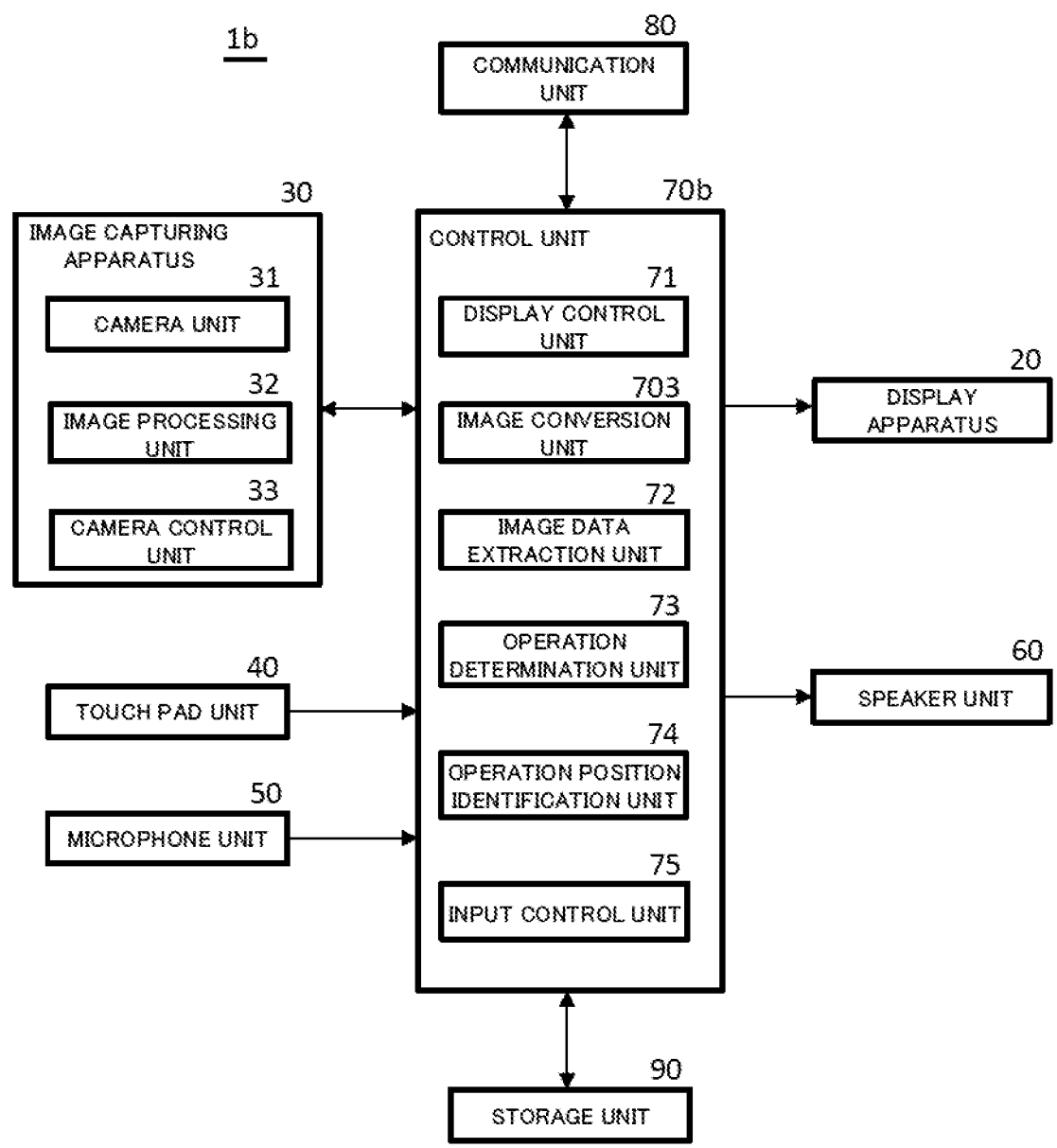
FIG. 16 is a schematic block diagram of a glasses-type terminal according to a third embodiment of the present invention.

Next, a glasses-type terminal according to a third embodiment of the present invention will be described. FIG. 16 is a schematic block diagram of the glasses-type terminal according to the third embodiment of the present invention. In the third embodiment, the apparatuses/units having the same functions as those of the first embodiment described above are designated by the same reference numerals, and detailed description thereof will be omitted.

As illustrated in FIG. 16, the glasses-type terminal 1b according to the third embodiment includes the main body 10 having lens parts to which lenses are attached, the display apparatus 20 mounted on the main body 10, the image capturing apparatus 30 for capturing an image of an eye of the user, the touch pad unit 40, the microphone unit 50, the speaker unit 60, a control unit 70b, the communication unit 80, and the storage unit 90. Further, the control unit 70b includes the display control unit 71, an image conversion unit 703, the image data extraction unit 72, the operation determination unit 73, the operation position identification unit 74, and the input control unit 75.

This glasses-type terminal 1b according to the third embodiment mainly differs from the glasses-type terminal 1 according to the first embodiment in that the control unit 70b includes the image conversion unit 703.

The image conversion unit 703 performs image conversion on the image data of an image captured by the image capturing apparatus 30 such that the image of the original screen M and the finger reflected on the eye of the user having a spherical shape in nature becomes an image imaged on a plane. For example, this image conversion is performed by an image conversion formula created in advance using the curvature of an eye (eyeball surface) or the like. In the third embodiment, the image data extraction unit 72 performs a predetermined process using a series of image data subjected to the image conversion by the image conversion unit 703.

Figure 17:
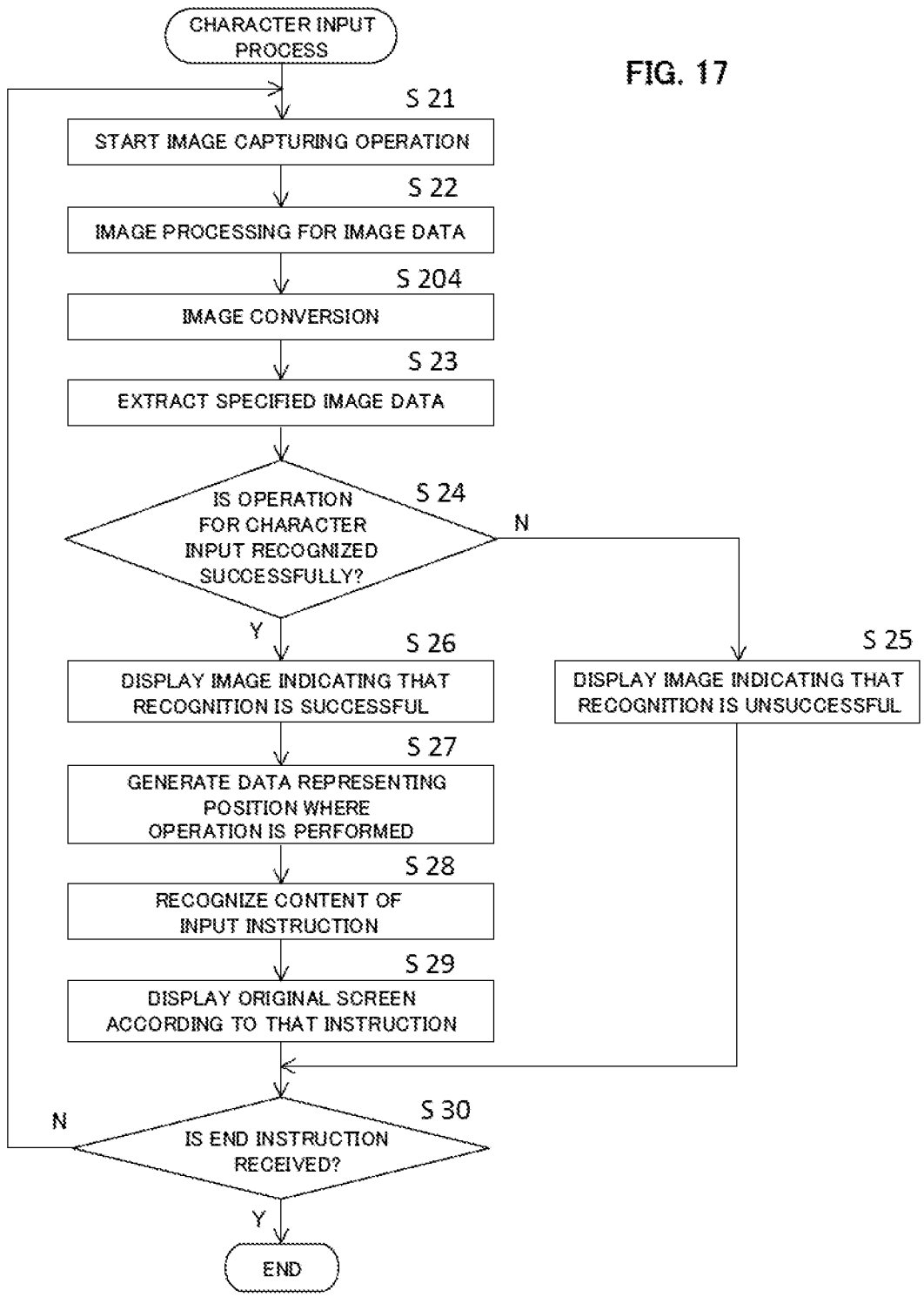
FIG. 17 is a flowchart of the procedure for a character input process in the glasses-type terminal according to the third embodiment.

Next, a character input process in the glasses-type terminal 1b according to the third embodiment will be described. FIG. 17 is a flowchart of the procedure for the character input process in the glasses-type terminal 1b according to the third embodiment. In the flowchart of FIG. 17, the processing having the same content as the flowchart of FIG. 11 in the above-described first embodiment is given the same step reference numerals, and detailed description thereof will be omitted.

It is assumed that the character input screen 200 is previously displayed on the display apparatus 20 as the original screen M. The user issues an instruction to input characters by voice through the microphone unit 50, or to input characters through an operation using the touch pad unit 40 or the like. In response to receiving the instruction, the control unit 70b reads the character input processing program from the storage unit 90 to perform the character input process according to the processing flow illustrated in FIG. 17.

According to the processing flow illustrated in FIG. 17, the control unit 70b first controls the image capturing apparatus 30 to start an image capturing operation for capturing an image of the eye of the user (S21). The user performs a predetermined operation, for example, a tap operation on the keyboard image 210 of the character input screen 200, which is the visual confirmation screen S corresponding to the original screen M currently displayed on the display apparatus 20, with a finger. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70b (S22).

Next, the image conversion unit 703 performs image conversion on the image data of the image captured by the image capturing apparatus 30 such that the image of the original screen M and the finger reflected on the eye of the user having a spherical shape in nature becomes an image imaged on a plane (S204). This image data obtained by the image conversion is transmitted to the image data extraction unit 72. Then, the image data extraction unit 72 determines whether or not the transmitted image data includes an image of a finger by using a general image recognition method to extract image data that includes the image of the finger from a series of the image data of images captured by the image capturing apparatus 30 (S23). After that, the process proceeds to step S24. The processes of step S24 and the subsequent steps are the same as the processing according to the flowchart of FIG. 11 in the first embodiment.

Figure 18:
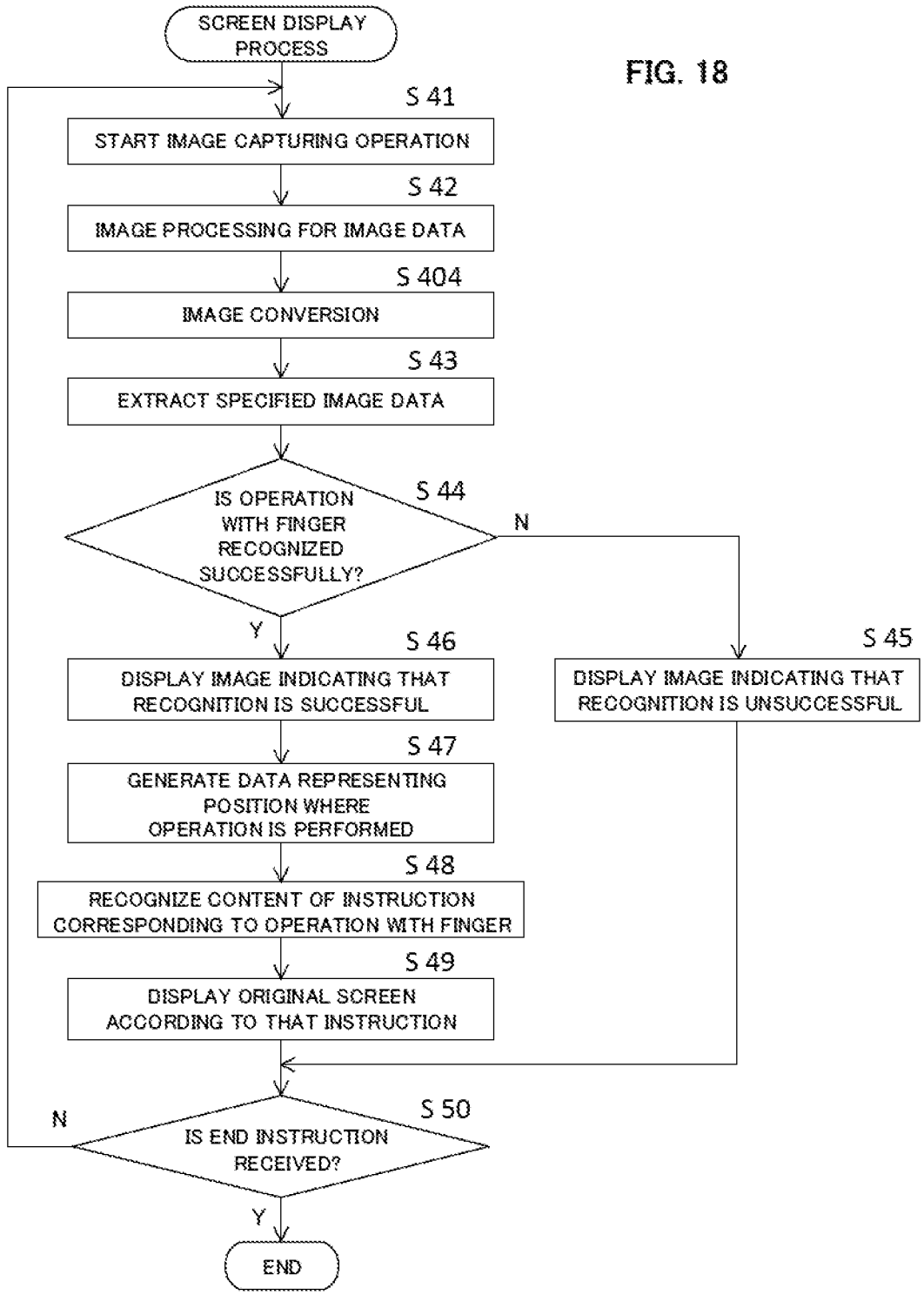
FIG. 18 is a flowchart of the procedure for a screen display process in the glasses-type terminal according to the third embodiment.

Next, a screen display process in the glasses-type terminal 1b according to the third embodiment will be described. FIG. 18 is a flowchart of the procedure for the screen display process in the glasses-type terminal 1b according to the third embodiment. In the flowchart of FIG. 18, the processing having the same content as the flowchart of FIG. 12 in the above-described first embodiment is given the same step reference numerals, and detailed description thereof will be omitted.

It is assumed that the original screen M is previously displayed on the display apparatus 20. The user issues an instruction to perform an operation for screen display by voice through the microphone unit 50, or an instruction to perform an operation for screen display by an operation using the touch pad unit 40 or the like. In response to receiving the instruction, the control unit 70b reads the screen display processing program from the storage unit 90 to perform the screen display process according to the processing flow illustrated in FIG. 18.

According to the processing flow illustrated in FIG. 18, the control unit 70b first controls the image capturing apparatus 30 to start an image capturing operation for capturing an image of the eye of the user (S41). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70b (S42).

Next, the image conversion unit 703 performs image conversion on the image data of the image captured by the image capturing apparatus 30 such that the image of the original screen M and the finger reflected on the eye of the user having a spherical shape in nature becomes an image imaged on a plane (S404). This image data obtained by the image conversion is transmitted to the image data extraction unit 72. Then, the image data extraction unit 72 determines whether or not the transmitted image data includes an image of a finger by using a general image recognition method to extract image data that includes the image of the finger from a series of the image data of images captured by the image capturing apparatus 30 (S43). After that, the process proceeds to step S44. The processes of step S44 and the subsequent steps are the same as the processing according to the flowchart of FIG. 12 in the first embodiment.

The glasses-type terminal according to the third embodiment has the same advantageous effects as the first embodiment described above. Accordingly, using the glasses-type terminal according to the third embodiment makes it possible for the user to easily and accurately perform character input operations and various screen operations such as enlargement and reduction by operating the visual confirmation screen in the same manner as in typical smartphone terminals or tablet terminals.

In particular, the glasses-type terminal according to the third embodiment includes an image conversion unit configured to perform image conversion on the image data of the images captured by the image capturing apparatus such that the image of the original screen and the finger reflected on the eye of the user having a spherical shape in nature becomes an image imaged on a plane. The image data extraction unit is configured to use a series of image data subjected to the image conversion by the image conversion unit to perform a process of extracting the image data. As a result, the glasses-type terminal has an advantageous effect that the series of image data extracted by the image data extraction unit has been subjected to distortion correction, so that the operation position identification unit can accurately identify the position on the original screen where the operation is performed with the finger.

Fourth Embodiment

Figure 19:
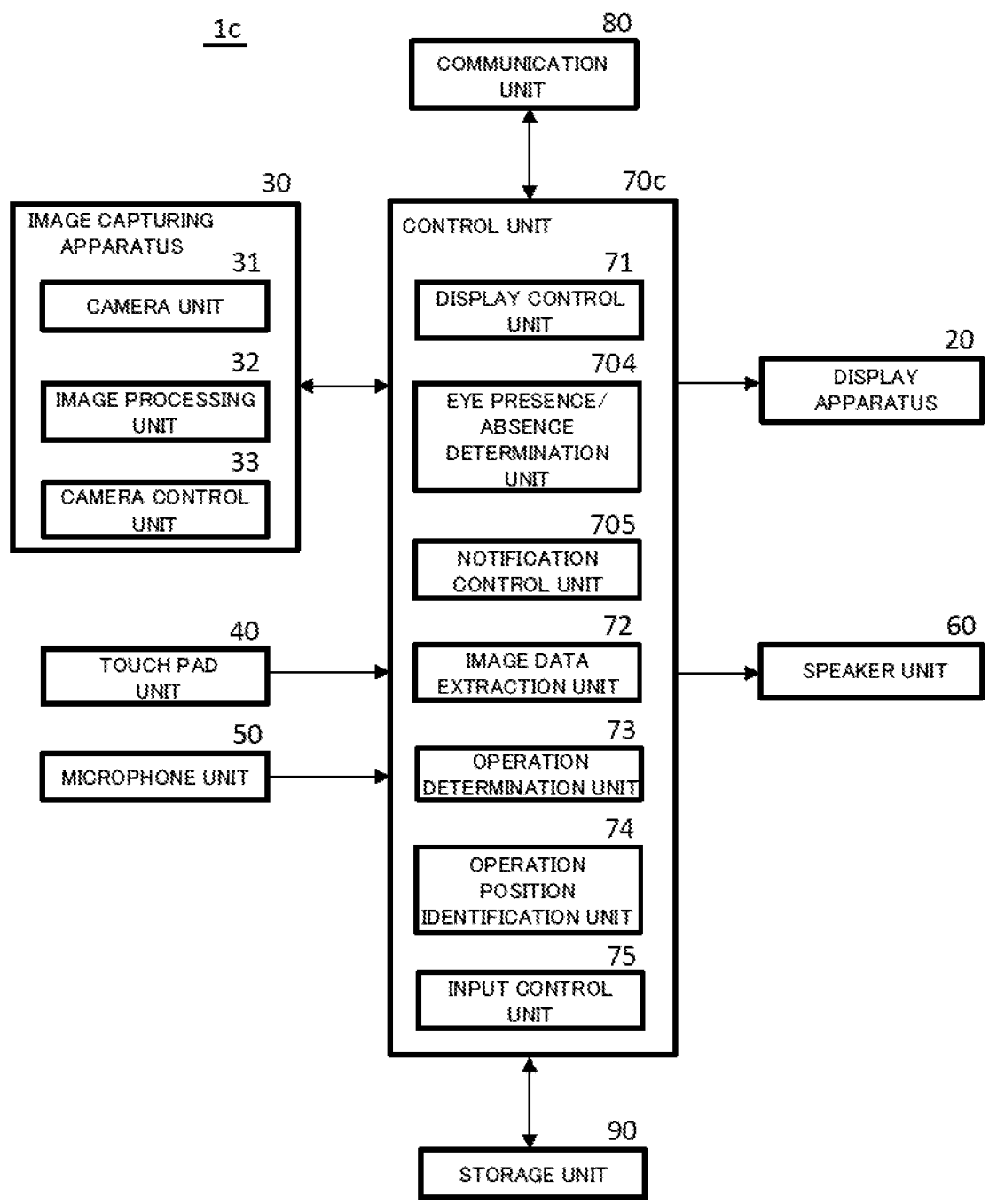
FIG. 19 is a schematic block diagram of a glasses-type terminal according to a fourth embodiment of the present invention.

Next, a glasses-type terminal according to a fourth embodiment of the present invention will be described. FIG. 19 is a schematic block diagram of the glasses-type terminal according to the fourth embodiment of the present invention. In the fourth embodiment, the apparatuses/units having the same functions as those of the first embodiment described above are designated by the same reference numerals, and detailed description thereof will be omitted.

As illustrated in FIG. 19, the glasses-type terminal 1c according to the fourth embodiment includes the main body 10 having lens parts to which lenses are attached, the display apparatus 20 mounted on the main body 10, the image capturing apparatus 30 for capturing an image of an eye of the user, the touch pad unit 40, the microphone unit 50, the speaker unit 60, a control unit 70c, the communication unit 80, and the storage unit 90. Further, the control unit 70c includes the display control unit 71, an eye presence/absence determination unit 704, a notification control unit 705, the image data extraction unit 72, the operation determination unit 73, the operation position identification unit 74, and the input control unit 75.

This glasses-type terminal 1c according to the fourth embodiment mainly differs from the glasses-type terminal 1 according to the first embodiment in that the control unit 70c includes the eye presence/absence determination unit 704 and the notification control unit 705.

The eye presence/absence determination unit 704 determines whether or not the image data of the image captured by the image capturing apparatus 30 includes an image of the eye of the user by using a general image recognition method to detect that image data not including the image of the eye of the user has been continuously acquired by the image capturing apparatus 30 for a certain period of time. Further, when the eye presence/absence determination unit 704 detects that image data not including the image of the eye of the user has been continuously acquired by the image capturing apparatus 30 for the certain period of time, the notification control unit 705 controls the speaker unit (notification device) 60 to output sound from the speaker unit 60. The fact that the image data not including the image of the eye of the user has been continuously acquired by the image capturing apparatus 30 for the certain period of time is considered to mean that the user has the eye closed, for example, sleeping. Therefore, for example, when the user is driving a car, the notification control unit 705 recognizes that the user is dozing off based on the detection result from the eye presence/absence determination unit 704, and causes the speaker unit 60 to output a warning sound, so that it is possible to prevent dozing driving.

Figure 20:
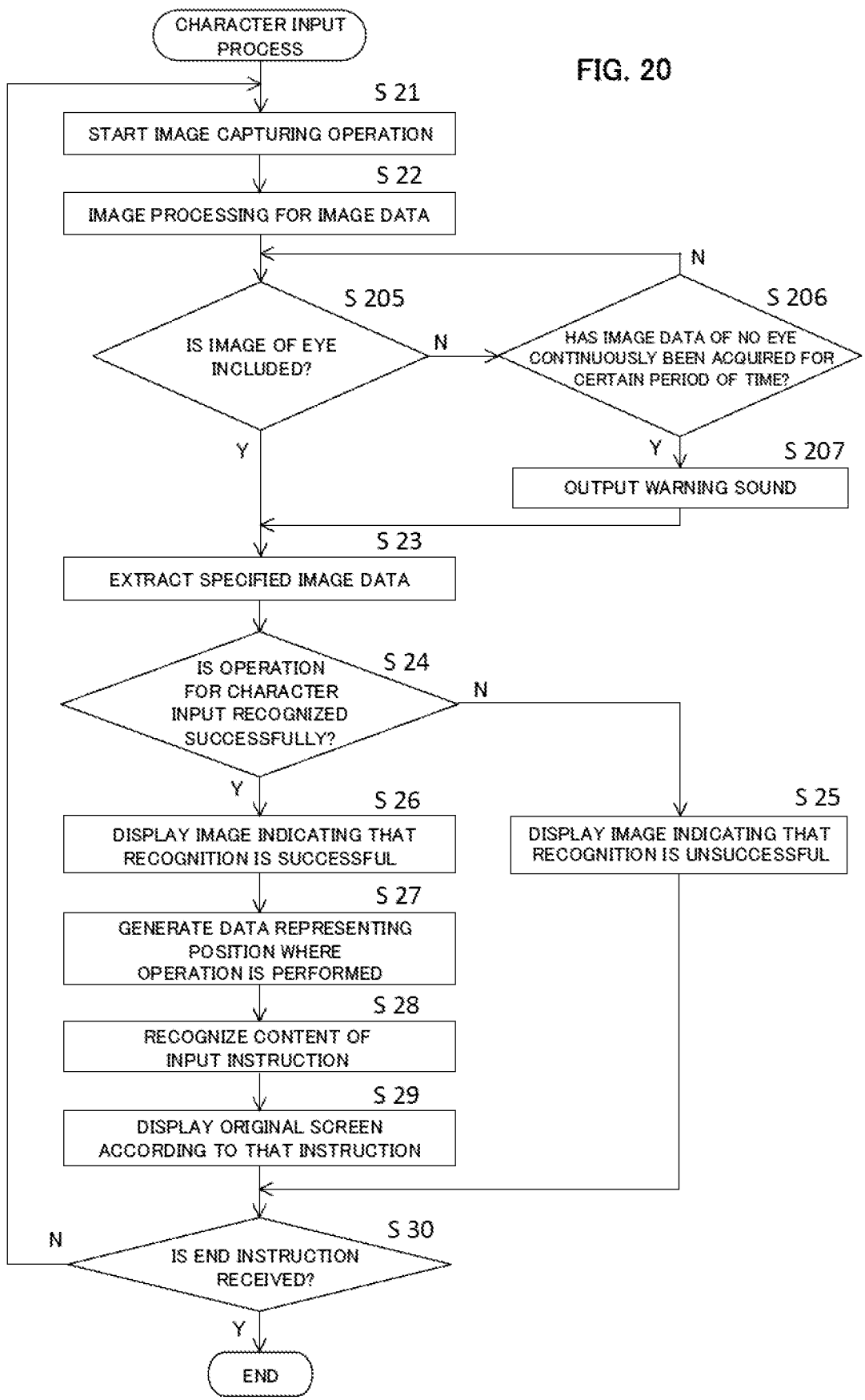
FIG. 20 is a flowchart of the procedure for a character input process in the glasses-type terminal according to the fourth embodiment.

Next, a character input process in the glasses-type terminal 1c according to the fourth embodiment will be described. FIG. 20 is a flowchart of the procedure for the character input process in the glasses-type terminal 1c according to the fourth embodiment. In the flowchart of FIG. 20, the processing having the same content as the flowchart of FIG. 11 in the above-described first embodiment is given the same step reference numerals, and detailed description thereof will be omitted.

It is assumed that the character input screen 200 is previously displayed on the display apparatus 20 as the original screen M. The user issues an instruction to input characters by voice through the microphone unit 50, or to input characters through an operation using the touch pad unit 40 or the like. In response to receiving the instruction, the control unit 70c reads the character input processing program from the storage unit 90 to perform the character input process according to the processing flow illustrated in FIG. 20.

According to the processing flow illustrated in FIG. 20, the control unit 70c first controls the image capturing apparatus 30 to start an image capturing operation for capturing an image of the eye of the user (S21). The user performs a predetermined operation, for example, a tap operation on the keyboard image 210 of the character input screen 200, which is the visual confirmation screen S corresponding to the original screen M currently displayed on the display apparatus 20, with a finger. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70c (S22).

Next, the eye presence/absence determination unit 704 determines whether or not the transmitted image data includes an image of an eye by using a general image recognition method (S205). If the eye presence/absence determination unit 704 determines that the image data includes the image of the eye, the eye presence/absence determination unit 704 transmits the image data to the image data extraction unit 72. After that, the process proceeds to step S23. On the other hand, if the eye presence/absence determination unit 704 determines that the image data does not include the image of the eye, the eye presence/absence determination unit 704 does not transmit the image data to the image data extraction unit 72. Then, in this case, the eye presence/absence determination unit 704 determines whether or not the image data not including the image of the eye of the user has been continuously acquired by the image capturing apparatus 30 for a certain period of time (S206). If the image data not including the image of the eye of the user has not been continuously acquired by the image capturing apparatus 30 for the certain period of time, the process proceeds to step S205. On the other hand, if the eye presence/absence determination unit 704 determines that the image data not including the image of the eye of the user has been continuously acquired by the image capturing apparatus 30 for the certain period of time, the eye presence/absence determination unit 704 transmits a signal indicating no continuous eye image to the notification control unit 705.

In response to receiving the signal, the notification control unit 705 recognizes that the user is dozing off, and controls the speaker unit 60 to output a predetermined warning sound from the speaker unit 60 (S207). After that, the process proceeds to step S204.

Then, at step S23, the image data extraction unit 72 determines whether or not the image data transmitted from the eye presence/absence determination unit 704 (image data including the image of the eye of the user) includes an image of a finger by using a general image recognition method to extract image data that includes the image of the finger from a series of the image data of images captured by the image capturing apparatus 30. After that, the process proceeds to step S24. The processes of step S24 and the subsequent steps are the same as the processing according to the flowchart of FIG. 11 in the first embodiment.

Figure 21:
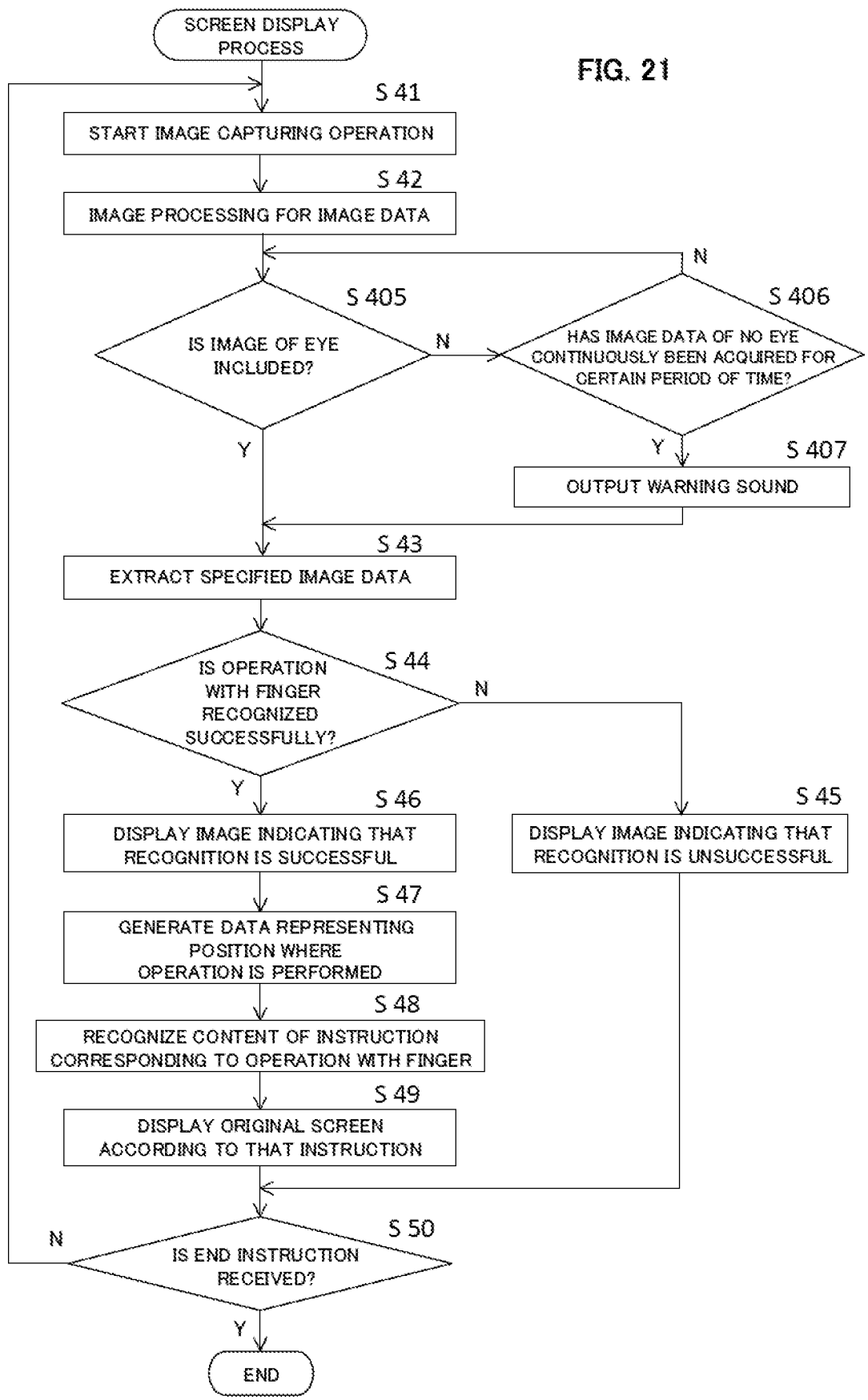
FIG. 21 is a flowchart of the procedure for a screen display process in the glasses-type terminal according to the fourth embodiment.

Next, a screen display process in the glasses-type terminal 1c according to the fourth embodiment will be described. FIG. 21 is a flowchart of the procedure for the screen display process in the glasses-type terminal 1c according to the fourth embodiment. In the flowchart of FIG. 21, the processing having the same content as the flowchart of FIG. 12 in the above-described first embodiment is given the same step reference numerals, and detailed description thereof will be omitted.

It is assumed that the original screen M is previously displayed on the display apparatus 20. The user issues an instruction to perform an operation for screen display by voice through the microphone unit 50, or an instruction to perform an operation for screen display by an operation using the touch pad unit 40 or the like. In response to receiving the instruction, the control unit 70c reads the screen display processing program from the storage unit 90 to perform the screen display process according to the processing flow illustrated in FIG. 21.

According to the processing flow illustrated in FIG. 21, the control unit 70c first controls the image capturing apparatus 30 to start an image capturing operation for capturing an image of the eye of the user (S41). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 30, and the image data thus obtained by the image capturing apparatus 30 is transmitted to the image processing unit 32. Then, the image processing unit 32 performs predetermined image processing on the image data, and the image data subjected to the image processing is transmitted to the control unit 70c (S42).

Next, the eye presence/absence determination unit 704 determines whether or not the transmitted image data includes an image of an eye by using a general image recognition method (S405). If the eye presence/absence determination unit 704 determines that the image data includes the image of the eye, the eye presence/absence determination unit 704 transmits the image data to the image data extraction unit 72. After that, the process proceeds to step S43. On the other hand, if the eye presence/absence determination unit 704 determines that the image data does not include the image of the eye, the eye presence/absence determination unit 704 does not transmit the image data to the image data extraction unit 72. Then, in this case, the eye presence/absence determination unit 704 determines whether or not the image data not including the image of the eye of the user has been continuously acquired by the image capturing apparatus 30 for a certain period of time (S406). If the image data not including the image of the eye of the user has not been continuously acquired by the image capturing apparatus 30 for the certain period of time, the process proceeds to step S405. On the other hand, if the eye presence/absence determination unit 704 determines that the image data not including the image of the eye of the user has been continuously acquired by the image capturing apparatus 30 for the certain period of time, the eye presence/absence determination unit 704 transmits a signal indicating no continuous eye image to the notification control unit 705. In response to receiving the signal, the notification control unit 705 recognizes that the user is dozing off, and controls the speaker unit 60 to output a predetermined warning sound from the speaker unit 60 (S407). After that, the process proceeds to step S43.

Then, at step S43, the image data extraction unit 72 determines whether or not the image data transmitted from the eye presence/absence determination unit 704 (image data including the image of the eye of the user) includes an image of a finger by using a general image recognition method to extract image data that includes the image of the finger from a series of the image data of images captured by the image capturing apparatus 30. After that, the process proceeds to step S44. The processes of step S44 and the subsequent steps are the same as the processing according to the flowchart of FIG. 12 in the first embodiment.

The glasses-type terminal according to the fourth embodiment has the same advantageous effects as the first embodiment described above. Accordingly, using the glasses-type terminal according to the fourth embodiment makes it possible for the user to easily and accurately perform character input operations and various screen operations such as enlargement and reduction by operating the visual confirmation screen in the same manner as in typical smartphone terminals or tablet terminals.

In particular, the glasses-type terminal according to the fourth embodiment includes an eye presence/absence determination unit configured to determine whether or not the image data of the image captured by the image capturing apparatus includes an image of the eye of the user to detect that image data not including the image of the eye of the user has been continuously acquired by the image capturing apparatus for a certain period of time; and a notification control unit configured such that when the eye presence/absence determination unit detects that image data not including the image of the eye of the user has been continuously acquired by the image capturing apparatus for the certain period of time, the notification control unit controls a speaker unit to output sound from the speaker unit. As a result, for example, in a case where a driver of an automobile wears the glasses-type terminal according to the fourth embodiment, when the eye presence/absence determination unit detects that image data not including an image of an eye of the driver has been continuously acquired by the image capturing apparatus for the certain period of time, the notification control unit causes the speaker unit to output an alarm, so that it is possible to prevent dozing driving.

Fifth Embodiment

Figure 34A:
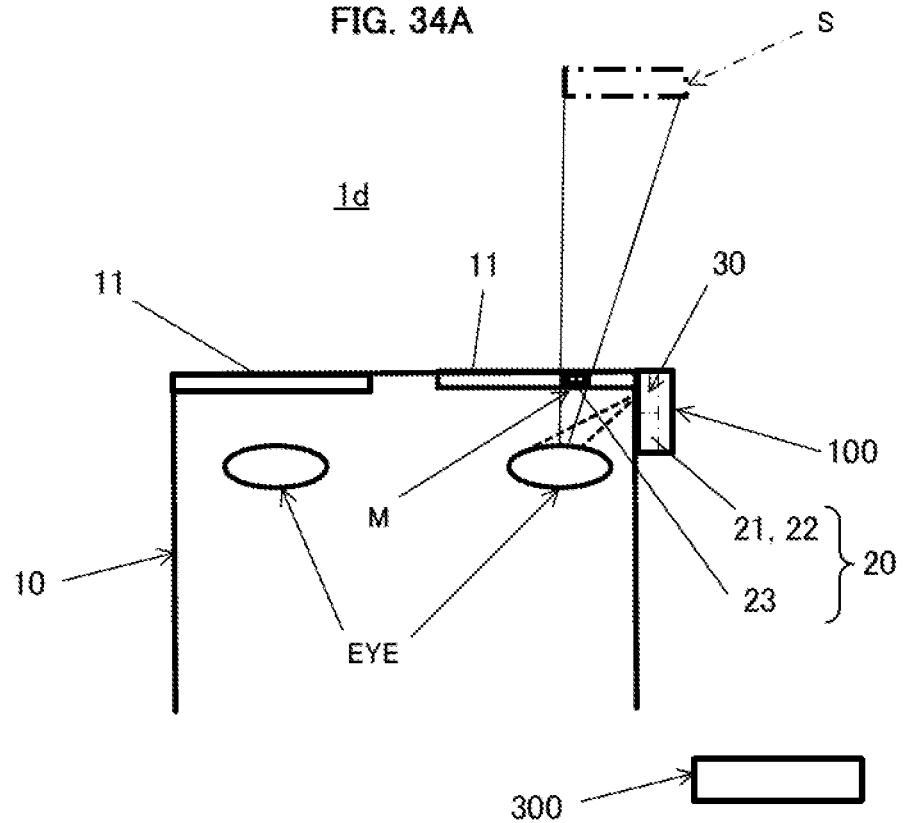
FIG. 34A is a schematic plan view of a glasses-type terminal according to a fifth embodiment of the present invention.
Figure 34B:
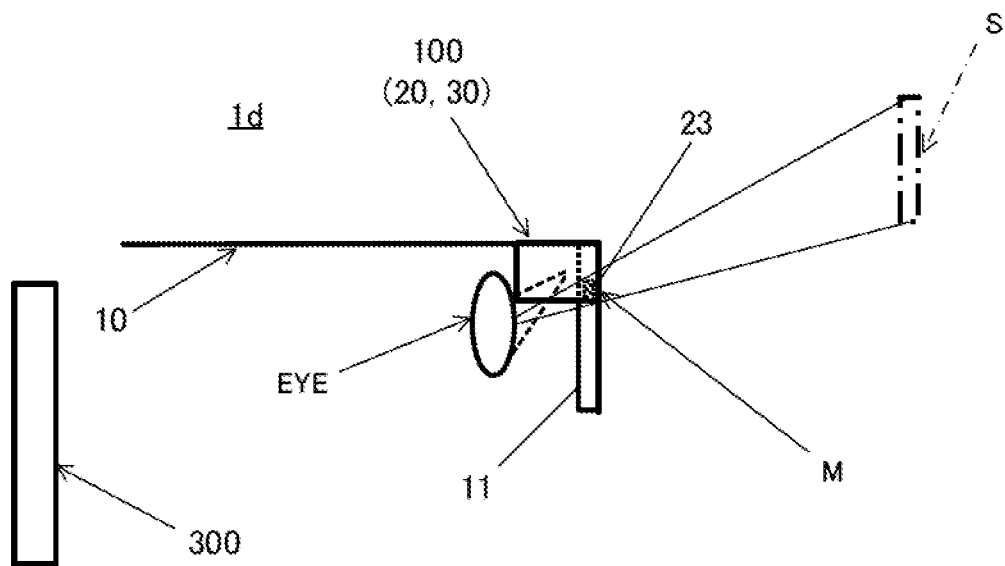
FIG. 34B is a schematic right side view of the glasses-type terminal.
Figure 35:
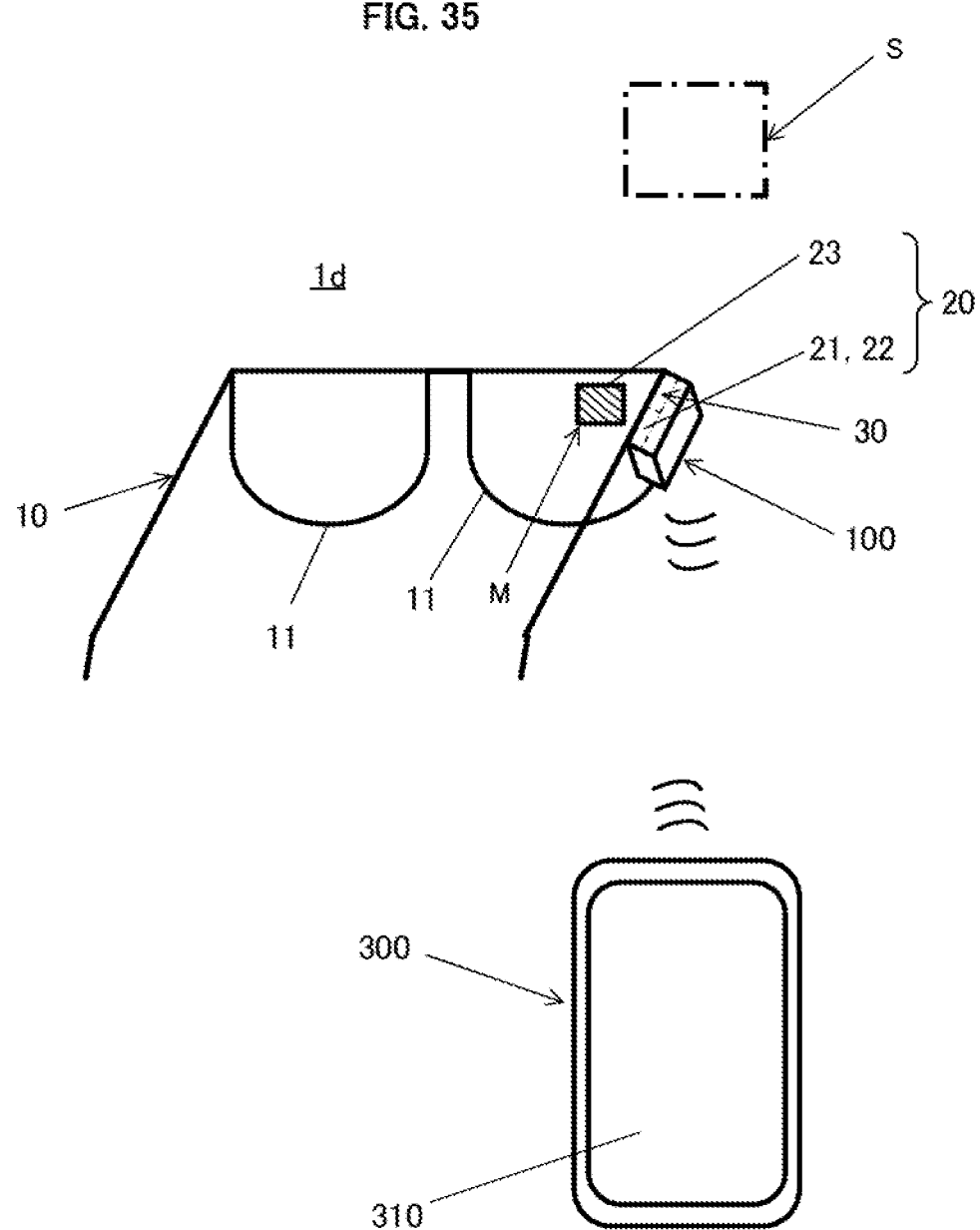
FIG. 35 is a schematic perspective view of the glasses-type terminal according to the fifth embodiment.

Next, a glasses-type terminal according to a fifth embodiment of the present invention will be described. FIG. 34A is a schematic plan view of the glasses-type terminal according to the fifth embodiment of the present invention, and FIG. 34B is a schematic right side view of the glasses-type terminal. FIG. 35 is a schematic perspective view of the glasses-type terminal according to the fifth embodiment. Further, FIG. 36 is a schematic block diagram of the glasses-type terminal according to the fifth embodiment. In the fifth embodiment, the apparatuses/units having the same functions as those of the first embodiment described above are designated by the same reference numerals, and detailed description thereof will be omitted.

As illustrated in FIGS. 34, 35, and 36, the glasses-type terminal 1d according to the fifth embodiment includes the main body (a pair of glasses) 10 having the lens parts 11 to which lenses are attached, the display apparatus 20 mounted on the main body 10, the image capturing apparatus 30 for capturing an image of an eye of the user, the touch pad unit 40, the microphone unit 50, the speaker unit 60, the communication unit 80, and a terminal apparatus 300 being separate from the main body 10 and including a display unit 310. The terminal apparatus 300 is wirelessly connected to the components such as the display apparatus 20 and the image capturing apparatus 30. In order to simplify the description of the terminal apparatus 300, parts which are closely related to the present invention will be described in detail, and the description of the other parts will be omitted.

This glasses-type terminal 1d according to the fifth embodiment mainly differs from the glasses-type terminal 1 according to the first embodiment in that: the glasses-type terminal 1d includes the terminal apparatus 300 separate from the main body 10 and having the display unit 310; the terminal apparatus 300 controls the display apparatus 20, the image capturing apparatus 30, the touch pad unit 40, the microphone unit 50, and the speaker unit 60; and the terminal apparatus 300 has a function of controlling the display apparatus 20 to display on the display apparatus 20 a screen displayed on the display unit 310 as the original screen. The other configurations of the glasses-type terminal 1d according to the fifth embodiment are the same as those of the glasses-type terminal 1 according to the first embodiment.

As illustrated in FIGS. 34 and 35, the display apparatus 20 includes the small projector 21 having, for example, a liquid crystal panel (display device), the optical system 22, and the hologram sheet (or hologram film) 23 that reflects part of light (video). The small projector 21 and the optical system 22 are arranged in the single housing 100, and the housing 100 is attached to a temple portion of a pair of glasses (main body 10). The image capturing apparatus 30 is also arranged in the housing 100. As illustrated in FIG. 36, the image capturing apparatus 30 includes the camera unit 31, the image processing unit 32, and the camera control unit 33. The housing 100 is attachable to and detachable from the main body 10. Specifically, the small projector 21, the optical system 22, and the image capturing apparatus 30 are each attachable to and detachable from the main body 10.

Further, in the housing 100, the communication unit 80, a power supply unit (not illustrated) such as a battery, and a power switch (not illustrated) are provided. The communication unit 80 performs wireless communication between the terminal apparatus 300 and the various apparatuses and units mounted on the main body 10 (display apparatus 20, image capturing apparatus 30, touch pad unit 40, microphone unit 50, and speaker unit 60). The display apparatus 20, the image capturing apparatus 30, the touch pad unit 40, the microphone unit 50, and the speaker unit 60 are controlled by the terminal apparatus 300 through wireless communication. Accordingly, in the fifth embodiment, unlike the first embodiment, any control unit is not included in the housing 100. The power supply unit supplies electric power to the various apparatuses and units mounted on the main body 10 (display apparatus 20, image capturing apparatus 30, touch pad unit 40, microphone unit 50, speaker unit 60, and communication unit 80). Further, the power switch turns on and off the power supply from the power supply unit to the apparatuses and units such as the display apparatus 20 and the image capturing apparatus 30. This power switch is attached to a predetermined position on the surface of the housing 100.

In the fifth embodiment, the terminal apparatus 300 controls the display apparatus 20, the image capturing apparatus 30, the touch pad unit 40, the microphone unit 50, and the speaker unit 60. The terminal apparatus 300 as used herein is an existing mobile terminal such as a smartphone or a tablet terminal. As illustrated in FIG. 36, the terminal apparatus 300 includes the display unit 310, a communication unit 320, a control unit 700, and a storage unit 900. The display unit 310 is a liquid crystal display device provided on the surface of the terminal apparatus 300. Further, a touch panel is provided on the screen of the display unit 310. This touch panel includes a position detection unit configured to detect a touch position where a touch operation is performed on the screen of the display unit 310 and output touch position information indicating the detected touch position to the control unit 700. On the screen of the display unit 310, various screens are displayed such as a home screen, a menu screen, an application screen, and a character input screen. By performing a touch operation on such screens, the user can issue various instructions to the terminal apparatus 300.

Further, the terminal apparatus 300 has a function of performing wireless communication with external devices. This function is implemented in the communication unit 320. Of course, the terminal apparatus 300 can perform wireless communication with the display apparatus 20, the image capturing apparatus 30, and the like via the communication unit 320 and the communication unit 80 included in the housing 100. In this respect, the terminal apparatus 300 is wirelessly connected to the display apparatus 20, the image capturing apparatus 30, and the like. As a method of wireless communication between the terminal apparatus 300 and the display apparatus 20, the image capturing apparatus 30, and the like, for example, Bluetooth may be used. Further, from the perspective of security, the terminal apparatus 300, the display apparatus 20, and the image capturing apparatus 30 each perform data communication after performing authentication based on identification information transmitted from the other party to perform wireless communication.

The storage unit 900 of the terminal apparatus 300 stores various programs, data, and the like. Examples of the programs stored in the storage unit 900 include a character input processing program for performing a character input process based on an operation performed on a character input screen in the case where the original screen M is the character input screen, and a screen display processing program for performing a screen display process such as enlargement, reduction, and switching of the original screen M corresponding to the visual confirmation screen S based on an operation performed on the visual confirmation screen S. Examples of the data stored in the storage unit 900 include image data of various original screens M and data on each original screen M (specifically, data indicating the size, shape, content, arrangement, and the like of the original screen M).

In particular, in the fifth embodiment, the storage unit 900 stores, for example, a special display apparatus control program by which the terminal apparatus 300 controls the display apparatus 20. This display apparatus control program is an application program by which the control unit 700 implements a function of controlling the display apparatus 20 to display on the display apparatus 20 a screen displayed on the display unit 310 as the original screen M. When the display apparatus control program is executed by the control unit 700, the screen displayed on the display unit 310 is displayed not only on the display unit 310 but also on the display apparatus 20.

In addition, when the display apparatus control program is executed, a setting screen for that program is displayed on the display unit 310. In the setting screen, a plurality of buttons for making the settings of screen display of the display apparatus 20 are arranged. Specifically, the buttons for making the settings of screen display of the display apparatus 20 include: a button B1 for issuing an instruction in which a screen in which the screen displayed on the display unit 310 is simplified is to be displayed on the display apparatus 20; a button B2 for issuing an instruction in which a part of the screen displayed on the display unit 310 is to be displayed on the display apparatus 20; and a button B3 for issuing an instruction in which a screen in which characters and charts (figures, photographs, tables, etc.) in the screen displayed on the display unit 310 are enlarged is to be displayed on the display apparatus 20. Further, arranged in the setting screen for the display apparatus control program are a button B4 for setting that the display unit 310 is to be turned off to display on the display apparatus 20 the screen displayed on the display unit 310 as the original screen M, and a button B5 for issuing an instruction to end that program. The button B4 makes it possible to provide the setting whether the display of the screen on the display unit 310 is maintained as it is or the display unit 310 is turned off, when displaying on the display apparatus 20 the content of the screen displayed on the display unit 310. Further, when the display unit 310 of the terminal apparatus 300 is turned on, the user can turn off the display unit 310 by pressing the power button of the terminal apparatus 300. On the contrary, when the display unit 310 of the terminal apparatus 300 is turned off, the user can cancel the off state of the display unit 310 by pressing the power button of the terminal apparatus 300.

In this way, when the display apparatus control program is executed, the screen displayed on the display unit 310 is displayed on the display apparatus 20, and as a result, the same screen is displayed on the display unit 310 and the display apparatus 20. However, by using the setting screen for the display apparatus control program, the user can specify that a screen having a content different from the content of the screen displayed on the display unit 310 is to be displayed on the display apparatus 20. For example, the setting screen for the display apparatus control program has a field for specifying a screen to be displayed on the display apparatus 20. When the user uses this field to specify a screen to be displayed on the display apparatus 20, the control unit 700 displays the screen specified by the user, not the screen currently displayed on the display unit 310, on the display apparatus 20. As a result, in this case, different screens are displayed on the display unit 310 and the display apparatus 20 respectively.

The control unit 700 includes a central processing unit (CPU) and the like to control the entire terminal apparatus 300 and also control the display apparatus 20, the image capturing apparatus 30, the touch pad unit 40, the microphone unit 50, and the speaker unit 60. For example, when the user performs a touch operation on the display unit 310, the control unit 700 recognizes the content of the instruction issued by the operation, and executes processing according to the recognized content. Further, the control unit 700 executes the display apparatus control program to control the display apparatus 20 to display on the display apparatus 20 the screen displayed on the display unit 310 as the original screen M. Furthermore, the control unit 700 controls the display apparatus 20 to display the original screen M, and controls the image capturing apparatus 30 to capture images.

Specifically, as illustrated in FIG. 36, the control unit 700 includes a display control unit 710, the image data extraction unit 72, the operation determination unit 73, the operation position identification unit 74, and the input control unit 75. Also in the glasses-type terminal 1*d* according to the fifth embodiment, as in the glasses-type terminal 1 according to the first embodiment, when the user performs an operation on the visual confirmation screen S with a finger, the input control unit 75 recognizes the content of an input instruction corresponding to the operation performed with the finger, based on data on the content of the operation performed with the finger, determined by the operation determination unit 73, data on the position on the original screen M where the operation is performed with the finger, obtained by the operation position identification unit 74, and the data on the original screen M stored in the storage unit 900, and controls a screen to be displayed on the display unit 310 and the original screen M to be displayed on the display apparatus 20 according to the recognized content of the input instruction. This makes it possible for the user to input an instruction corresponding to an operation by performing, on the visual confirmation screen S that the user looks at, the same operation as in operating a screen displayed on a typical touch panel.

The display control unit 710 controls the display on the display unit 310 and the display apparatus 20. Specifically, when the user issues an instruction to start the display apparatus control program, the display control unit 710 executes the display apparatus control program stored in the storage unit 900 to display on the display apparatus 20 the screen displayed on the display unit 310 as the original screen M. This makes it possible for the user who uses the glasses-type terminal 1*d* according to the fifth embodiment to see the visual confirmation screen S corresponding to the original screen M to be floating in midair. However, if the user has made the various settings on the setting screen for the display apparatus control program, the display control unit 710 controls the display unit 310 and the display apparatus 20 according to the settings.

In the glasses-type terminal 1*d* according to the fifth embodiment, since the screen of the display unit 310 is provided with the touch panel, the user can issue various instructions to the control unit 700 of the terminal apparatus 300 by performing a touch operation on the screen of the display unit 310 with a finger. Further, when the display apparatus control program is executed and the screen displayed on the display unit 310 is displayed on the display apparatus 20, the user can issue various instructions to the control unit 700 of the terminal apparatus 300 by performing a touch operation on the visual confirmation screen S with a finger.

Figure 37:
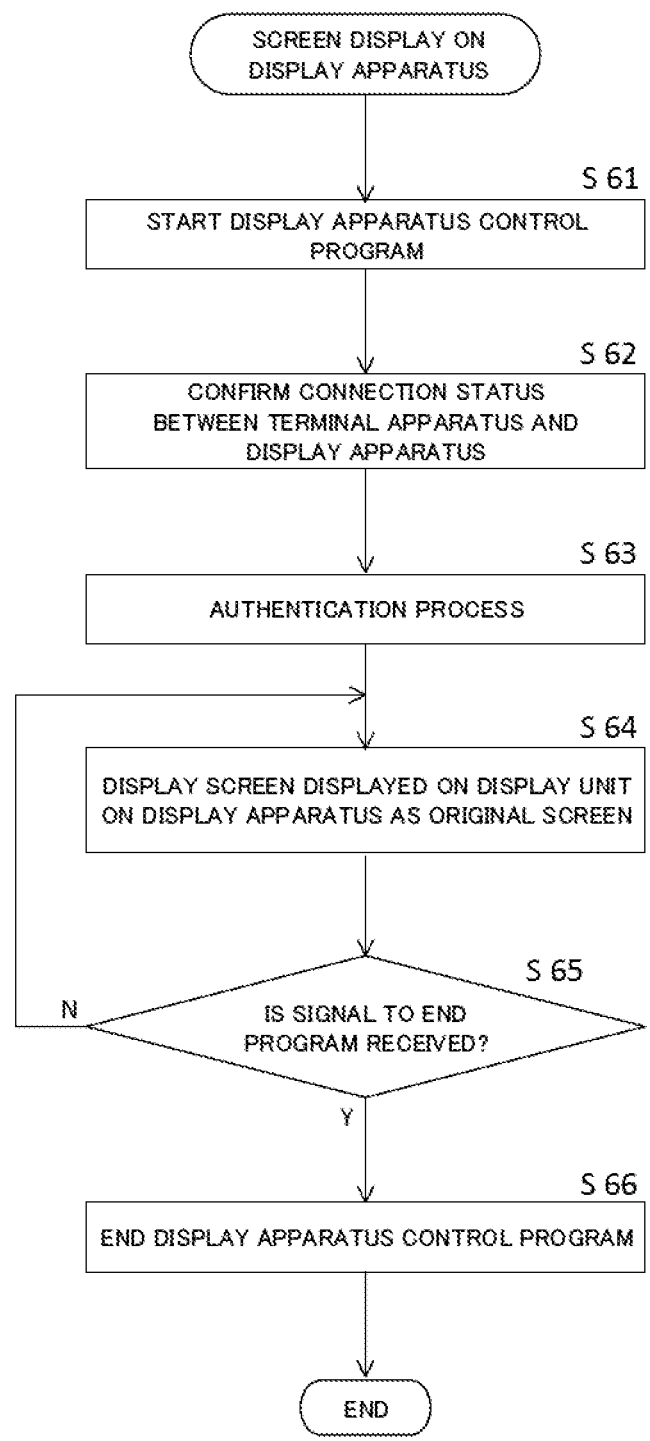
FIG. 37 is a flowchart of the procedure for a process of displaying a screen on a display apparatus in accordance with a display apparatus control program in the glasses-type terminal according to the fifth embodiment.

Next, a process of displaying a screen on the display apparatus 20 in accordance with the display apparatus control program in the glasses-type terminal 1*d* according to the fifth embodiment will be described. FIG. 37 is a flowchart of the procedure for the process of displaying a screen on the display apparatus 20 in accordance with the display apparatus control program in the glasses-type terminal 1d according to the fifth embodiment.

The user first turns on the power switch provided in the housing 100. As a result, the display apparatus 20 and the communication unit 80 come to a power-on state. Here, it is assumed that the user operates while wearing the pair of glasses (main body 10). Next, the user operates the terminal apparatus 300 to display a menu screen on the display unit 310. Then, the user taps the icon for the display apparatus control program on the menu screen to select the display apparatus control program. In response to receiving a signal indicating that the display apparatus control program has been selected, the control unit 700 of the terminal apparatus 300 starts the display apparatus control program (S61). When the display apparatus control program is started, the control unit 700 performs processing according to the display apparatus control program. Specifically, the control unit 700 first performs a process of confirming the connection state between the terminal apparatus 300 and the display apparatus 20 (S62). When the connection is confirmed, the control unit 700 requests the display apparatus 20 to transmit the identification information, and performs an authentication process based on the identification information transmitted from the display apparatus 20 (S63). When the display apparatus 20 is thus authenticated, the control unit 700 displays the setting screen for the display apparatus control program on the display unit 310. Then, the control unit 700 wirelessly transmits data on the screen currently displayed on the display unit 310 to the display apparatus 20, and causes the display apparatus 20 to display the screen displayed on the display unit 310 as the original screen M (S64). This makes it possible for the user to feel and see the visual confirmation screen S corresponding to the original screen M through the pair of glasses (main body 10) to be floating in midair. After that, when the user operates the terminal apparatus 300 to for example select a desired application program, the control unit 700 executes the application program, displays a screen for the application program on the display unit 310, and wirelessly transmits data on the screen to the display apparatus 20 to cause the display apparatus 20 to display the same screen as the screen displayed on the display unit 310. As a result, the user can see the visual confirmation screen S for the screen for the application program through the pair of glasses (main body 10) to be floating in midair.

Figure 38:
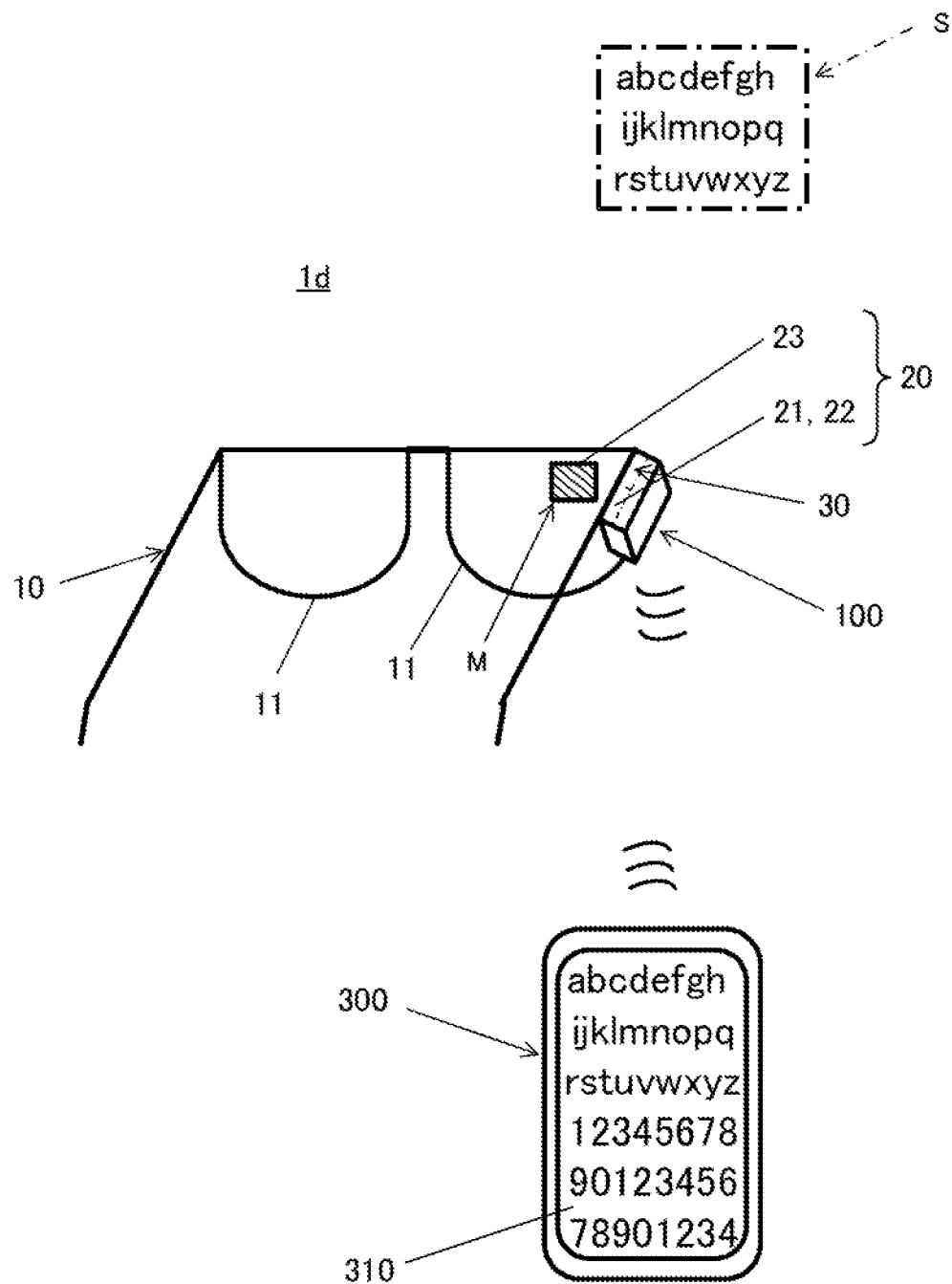
FIG. 38 illustrates an example of a visual confirmation screen when a part of a screen of a display unit is displayed on the display apparatus.
Figure 39:
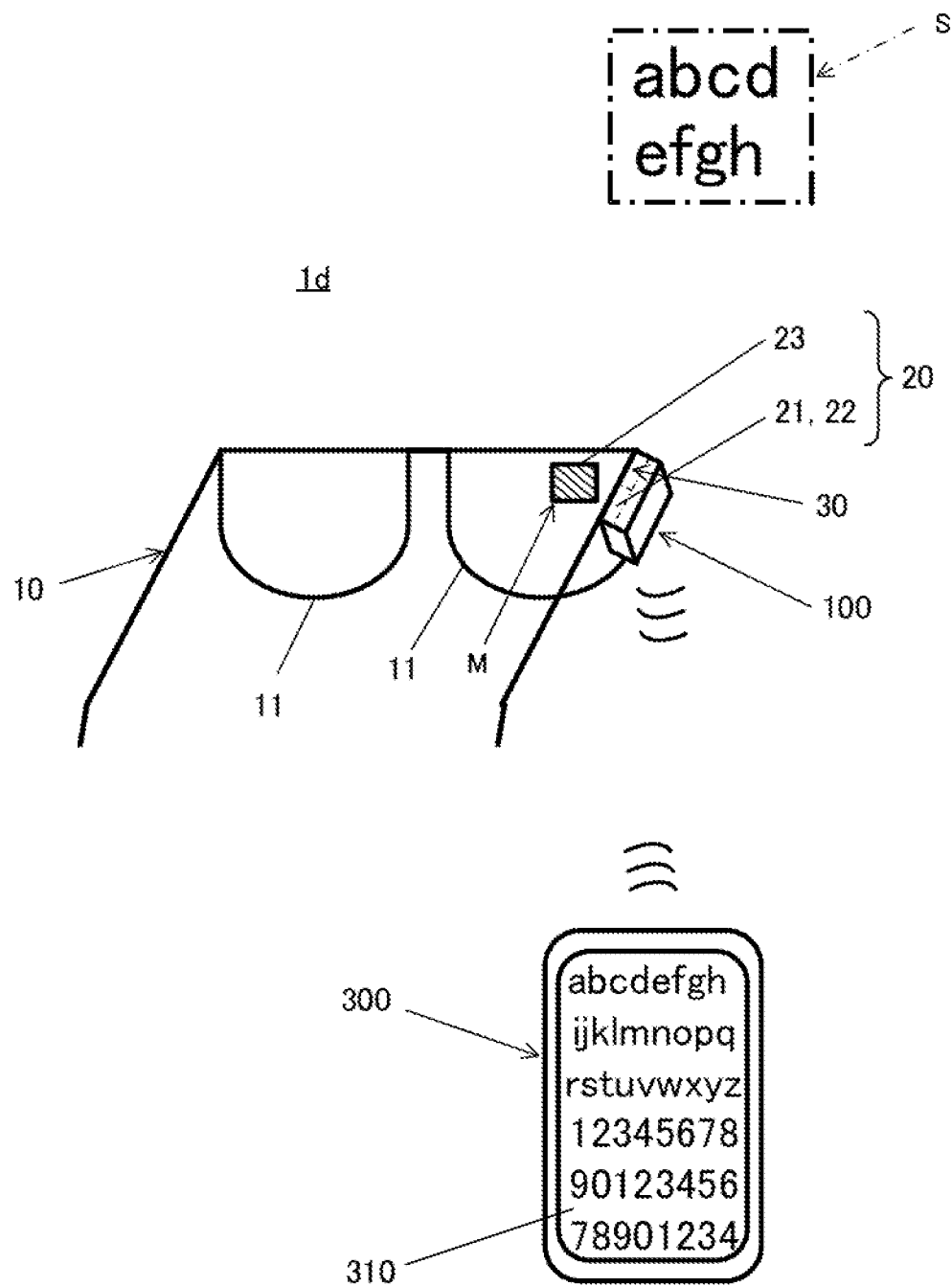
FIG. 39 illustrates an example of a visual confirmation screen when a screen obtained by enlarging characters displayed on the screen of the display unit is displayed on the display apparatus.

Incidentally, when the screen displayed on the display unit 310 is displayed on the display apparatus 20, the user may feel that it is hard to recognize the content of the visual confirmation screen S corresponding to the original screen M because of, for example, fine characters and the like displayed on the original screen M. In this case, the user can tap the button B2 or the button B3 in the setting screen for the display apparatus control program, which is displayed on the display unit 310. When the user taps the button B2, the control unit 700 transmits data on a part of the screen displayed on the display unit 310 to the display apparatus 20, and as a result, the part of the screen displayed on the display unit 310 is displayed on the display apparatus 20. FIG. 38 illustrates an example of the visual confirmation screen S when a part of the screen of the display unit 310 is displayed on the display apparatus 20. In the example of FIG. 38, almost half of the screen displayed on the display unit 310 is displayed on the display apparatus 20. When the user sees the almost half of the screen displayed on the display apparatus 20, the user can recognize the visual confirmation screen S corresponding to the almost half of the screen. In this case, the almost half of the screen displayed on the display apparatus 20 is displayed larger than the almost half of the screen when the entire screen is displayed on the display apparatus 20, so that it is easy for the user to recognize the content of the visual confirmation screen S. On the other hand, in a case where a screen including characters and charts is displayed on the display unit 310, when the user taps the button B3, the control unit 700 transmits to the display apparatus 20 data on a screen in which the characters and charts are enlarged in the screen displayed on the display unit 310, and as a result, the screen in which the characters and charts are enlarged in the screen displayed on the display unit 310 is displayed on the display apparatus 20. FIG. 39 illustrates an example of the visual confirmation screen S when a screen obtained by enlarging characters displayed on the screen of the display unit 310 is displayed on the display apparatus 20. With this configuration, as illustrated in FIG. 39, the user can see the screen in which the characters are enlarged as the visual confirmation screen S, so that the characters on the screen can be correctly recognized. FIG. 39 illustrates the example of the screen with only characters, but also in a case where a screen with charts is displayed on the display unit 310, the user can see as the visual confirmation screen S the screen in which not only the characters but also the charts are enlarged, so that the contents of the characters and the charts can be accurately recognized.

Further, in the examples of FIGS. 38 and 39, when the user performs a predetermined operation, for example, a drag operation or a flick operation on the visual confirmation screen S with a finger, the control unit 700 may be configured such that when recognizing that the drag or flick operation has been performed based on the image data of the image captured by the image capturing apparatus 30 or the like, the control unit 700 causes the display apparatus 20 to display a screen in which the screen displayed on the display unit 310 is scrolled. The scrolling screen makes it possible for the user to see other parts of screen that are not yet displayed on the display apparatus 20.

To end the screen display on the display apparatus 20, the user causes the display unit 310 of the terminal apparatus 300 to display the setting screen for the display apparatus control program, and taps the button B5 for issuing an instruction to end the display apparatus control program, provided in the setting screen. In response to receiving a signal indicating that the display apparatus control program is to be ended (S65), the control unit 700 ends the display apparatus control program (S66). Alternatively, when the user taps the button B5 on the visual confirmation screen S (the setting screen for the display apparatus control program) with a finger, the control unit 700 may be configured to recognize that the tap operation has been performed on the button B5 and end the display apparatus control program. As a result, the control unit 700 stops transmitting the data on the screen to the display apparatus 20, and accordingly, nothing is displayed on the screen of the display apparatus 20. Finally, the user turns off the power switch provided in the housing 100. Note that, when the user performs a tap operation on a predetermined icon in the visual confirmation screen S with a finger in the case where the icon is displayed at a predetermined position (e.g., the position of the lower corner) in the screen for the application program, the control unit 700 may recognize that the tap operation has been performed on the icon and end the display apparatus control program.

Next, a specific usage example of the glasses-type terminal 1d according to the fifth embodiment will be described. Now consider a case where the terminal apparatus 300 is a mobile terminal and the terminal apparatus 300 has a GPS (Global Positioning System) function for acquiring position information of its own position.

Figure 40:
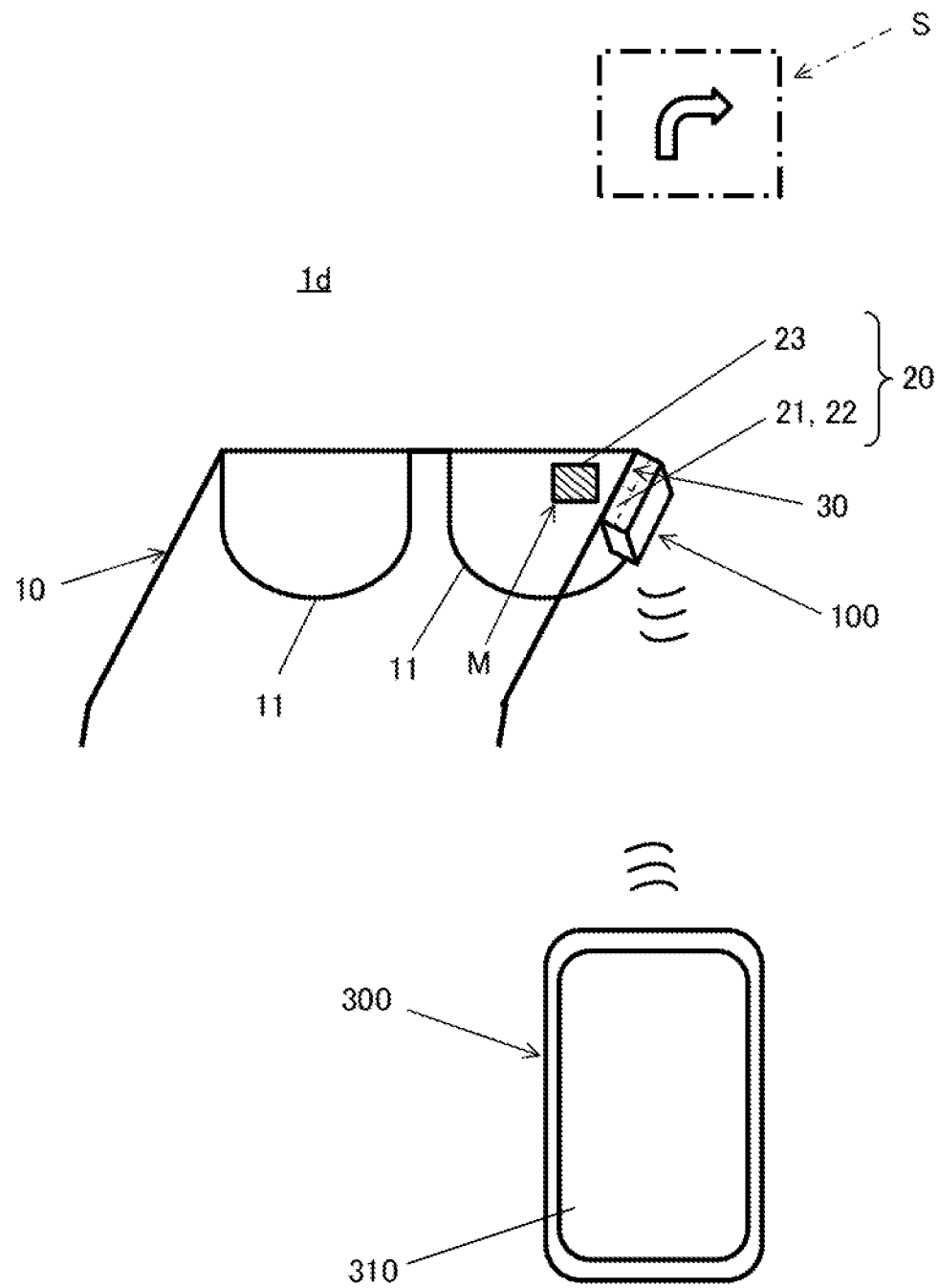
FIG. 40 is a diagram illustrating an example of a visual confirmation screen when a screen for a route guidance application program is displayed on the display apparatus as an original screen.

A first example is that a route guidance application program is installed on the terminal apparatus 300. The route guidance application program causes the control unit 700 to implement a function for generating a screen for guiding the user from the current position to a destination set by the user based on map information stored in the storage unit 900 and the position information obtained by the GPS function, and displaying the generated screen on the display unit 310. In this case, when the user operates the terminal apparatus 300 to instruct the execution of the route guidance application program during the execution of the display apparatus control program, the control unit 700 starts the route guidance application program to display on the display unit 310 a screen for guiding the user to the destination set by the user as a screen for the route guidance application program, and also to display that screen as the original screen M on the display apparatus 20. FIG. 40 is a diagram illustrating an example of the visual confirmation screen S when the screen for the route guidance application program is displayed on the display apparatus 20 as the original screen M. In FIG. 40, an image of an arrow indicating a direction for the user to go is displayed as the screen for guiding the user to the destination. The user can reach the destination by looking at the visual confirmation screen S and going according to the direction of the arrow displayed there.

In the above example, a case has been described in which the control unit 700 executes the route guidance application program to display a screen (e.g., arrow image screen) for guiding the user to the destination on the display unit 310 and the display apparatus 20. However, the control unit 700 may execute the route guidance application program to display map information indicating the user's current position or map information indicating the user's current position and destination on the display unit 310 and to display a screen (e.g., arrow image screen) for guiding the user to the destination on the display apparatus 20.

A second example is that a shop search application program is installed on the terminal apparatus 300. The shop search application program causes the control unit 700 to implement a function for searching for shops around the current position based on the map information stored in the storage unit 900 and the position information obtained by the GPS function, and displaying information about the retrieved shops on the display unit 310. In this case, when the user operates the terminal apparatus 300 to instruct the execution of the shop search application program during the execution of the display apparatus control program, the control unit 700 starts the shop search application program to display on the display unit 310 a screen with the information about the shops around the current position as a screen for the shop search application program, and also to display that screen as the original screen M on the display apparatus 20. The user can obtain the information about the stores around the current position by looking at the visual confirmation screen S corresponding to the original screen M.

Note that, in the above-mentioned examples, the map information does not necessarily have to be stored in the storage unit 900 in advance. For example, when the control unit 700 starts the route guidance application program or the shop search application program, the control unit 700 may access a predetermined site on the Internet to use the map information on the site.

The glasses-type terminal according to the fifth embodiment has the same advantageous effects as the first embodiment described above. Accordingly, using the glasses-type terminal according to the fifth embodiment makes it possible for the user to easily and accurately perform character input operations and various screen operations such as enlargement and reduction by operating the visual confirmation screen in the same manner as in typical smartphone terminals or tablet terminals.

In particular, in the glasses-type terminal according to the fifth embodiment, the main body serving as a pair of glasses is separate from the terminal apparatus including the control unit for controlling the components such as the display apparatus and the image capturing apparatus which are provided in the main body. Therefore, for example, an existing mobile terminal such as a smartphone or a tablet terminal can be used as the terminal apparatus. Such a use of an existing mobile terminal or the like as the terminal apparatus makes it possible to reduce the number of parts of the main body serving as a pair of glasses, resulting in a simplified main body. In addition, the use of a commercially available smartphone or the like as the terminal apparatus makes it possible to perform the operation using such a smartphone or the like that is familiar to the user, so that the operability can be improved.

The configuration described in the fifth embodiment in which the main body is separate from the terminal apparatus and the terminal apparatus is wirelessly connected to the components such as the display apparatus and the image capturing apparatus can be applied to not only the glasses-type terminal according to the first embodiment but also the glasses-type terminals according to the other embodiments described above (second, third, and fourth embodiments).

Sixth Embodiment

Figure 41:
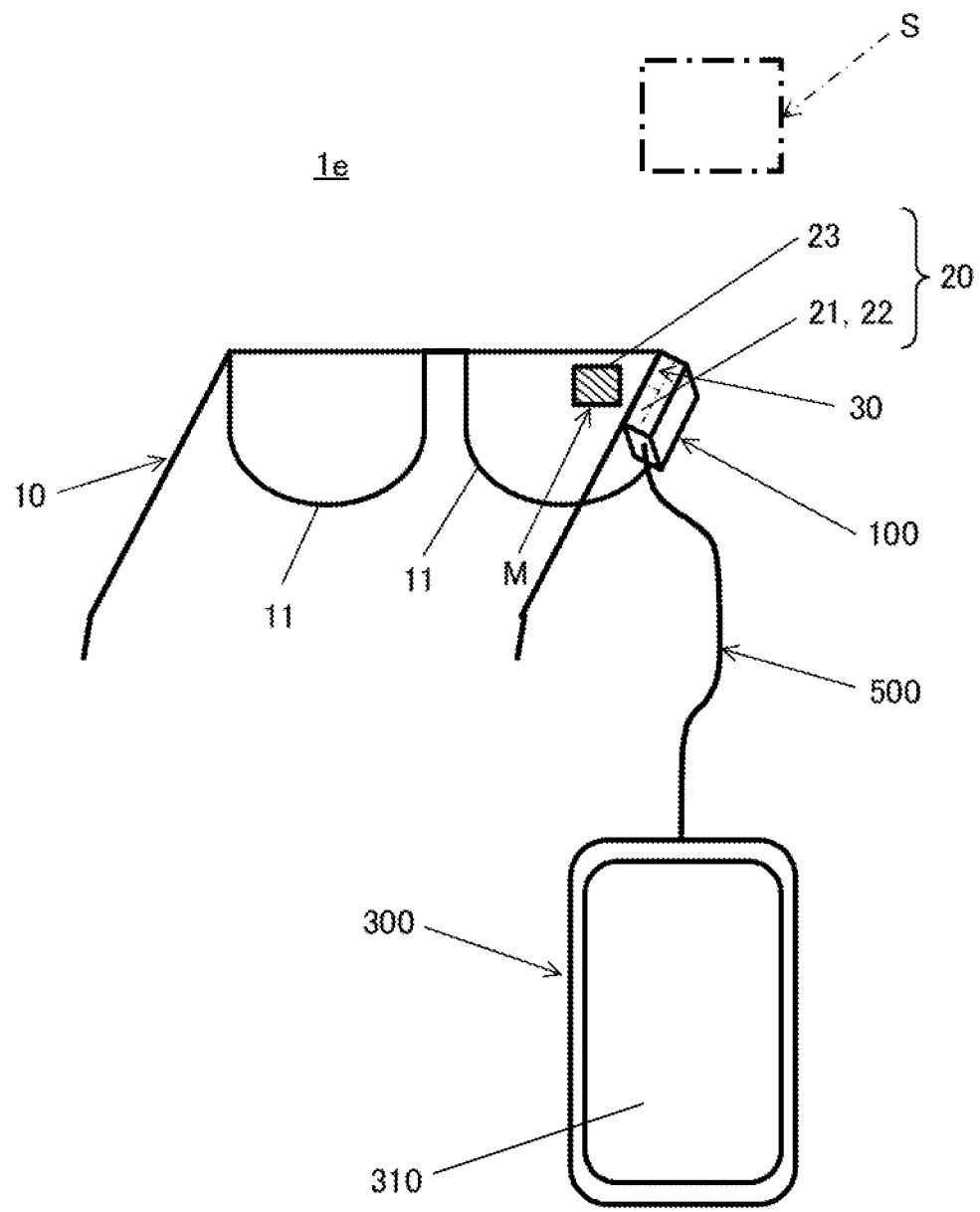
FIG. 41 is a schematic perspective view of a glasses-type terminal according to a sixth embodiment of the present invention.
Figure 42:
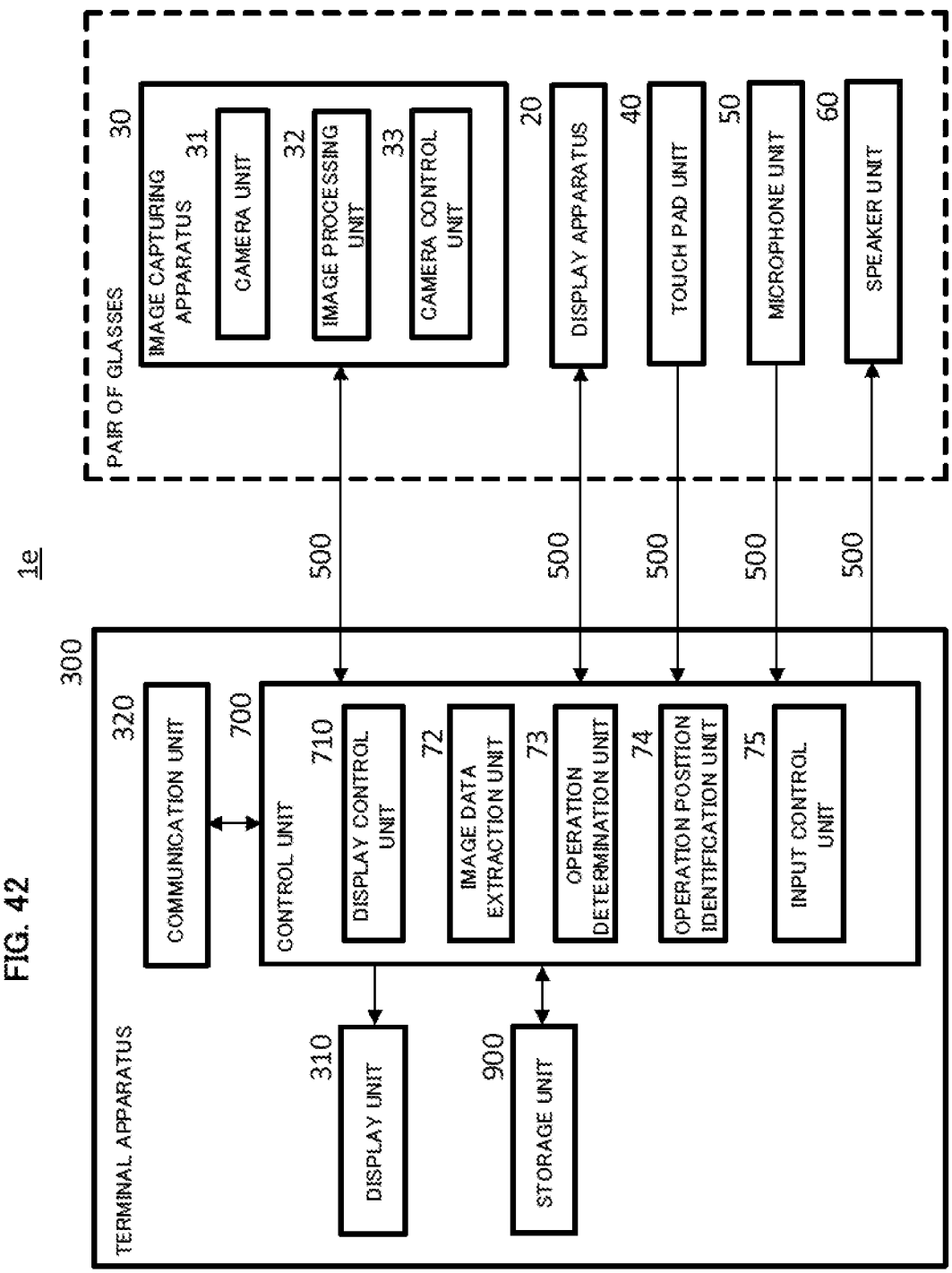
FIG. 42 is a schematic block diagram of the glasses-type terminal according to the sixth embodiment.

Next, a glasses-type terminal according to a sixth embodiment of the present invention will be described. FIG. 41 is a schematic perspective view of the glasses-type terminal according to the sixth embodiment of the present invention, and FIG. 42 is a schematic block diagram of the glasses-type terminal according to the sixth embodiment. In the sixth embodiment, the apparatuses/units having the same functions as those of the fifth embodiment described above are designated by the same reference numerals, and detailed description thereof will be omitted.

As illustrated in FIGS. 41 and 42, the glasses-type terminal 1e according to the sixth embodiment includes the main body (a pair of glasses) 10 having the lens parts 11 to which lenses are attached, the display apparatus 20 mounted on the main body 10, the image capturing apparatus 30 for capturing an image of an eye of the user, the touch pad unit 40, the microphone unit 50, the speaker unit 60, the terminal apparatus 300 being separate from the main body 10 and including the display unit 310, and a cable 500 for connecting between the display apparatus 20 and the terminal apparatus 300. In order to simplify the description of the terminal apparatus 300, parts which are closely related to the present invention will be described in detail, and the description of the other parts will be omitted.

The glasses-type terminal 1e according to the sixth embodiment mainly differs from the glasses-type terminal 1d according to the fifth embodiment in that the display apparatus 20 and the terminal apparatus 300 are connected by wire using the cable 500. The other configurations of the glasses-type terminal 1e according to the sixth embodiment are the same as those of the glasses-type terminal 1d according to the fifth embodiment.

As illustrated in FIG. 41, the display apparatus 20 includes the small projector 21, the optical system 22, and the hologram sheet 23. The small projector 21 and the optical system 22 are arranged in the housing 100, and the housing 100 is attached to a temple portion of a pair of glasses (main body 10). The housing 100 is attachable to and detachable from the pair of glasses. Further, a connection terminal (not illustrated) for connecting the cable 500 to the display apparatus 20 is provided at a predetermined position on the surface of the housing 100. In the sixth embodiment, the display apparatus 20 is controlled by the terminal apparatus 300 through wired communication using the cable 500. Further, the electric power to the display apparatus 20 is supplied from the terminal apparatus 300 via the cable 500. Therefore, in the sixth embodiment, the power supply unit and the power switch in the fifth embodiment are not provided in the housing 100. Note that, even in this case, the power supply unit may be provided in the housing 100.

As illustrated in FIG. 42, the terminal apparatus 300 includes the display unit 310, the communication unit 320, the control unit 700, the storage unit 900, and a connection terminal (not illustrated) serving as an interface. A touch panel is provided on the screen of the display unit 310. The cable 500 is connected to the connection terminal of the terminal apparatus 300. The display apparatus 20 and the terminal apparatus 300 are connected by the cable 500, and the terminal apparatus 300 can communicate with the display apparatus 20, the image capturing apparatus 30, the touch pad unit 40, the microphone unit 50, and the speaker unit 60 via the cable 500. For example, an HDMI (registered trademark) terminal may be used as the connection terminal of the terminal apparatus 300 and the connection terminal provided in the housing 100, and an HDMI (registered trademark) cable may be used as the cable 500. Further, a USB terminal may be used as the connection terminal of the terminal apparatus 300 and the connection terminal provided in the housing 100, and a USB cable may be used as the cable 500.

The storage unit 900 stores various programs, data, and the like. The storage unit 900 stores, for example, the character input processing program, the screen display processing program, image data of various original screens M, and data on each original screen M (specifically, data indicating the size, shape, content, arrangement, and the like of the original screen M). Further, similarly to the fifth embodiment described above, the storage unit 900 stores the special display apparatus control program by which the terminal apparatus 300 controls the display apparatus 20. When this display apparatus control program is executed by the control unit 700, the screen displayed on the display unit 310 is displayed not only on the display unit 310 but also on the display apparatus 20. Since the setting screen for the display apparatus control program is the same as that in the fifth embodiment described above, detailed description thereof will be omitted here.

The control unit 700 controls the entire terminal apparatus 300 and also controls the display apparatus 20, the image capturing apparatus 30, the touch pad unit 40, the microphone unit 50, and the speaker unit 60. As illustrated in FIG. 42, the control unit 700 includes the display control unit 710, the image data extraction unit 72, the operation determination unit 73, the operation position identification unit 74, and the input control unit 75. The display control unit 710 controls the display on the display unit 310 and the display apparatus 20. Specifically, when the user issues an instruction to start the display apparatus control program, the display control unit 710 executes the display apparatus control program stored in the storage unit 900 to display on the display apparatus 20 the content of the screen displayed on the display unit 310 as the content of the original screen M. This makes it possible for the user who wears the pair of glasses (main body 10) to see the visual confirmation screen S corresponding to the original screen M to be floating in midair.

Figure 43:
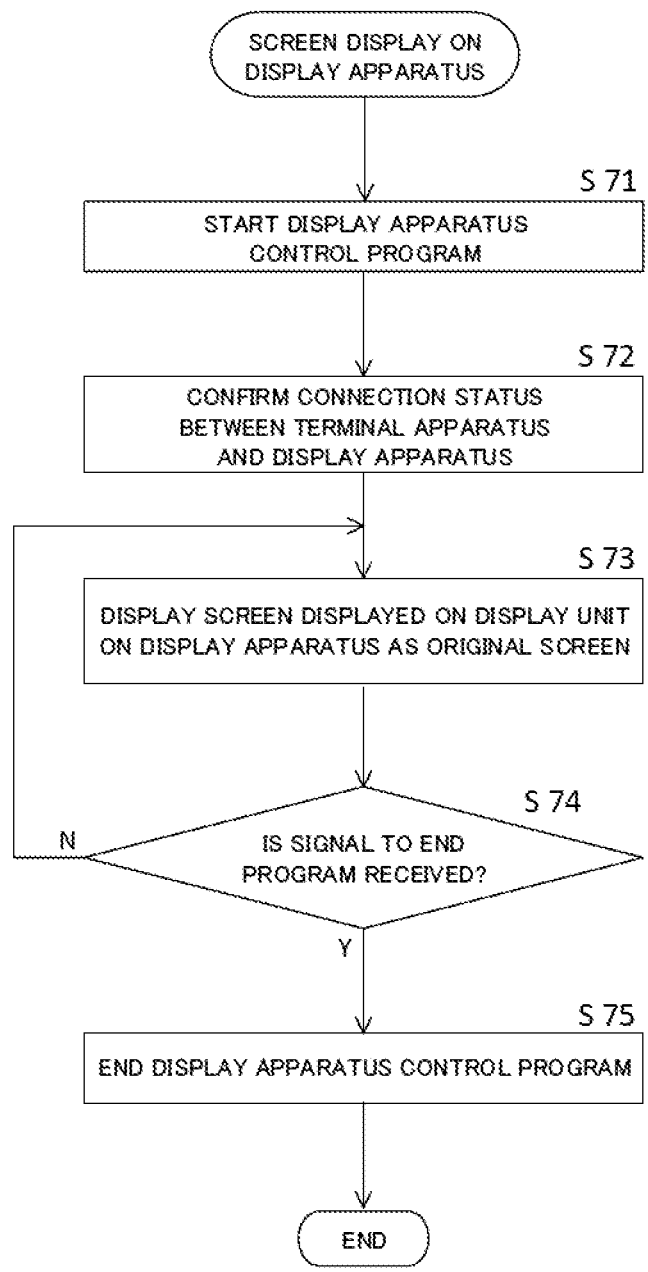
FIG. 43 is a flowchart of the procedure of a process of displaying a screen on a display apparatus in accordance with a display apparatus control program in the glasses-type terminal according to the sixth embodiment.

Next, a process of displaying a screen on the display apparatus 20 in accordance with the display apparatus control program in the glasses-type terminal 1e according to the sixth embodiment will be described. FIG. 43 is a flowchart of the procedure of the process of displaying a screen on the display apparatus 20 in accordance with the display apparatus control program in the glasses-type terminal 1e according to the sixth embodiment.

The user performs the following operations while wearing the pair of glasses (main body 10). The user first makes settings for starting power supply to the display apparatus 20 through a home screen of the terminal apparatus 300. As a result, electric power is supplied from the terminal apparatus 300 to the display apparatus 20 via the cable 500, and the display apparatus 20 is powered on. In a case where a power supply unit is provided in the housing 100, the power supply unit provided in the housing 100 covers all or part of the electric power supplied to the display apparatus 20. In that case, a power switch may be provided in the housing 100, and when the power switch is pressed, the display apparatus 20 may be powered on. Next, the user operates the terminal apparatus 300 to display a menu screen on the display unit 310. Then, the user taps the icon for the display apparatus control program on the menu screen to select the display apparatus control program. In response to receiving a signal indicating that the display apparatus control program has been selected, the control unit 700 of the terminal apparatus 300 starts the display apparatus control program (S71). When the display apparatus control program is started, the control unit 700 performs processing according to the display apparatus control program. Specifically, the control unit 700 first performs a process of confirming the connection state between the terminal apparatus 300 and the display apparatus 20 (S72). When the connection is confirmed, the control unit 700 displays the setting screen for the display apparatus control program on the display unit 310. Then, the control unit 700 transmits data on the screen currently displayed on the display unit 310 to the display apparatus 20 via the cable 500, and causes the display apparatus 20 to display the content of the screen displayed on the display unit 310 as the content of the original screen M (S73). This makes it possible for the user to feel and see the visual confirmation screen S corresponding to the original screen M through the pair of glasses (main body 10) to be floating in midair. After that, when the user operates the terminal apparatus 300 to for example select a desired application program, the control unit 700 executes the application program, displays a screen for the application program on the display unit 310, and transmits data on the screen to the display apparatus 20 via the cable 500 to cause the display apparatus 20 to display the same screen as the screen displayed on the display unit 310. As a result, the user can see the visual confirmation screen S for the screen for the application program through the pair of glasses (main body 10) to be floating in midair.

To end the screen display on the display apparatus 20, the user causes the display unit 310 of the terminal apparatus 300 to display the setting screen for the display apparatus control program, and taps the button B5 for ending the display apparatus control program, provided in the setting screen. In response to receiving a signal indicating that the display apparatus control program is to be ended (S74), the control unit 700 ends the display apparatus control program (S75). Alternatively, when the user taps the button B5 on the visual confirmation screen S (the setting screen for the display apparatus control program) with a finger, the control unit 700 may be configured to recognize that the tap operation has been performed on the button B5 and end the display apparatus control program. As a result, the control unit 700 stops transmitting the data on the screen to the display apparatus 20, and accordingly, nothing is displayed on the screen of the display apparatus 20. Finally, the user makes settings for stopping the power supply to the display apparatus 20 through the home screen of the terminal apparatus 300. As a result, the display apparatus 20 is powered off. Note that, when the user performs a tap operation on a predetermined icon in the visual confirmation screen S with a finger in the case where the icon is displayed at a predetermined position (e.g., the position of the lower corner) on the screen for the application program, the control unit 700 may recognize that the tap operation has been performed on the icon and end the display apparatus control program.

The glasses-type terminal according to the sixth embodiment has the same advantageous effects as the fifth embodiment described above. Accordingly, using the glasses-type terminal according to the sixth embodiment makes it possible for the user to easily and accurately perform character input operations and various screen operations such as enlargement and reduction by operating the visual confirmation screen in the same manner as in typical smartphone terminals or tablet terminals. Further, the main body serving as a pair of glasses is separate from the terminal apparatus including the control unit for controlling the components such as the display apparatus and the image capturing apparatus which are provided in the main body. Therefore, for example, an existing mobile terminal such as a smartphone or a tablet terminal can be used as the terminal apparatus, so that it is possible to reduce the number of parts of the main body, resulting in a simplified main body and also to improve the operability.

The configuration described in the sixth embodiment in which the main body is separate from the terminal apparatus and the terminal apparatus is connected to the components such as the display apparatus and the image capturing apparatus by wire can be applied to not only the glasses-type terminal according to the first embodiment but also the glasses-type terminals according to the other embodiments described above (second, third, and fourth embodiments).

Other Embodiments

The present invention is not limited to each of the above-described embodiments, and various modifications can be made within the scope and spirit of the invention.

For example, the glasses-type terminal according to the second embodiment may include the image conversion unit in the third embodiment. Further, the glasses-type terminal according to the second embodiment or the glasses-type terminal according to the third embodiment may include the eye presence/absence determination unit and the notification control unit in the fourth embodiment. Further, the glasses-type terminal according to the second embodiment may include the image conversion unit in the third embodiment, and the eye presence/absence determination unit and the notification control unit in the fourth embodiment.

In the fifth and sixth embodiments described above, a case has been described in which a mobile terminal such as a smartphone or a tablet terminal is used as the terminal apparatus. However, in the glasses-type terminal of the present invention, the device used as the terminal apparatus is not limited to a smartphone or a tablet terminal, and may be, for example, a smart watch, a digital audio player, a personal computer, a car navigation system, an in-vehicle AV device, or a dedicated terminal.

In the above-described embodiments, a case has been described in which the user operates the visual confirmation screen with a finger of the user. However, for example, the user may perform an operation on the visual confirmation screen with an input pointer such as a stylus or a pen. In this case, when the image capturing apparatus captures an image of the original screen and the input pointer reflected on the eye of the user, the operation determination unit determines what content of the operation is performed with the input pointer among various types of operations, based on a series of image data of images thus captured, and when the image capturing apparatus captures the image of the original screen and the input pointer reflected on the eye of the user, the operation position identification unit identifies a position on the original screen where the operation is performed with the input pointer, based on a series of image data of images thus captured.

In the above-described embodiments, when the user performs a touch operation on the visual confirmation screen with a finger, the user may put a predetermined mark to the fingertip. As the mark, a simple figure such as a circle or a quadrangle, a symbol, or the like may be used. Examples of the method of putting the mark to the fingertip include a method of drawing the mark directly on the fingertip, as well as a method of sticking a sticker with the mark to the fingertip, and a method of wearing a sack or ring with the mark to the fingertip. Specifically, as illustrated in FIGS. 9A and 10A, when a touch operation is performed with a finger on the front side of the visual confirmation screen, the mark may be put on the fingernail side. On the other hand, as illustrated in FIGS. 9B and 10B, when a touch operation is performed with a finger not only on the front side but also on the back side of the visual confirmation screen, the mark may be put on both the fingernail side of the finger and the pad side (part with the fingerprint) of the fingertip or finger. Note that, when a touch operation is performed with a finger only on the back side of the visual confirmation screen, the mark may be put only on the pad side of the fingertip or finger. In this case, the image data extraction unit extracts image data including the image of the mark as the image data including the image of the finger. Then, the operation determination unit determines what content of the operation is performed with the finger, based on the movement of the mark, and the operation position identification unit identifies the position of the mark as the position where the operation is performed with the finger. Actually, in analyzing and processing image data, it is possible to recognize marks such as simple figures more easily and accurately than to recognize the finger itself, so that the accuracy of image recognition can be improved.

In the above-described embodiments, a case has been described in which the display apparatus includes a small projector including a display device; an optical system; and a hologram sheet (or hologram film) serving as a projected unit onto which the original screen displayed on the display device of the projector is projected via the optical system, and the hologram sheet is stuck to a lens part of the main body. However, the hologram sheet may be embedded in or integrated with the lens part.

Figure 22A:
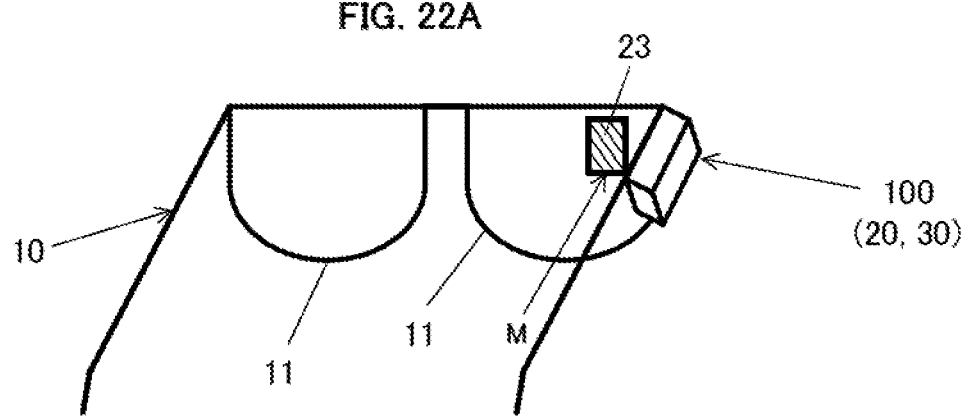
FIGS. 22A-22C illustrate examples of a hologram sheet to be stuck to a lens part of a main body of a glasses-type terminal according to the present invention.
Figure 22B:
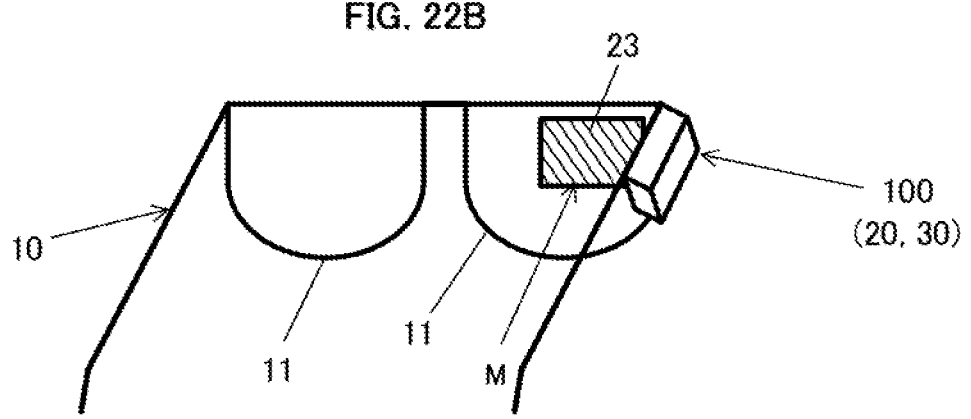
Figure 22C:
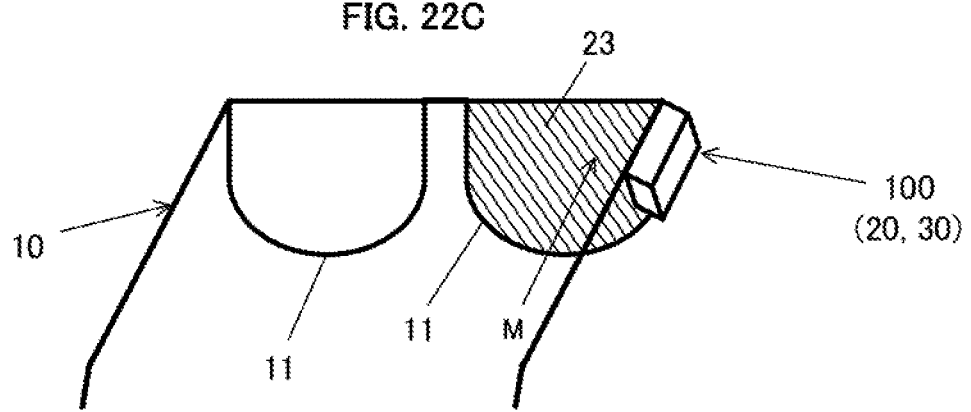

In the above-described embodiments, a case has been described in which the hologram sheet (or hologram film) used in the display apparatus has a small rectangular shape, the hologram sheet is stuck to an upper portion of the lens part on the slightly right side in a state where it is horizontally long, and an image or a video displayed on the liquid crystal panel of the small projector is projected onto the entire hologram sheet. However, the hologram sheet may be one of various types of sizes and shapes. FIG. 22 illustrates examples of a hologram sheet to be stuck to a lens part of a main body of a glasses-type terminal according to the present invention. In the example illustrated in FIG. 22A, a small rectangular hologram sheet is used, and the hologram sheet is stuck to an upper portion of the lens part on the slightly right side in a state where it is vertically long. In the example illustrated in FIG. 22B, a large rectangular hologram sheet (e.g., 1.5 cm in width and 2.5 cm in length) is used, and the hologram sheet is stuck to an upper portion of the lens part on the slightly right side in a state where it is horizontally long. Further, in the example illustrated in FIG. 22C, a hologram sheet is stuck to the entire surface of the lens part. Also in these examples, the image or video displayed on the liquid crystal panel of the small projector is projected onto the entire hologram sheet. Of course, for example, as illustrated in FIG. 22C, a hologram sheet may be stuck to the entire surface of the lens part, and the image or video may be projected onto a part of the hologram sheet.

Figure 23:
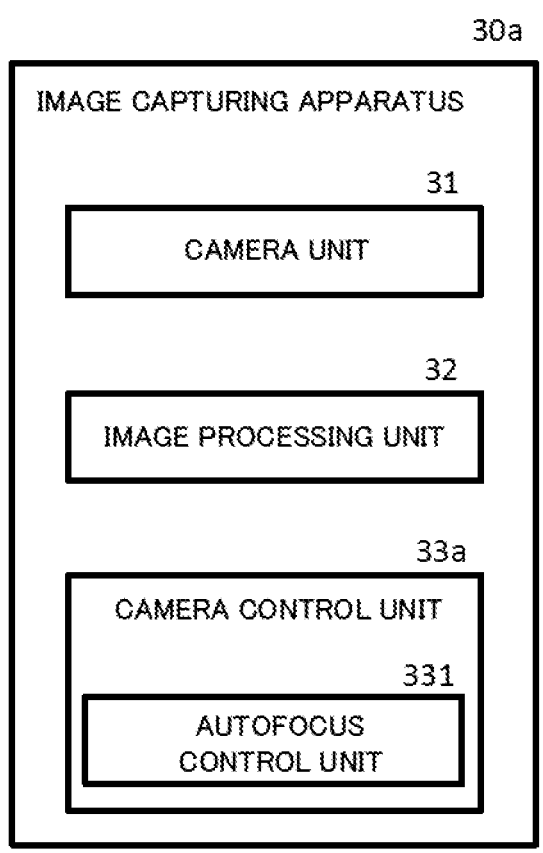
FIG. 23 is a schematic block diagram of an image capturing apparatus having an autofocus function in a glasses-type terminal according to the present invention.

In the above-described embodiments, a case has been described in which the image capturing apparatus is configured to focus on an eye of the user in advance. However, an image capturing apparatus having an autofocus function may be used. FIG. 23 is a schematic block diagram of the image capturing apparatus having an autofocus function in a glasses-type terminal according to the present invention. As illustrated in FIG. 23, the image capturing apparatus 30a having an autofocus function includes the camera unit 31, the image processing unit 32, and a camera control unit 33a. The camera unit 31 and the image processing unit 32 are the same as those in each of the above-described embodiments. The camera control unit 33a includes an autofocus control unit 331 configured to automatically focus on the eye of the user.

This autofocus control unit 331 generally controls the camera unit 31 so as to automatically focus on a subject at a predetermined position within the image capture range. With this configuration, for example, the camera unit 31 of the image capturing apparatus 30a has one focus point in the center of the image capture range. The image capturing apparatus 30a is attached to the main body 10 so that the eye of the user is positioned in the optical axis of the lens of the camera unit 31. When image capturing is started, the autofocus control unit 331 focuses on the subject, that is, the eye of the user in the focus point. Accordingly, the image capturing apparatus 30a can acquire an image in a state where the eye of the user is in focus. Further, the autofocus control unit 331 may recognize an eye, which is the subject, and automatically focus on the recognized eye. Note that the autofocus method may be an active method in which the subject is irradiated with infrared rays, ultrasonic waves, or the like and the distance from the subject is detected by the time that the reflected wave takes to return and the irradiation angle, or a passive method such as a phase difference detection method or a contrast detection method in which distance measurement is performed by using an image captured by the lens of the camera unit 31.

Further, in the above-described embodiments, a case has been described in which the operation position identification unit identifies the original screen and the finger which are included in the image based on the image data by using a general image recognition method, then retrieves the position where the finger is within the range of the identified original screen, and thus generates data representing the position where the operation is performed with the finger on the original screen. However, the operation position identification unit as used herein may perform the following processing. Specifically, the operation position identification unit may be configured such that when the image capturing apparatus captures the image of the original screen and the finger reflected on the eye of the user, the operation position identification unit obtains a range of the original screen within an image capture range that is a range in which the image capturing apparatus can capture an image and a position of the finger within the image capture range, based on a series of image data of images thus captured, and identifies the position on the original screen where the operation is performed with the finger, based on the obtained range of the original screen within the image capture range and the obtained position of the finger within the image capture range.

Figure 24A:
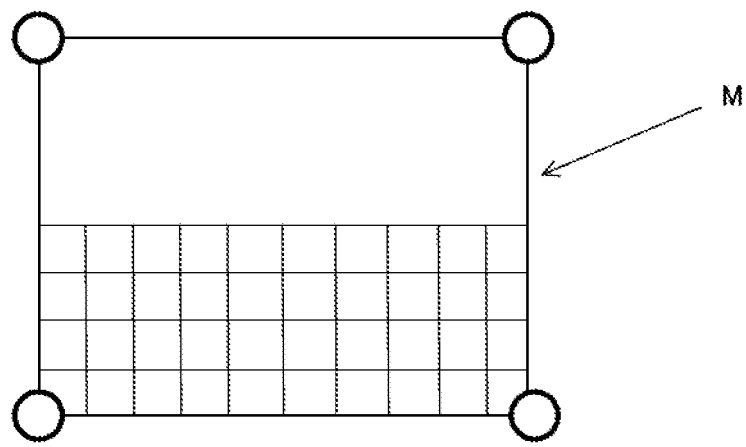
FIGS. 24A and 24B illustrate examples of an original screen which is desirable for an operation position identification unit to identify the range of the original screen.
Figure 24B:
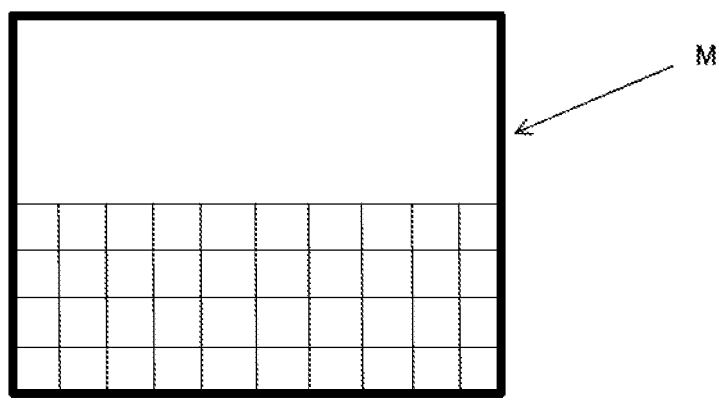

The content of the processing performed by this operation position identification unit will be described in detail. For this processing, as illustrated in FIG. 6, an XY coordinate system is set with the left-right direction as the X-axis direction and the vertical direction as the Y-axis direction within the image capture range of the image capturing apparatus. The origin of this XY coordinate system is taken at an arbitrary position. The operation position identification unit first recognizes the image of the original screen based on the image data, and acquires position data for each position of the four corners of the image of the original screen in the XY coordinate system. The acquired position data for each position of the four corners is data representing the range of the original screen within the image capture range. Examples of the original screen which is desirable for the operation position identification unit to identify the range of the original screen are now illustrated in FIG. 24. In order for the operation position identification unit to easily recognize the image on the original screen, for example, the original screen may have large circles or the like arranged in advance at the four corners as illustrated in FIG. 24A, or have a frame represented by a thick line as illustrated in FIG. 24B. Next, the operation position identification unit recognizes the finger of the user based on the image data, and acquires position data of the finger of the user in the XY coordinate system. After that, the operation position identification unit calculates position data of the finger of the user in an xy coordinate system, for example, with the lower left point of the original screen as the origin, based on the position data for each position of the four corners in the XY coordinate system and the position data of the finger of the user in the XY coordinate system. The position data of the finger of the user in the xy coordinate system thus calculated is data for identifying the position where the operation is performed with the finger on the original screen.

In the above-described embodiments, a case has been described in which the display apparatus includes a small projector including a display device; an optical system; and a hologram sheet (or hologram film) serving as a projected unit onto which the original screen displayed on the display device of the projector is projected via the optical system.

However, for example, a translucent screen or a transmissive screen may be used instead of the hologram sheet (or hologram film).

In the above-described embodiments, a case has been described in which the display apparatus includes a small projector including a display device; an optical system; and a hologram sheet (or hologram film) serving as a projected unit onto which the original screen displayed on the display device of the projector is projected via the optical system. However, for example, a hologram optical element may be used instead of the hologram sheet (or hologram film).

Figure 25A:
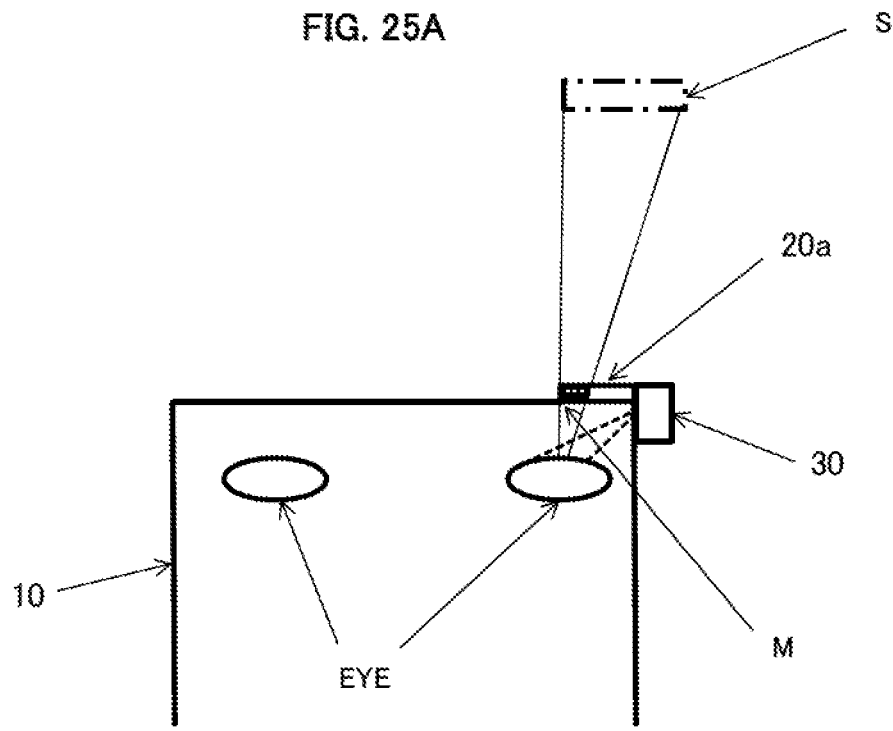
FIG. 25A is a schematic plan view of a glasses-type terminal including a display apparatus that projects an image onto a half mirror.
Figure 25B:
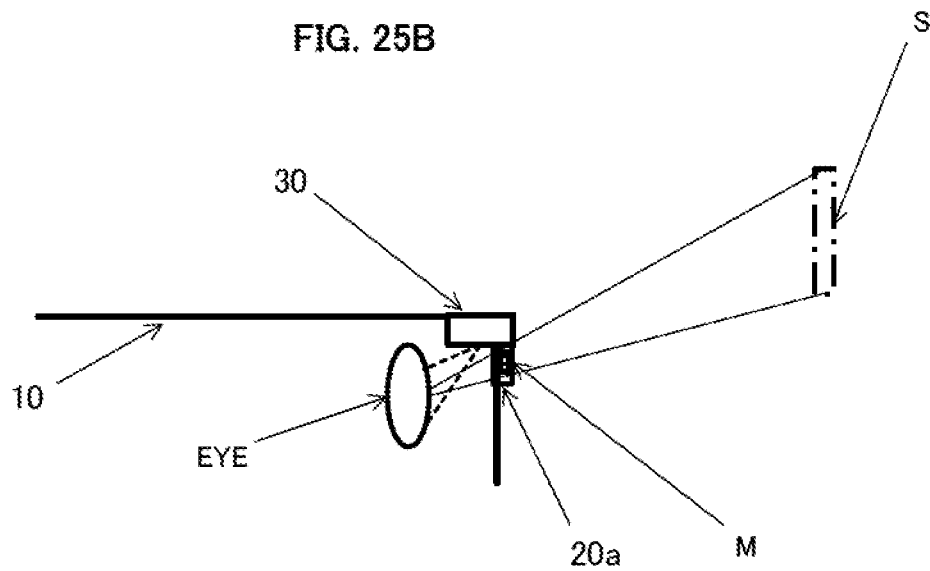
FIG. 25B is a schematic right side view of the glasses-type terminal including the display apparatus.
Figure 26:
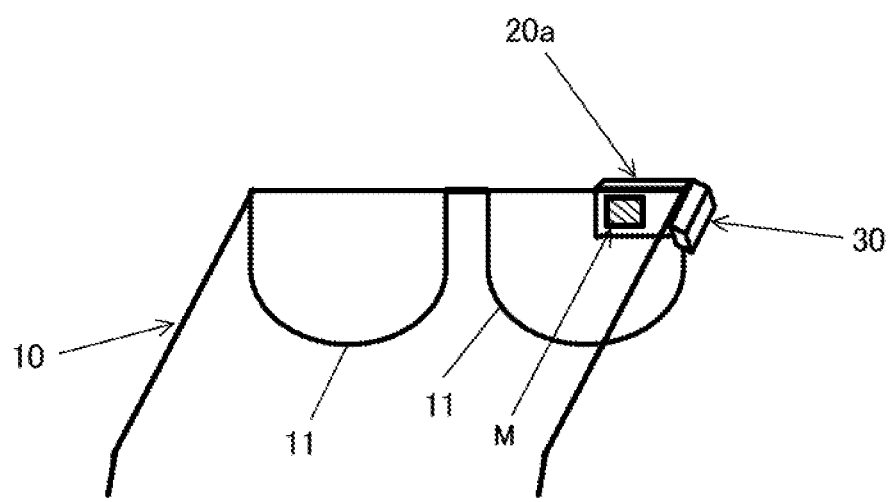
FIG. 26 is a schematic perspective view of the glasses-type terminal illustrated in FIG. 25.

In the above-described embodiments, a case has been described in which the display apparatus includes a small projector having a liquid crystal panel (display device), an optical system, and a hologram sheet (or hologram film) that reflects part of light (video). However, for example, a display apparatus that projects an image onto a half mirror may be used. FIG. 25A is a schematic plan view of a glasses-type terminal including a display apparatus that projects an image onto a half mirror, and FIG. 25B is a schematic right side view of the glasses-type terminal including the display apparatus. FIG. 26 is a schematic perspective view of the glasses-type terminal illustrated in FIG. 25. The glasses-type terminal illustrated in FIGS. 25 and 26 differs from the glasses-type terminal according to the first embodiment only in the configuration of the display apparatus, and the other configurations of the glasses-type terminal illustrated in FIGS. 25 and 26 are exactly the same as those of the glasses-type terminal according to the first embodiment. In FIGS. 25 and 26, the apparatuses/units having the same functions as those of the above-described first embodiment are designated by the same reference numerals.

A display apparatus 20a illustrated in FIGS. 25 and 26 includes a small projector including a display device, an optical system, and a half mirror serving as a projected unit onto which the original screen displayed on the display device of the small projector is projected via the optical system. With this configuration, the half mirror is embedded in a prism (optical system) located in front of the lens part 11 of the main body 10. Further, the display apparatus 20a and the image capturing apparatus 30 can each be attachable to and detachable from the main body 10. Note that the half mirror may be integrated with the prism located in front of the lens part 11 of the main body 10, or may be stuck to the prism located in front of the lens part 11 of the main body 10. Further, the half mirror may be stuck to the lens part 11 of the main body 10, or may be embedded in or integrated with the lens part 11 of the main body 10.

Figure 27A:
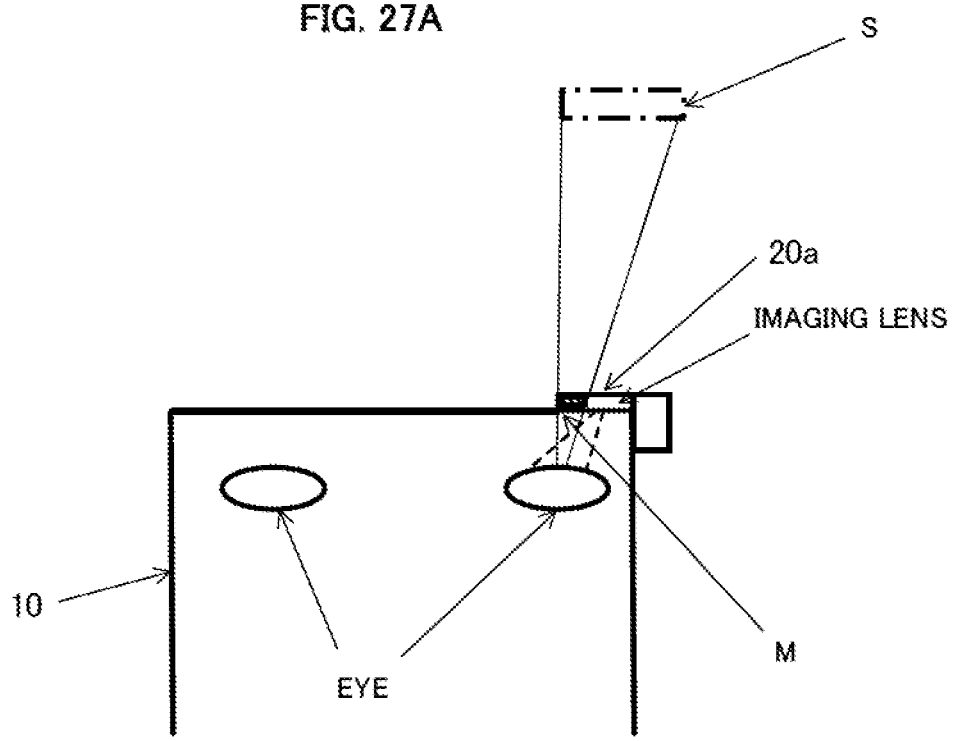
FIG. 27A is a schematic plan view of a glasses-type terminal in which an imaging lens is attached in the vicinity of a half mirror.
Figure 27B:
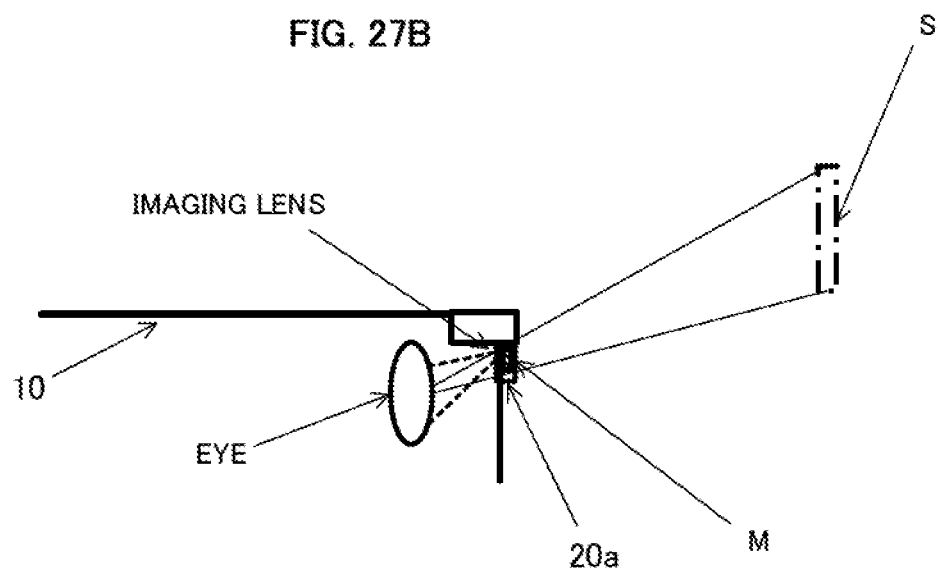
FIG. 27B is a schematic right side view of the glasses-type terminal.
Figure 28:
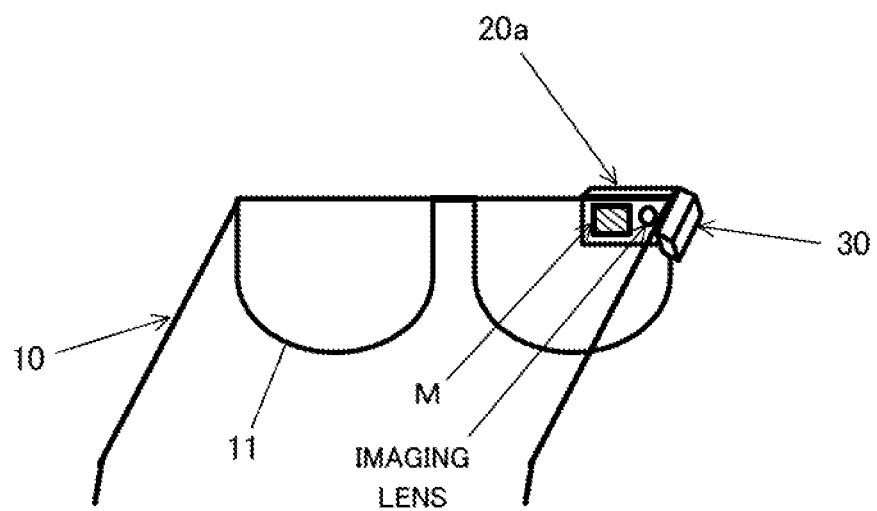
FIG. 28 is a schematic perspective view of the glasses-type terminal illustrated in FIG. 27.

Further, in a case where a display apparatus that projects an image onto a half mirror is used, an imaging lens of the image capturing apparatus 30 may be attached in the vicinity of the half mirror of the display apparatus 20a. FIG. 27A is a schematic plan view of a glasses-type terminal in which the imaging lens is attached in the vicinity of the half mirror, and FIG. 27B is a schematic right side view of the glasses-type terminal. FIG. 28 is a schematic perspective view of the glasses-type terminal illustrated in FIG. 27. This configuration makes it possible to minimize the misalignment between the direction of the optical axis of the imaging lens toward the eye of the user and the direction of the line of sight when the user looks at the original screen M. As a result, the operation position can be accurately identified on the original screen M by the operation position identification unit. Also with this configuration, the display apparatus 20a and the image capturing apparatus 30 can be attachable to and detachable from the main body 10.

Note that, in the display apparatus 20a illustrated in FIGS. 25, 26, and 27, the optical system is not limited to the prism, and may be a light guide plate or a waveguide. Further, other optical systems may be used instead of the light guide plate and the waveguide.

Further, in the display apparatus 20a illustrated in FIGS. 25, 26 and 27, for example, a translucent screen, a transmissive screen, or a hologram optical element may be used instead of the half mirror.

In the above-described embodiments, a case has been described in which the display apparatus includes a small projector having a liquid crystal panel (display device), an optical system, and a hologram sheet (or hologram film) that reflects part of light (video). However, with this configuration, the display apparatus and the image capturing apparatus may each be attachable to and detachable from the main body.

In the above-described embodiments, a case has been described in which the small projector of the display apparatus has a liquid crystal panel, but the small projector may have a display device such as an organic EL (electro-luminescence) display or an inorganic EL display instead of the liquid crystal panel.

Further, in the above-described embodiments, a case has been described in which the display apparatus includes a small projector, an optical system, a hologram sheet, or the like, but the display apparatus may be composed only of a transmissive or transparent display device without including the small projector, the optical system, and the hologram sheet. The transmissive or transparent display device is located in front of the face of the user and within the field of view of the user. The transmissive or transparent display device to be used may be, for example, a transmissive or transparent liquid crystal panel, a transmissive or transparent organic EL panel, or a transmissive or transparent inorganic EL panel. Even with this configuration, when the user looks at the original screen displayed on the transmissive or transparent display device, the user recognizes the visual confirmation screen corresponding to the original screen to be floating in midair.

Further, in the above-described embodiments, a case has been described in which the display apparatus includes a small projector, an optical system, a hologram sheet, or the like, but the display apparatus may be composed only of a non-transparent or non-transmissive display device without including the small projector, the optical system, and the hologram sheet. This type of display device is located in front of the face of the user and within the field of view of the user. The non-transparent or non-transmissive display device to be used may be, for example, a normal liquid crystal panel, an organic EL display, or an inorganic EL display.

As described above, the display apparatus and the image capturing apparatus may each be attachable to and detachable from the main body in the case where the display apparatus includes a small projector having an organic EL display, an inorganic EL display, or the like (display device), an optical system, and a hologram sheet (or hologram film) that reflects part of light (video), in the case where the display apparatus is composed of only a transmissive or transparent display device, or in the case where the display apparatus is composed of only a non-transparent or non-transmissive display device.

In the above-described embodiments, a case has been described in which a single original screen is displayed on the display apparatus, but the present invention is not limited to this, and the display apparatus may display two original screens. In this case, the user sees two visual confirmation screens as if they were floating in midair. For example, in the case where the keyboard image in the character input screen is divided into two so that the keyboard image is composed of a right keyboard image and a left keyboard image, the user recognizes the right keyboard image and the left keyboard image as if they were floating in midair, so that character input can be performed with the fingers of both hands.

Figure 29A:
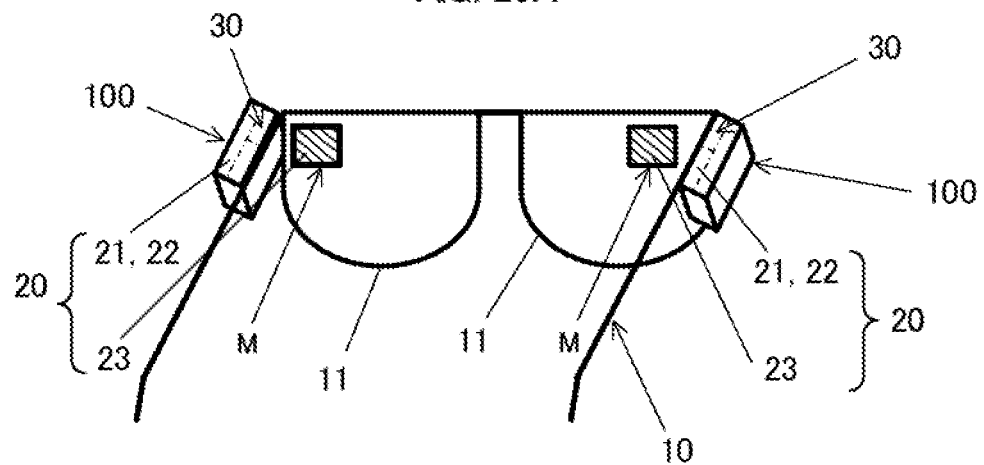
FIG. 29A is a schematic perspective view of a glasses-type terminal including two display apparatuses of a type having a hologram sheet.
Figure 29B:
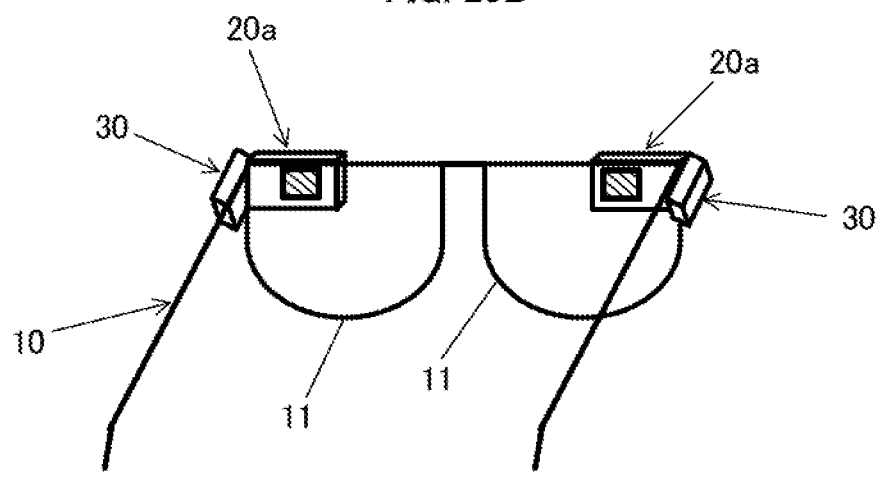
FIG. 29B is a schematic perspective view of a glasses-type terminal including two display apparatuses of a type having a half mirror.

In the above-described embodiments, a case has been described in which the glasses-type terminal of the present invention includes a single display apparatus, but the glasses-type terminal of the present invention may include two display apparatuses. FIG. 29A is a schematic perspective view of a glasses-type terminal including two display apparatuses of a type having a hologram sheet, and FIG. 29B is a schematic perspective view of a glasses-type terminal including two display apparatuses of a type having a half mirror. In FIG. 29A, the projector 21 and the optical system 22 of one display apparatus 20 are attached to the right temple of the main body 10, and the hologram sheet 23 of that display apparatus 20 is attached to the lens part 11 for the right eye. In addition, the projector 21 and the optical system 22 of the other display apparatus 20 are attached to the left temple of the main body 10, and the hologram sheet 23 of that display apparatus 20 is attached to the lens part 11 for the left eye. As used herein, each hologram sheet 23 has a small rectangular shape, and the two hologram sheets 23 are attached to an upper right portion and an upper left portion of the lens parts 11 in a state where they are horizontally long, respectively. Further, in FIG. 29B, the half mirror of one display apparatus 20a is embedded in a prism located in front of the right lens part 11 of the main body 10, and the half mirror of the other display apparatus 20a is embedded in a prism located in front of the left lens part 11 of the main body 10. In both of the glasses-type terminals illustrated in FIGS. 29A and 29B, the user recognizes the visual confirmation screen on the one display apparatus with the right eye and the visual confirmation screen on the other display apparatus with the left eye. Further, an image capturing apparatus is provided for each display apparatus, and each image capturing apparatus 30 captures an image of the corresponding eye. Note that, in the glasses-type terminal including the two display apparatuses, a touch pad unit may be divided into two pads in which one has a simple keyboard function and the other has a function of, for example, an operation panel, and the pads may be attached to the left temple and the right temple of the main body, respectively.

Figure 30A:
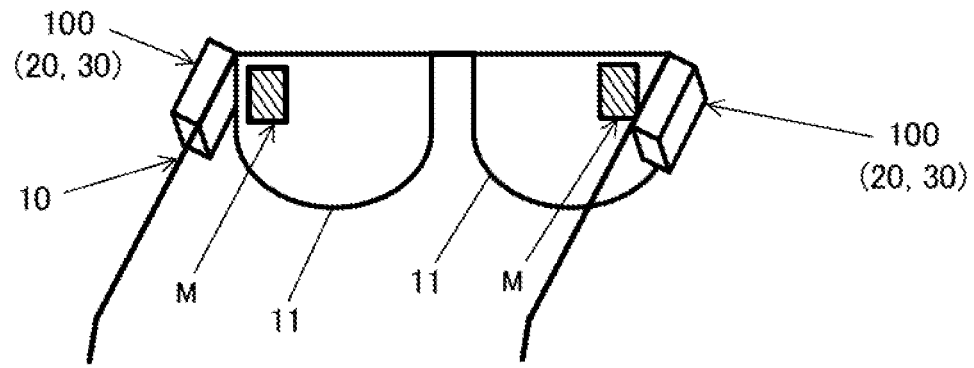
FIGS. 30A-30C illustrate examples of hologram sheets to be stuck to lens parts of a main body of a glasses-type terminal including two display apparatuses.
Figure 30B:
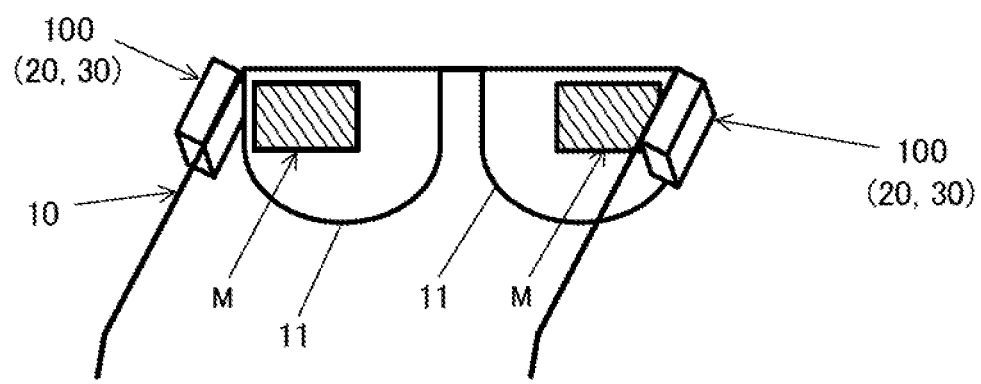
Figure 30C:
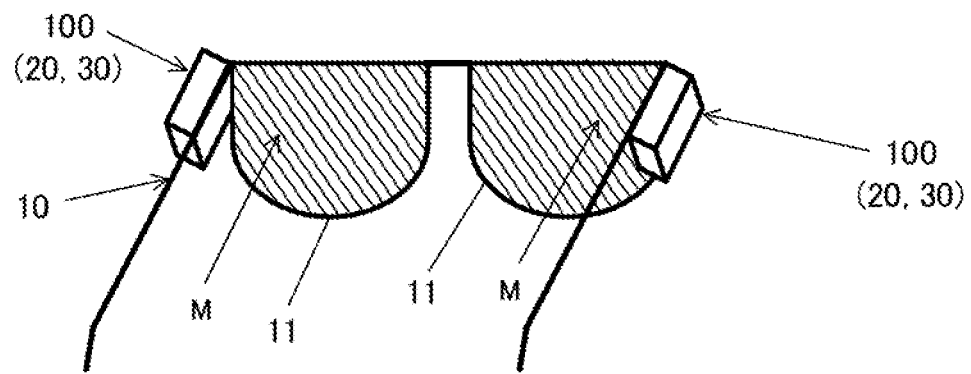

Further, in the case where the glasses-type terminal includes two display apparatuses, the hologram sheet for each display apparatus may be one of various types of sizes and shapes. FIG. 30 illustrates examples of hologram sheets to be stuck to the lens parts of the main body of a glasses-type terminal including two display apparatuses. In the example illustrated in FIG. 30A, small rectangular hologram sheets are used, and the two hologram sheets are stuck to an upper right portion of the right eye lens part and an upper left portion of the left eye lens part in a state where they are vertically long, respectively. In the example illustrated in FIG. 30B, large rectangular hologram sheets are used, and the two hologram sheets are stuck to an upper right portion of the right eye lens part and an upper left portion of the left eye lens part in a state where they are horizontally long, respectively. Further, in the example illustrated in FIG. 30C, two hologram sheets are attached to the entire surface of the right eye lens part and the entire surface of the left eye lens part, respectively.

In the above-described embodiments, a case has been described in which the glasses-type terminal includes a touch pad unit, a microphone unit, and a speaker unit. However, the glasses-type terminal does not have to include all, some, or one of the touch pad unit, the microphone unit, and the speaker unit.

Figure 31:
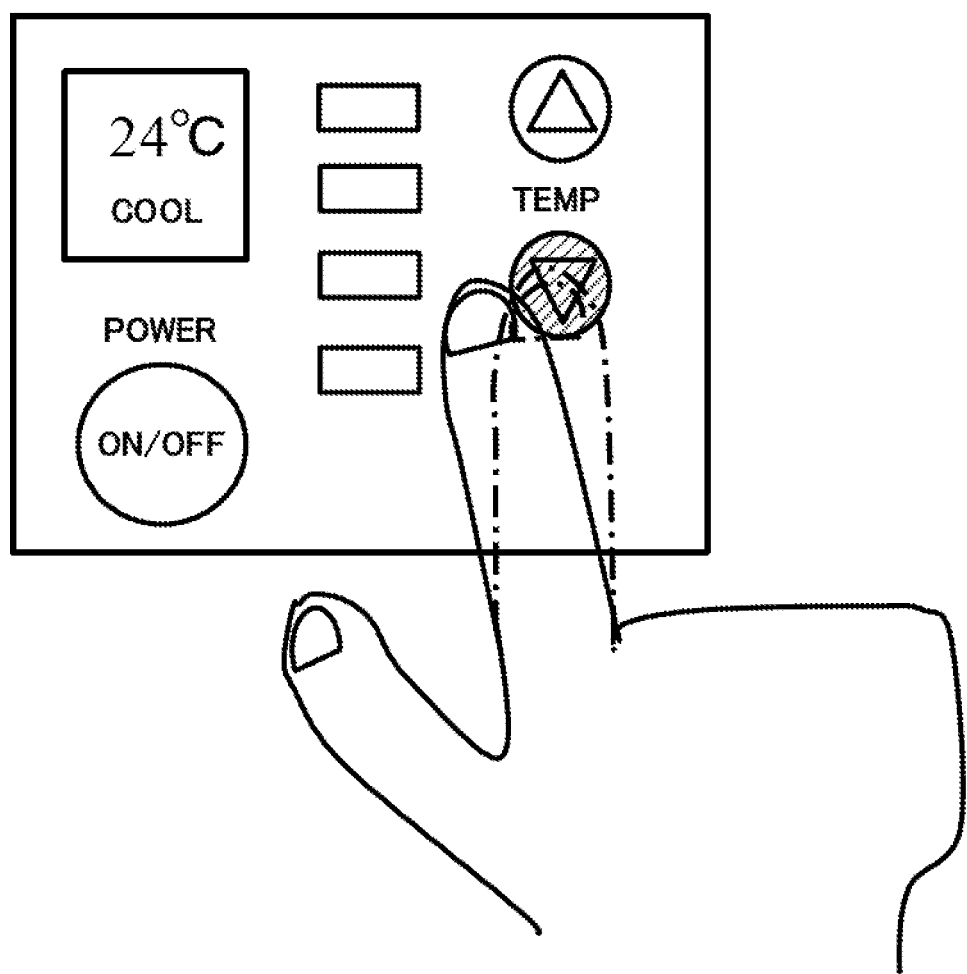
FIG. 31 is a diagram illustrating a state where a remote control screen for an air conditioner is used as an original screen and the user performs an operation on a visual confirmation screen corresponding to the remote control screen.
Figures 32A, 32B:
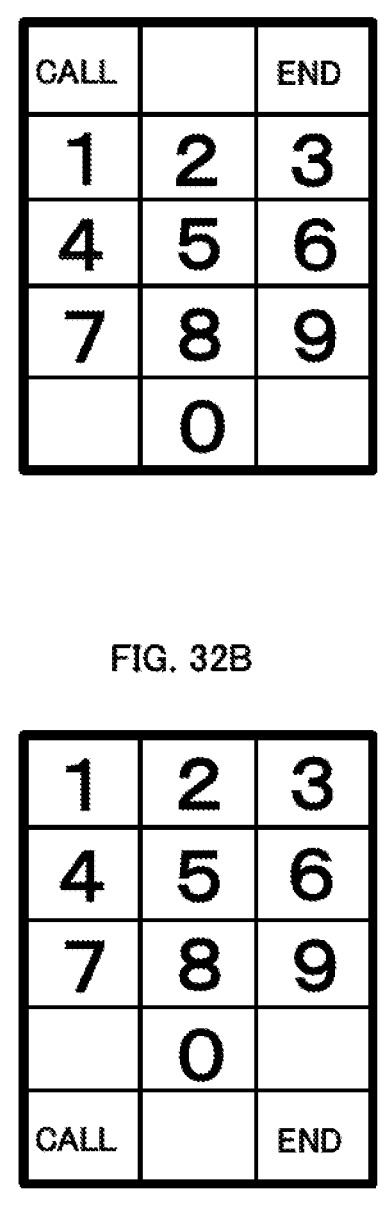

Further, in the above-described embodiments, the storage unit may store as original screens an operation screen for a mobile terminal such as a mobile phone, a smartphone, a tablet terminal, a digital audio player, or a laptop computer, an operation screen for an information terminal such as a personal computer, a remote control screen for home appliances such as a lighting, a TV set, an air conditioner, and a security system, and a control panel screen for an automobile electrical component such as a car stereo system, a car navigation system, an in-vehicle AV equipment, or a car air conditioner. In this case, when the user performs an operation by voice or through the touch pad unit to cause the display apparatus to display any one of the above-mentioned operation screens as the original screen and further performs an operation on the visual confirmation screen corresponding to the original screen with a finger, the control unit (remote control unit) generates an instruction signal (command) indicating the content of that operation, and wirelessly transmits the generated instruction signal to the above-mentioned mobile terminal or the like via the communication unit. As a result, the above-mentioned mobile terminal or the like can be operated remotely. Accordingly, the glasses-type terminal of the present invention can also be used as a remote controller for a remotely controllable device such as an air conditioner. FIG. 31 is a diagram illustrating a state in which a screen (remote control screen) corresponding to the operation unit of the remote controller for the air conditioner is used as the original screen and the user performs an operation on the visual confirmation screen corresponding to the remote control screen. As illustrated in FIG. 31, when the user performs with a finger an operation on a button to issue an instruction to lower the set temperature through the visual confirmation screen, the control unit generates a command to lower the set temperature, and transmits the command to the air conditioner via the communication unit through infrared communication, so that the user can easily lower the set temperature of the air conditioner. Further, FIG. 32 illustrates examples of the original screen of an operation screen for making a call with a mobile phone. When the user enters a desired telephone number on the visual confirmation screen corresponding to the original screen for entering the telephone number as illustrated in FIG. 32A or 32B, the control unit generates a command to call the telephone number, and transmits the command to the mobile phone via the communication unit, so that the user can make a call without holding the mobile phone by hand.

Figure 33A:
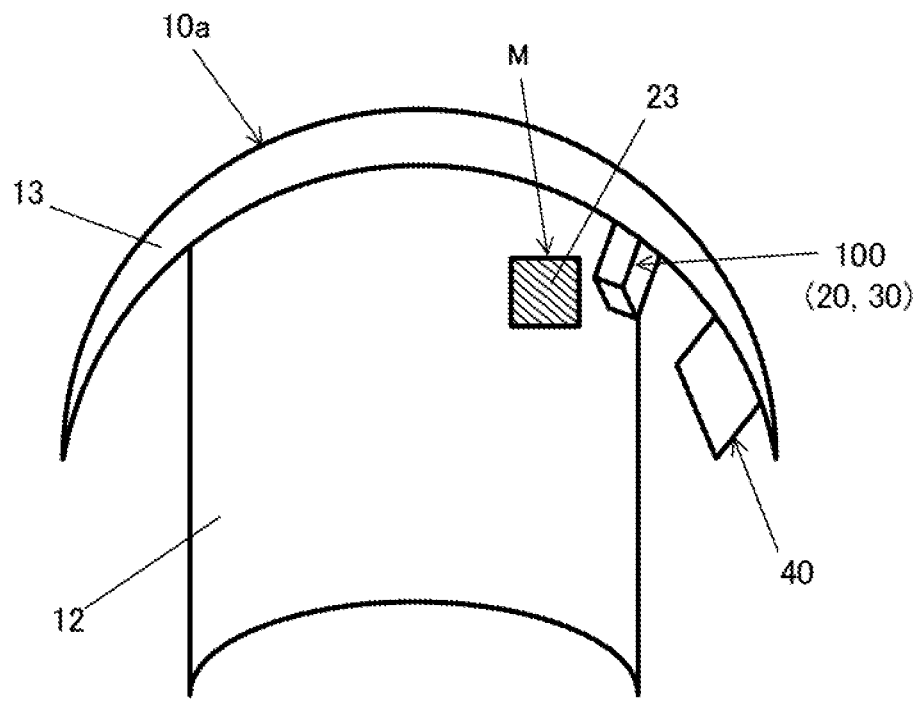
FIGS. 33A and 33B is a schematic perspective view of a glasses-type terminal whose main body is a face shield.
Figure 33B:
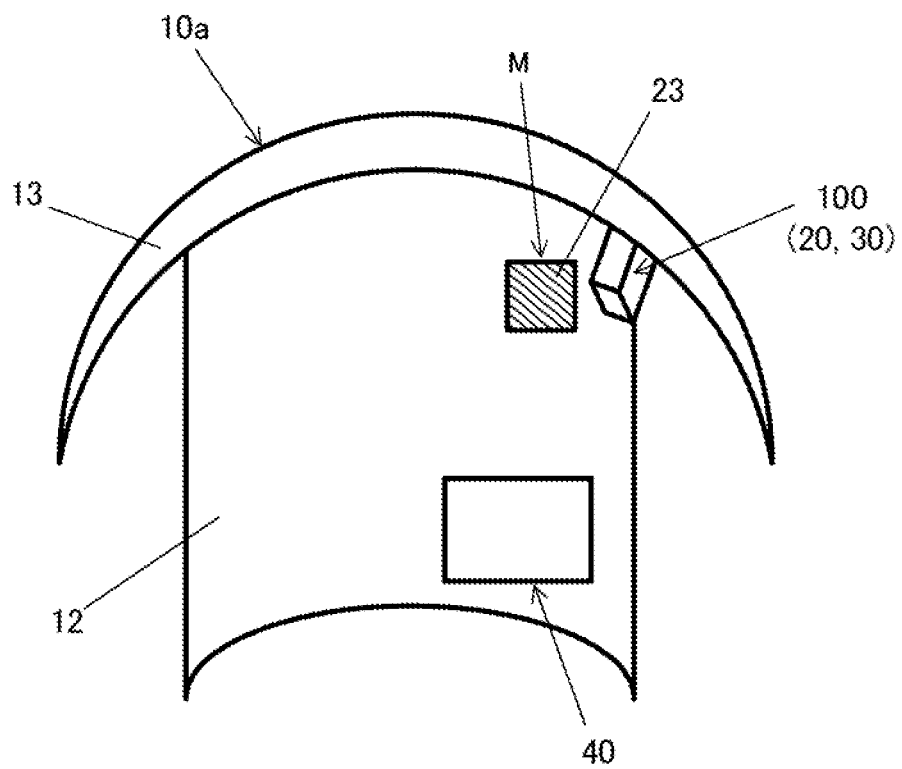

In the above-described embodiments, a case where the main body is a pair of glasses has been described, but the main body may be a face shield. FIG. 33 is schematic perspective view of a glasses-type terminal whose main body is a face shield. As illustrated in FIG. 33, the face shield serving as a main body 10a includes a transparent shield part 12 configured to cover part or all of the surface of the face of the user and a frame 13 for fixing the shield part 12. With this configuration, the hologram sheet 23 of the display apparatus is, for example, stuck to a predetermined portion of the shield part 12, or embedded in or integrated with the shield part 12. Further, the touch pad unit 40 can be attached to the frame 13 on the right side as illustrated in FIG. 33A, or can be attached to the lower right side of the shield part as illustrated in FIG. 33B.

In the fifth or sixth embodiment described above, the terminal apparatus may be used as a touch pad unit for issuing an instruction to perform various operations (e.g., pointer operation, character input, etc.) on the screen of the display apparatus. In other words, the terminal apparatus may have a touch pad function. For example, in a case where a smartphone or tablet terminal is used as the terminal apparatus, the image of a touch pad can be displayed on the display unit of the terminal apparatus so that the screen itself of the display unit can be used as the touch pad unit. FIG. 44 illustrates a state where a screen of the terminal apparatus is used as a touch pad unit in a case where a smartphone is used as the terminal apparatus in the fifth embodiment. With this configuration, the user performs an operation on the screen (touch pad unit) of the display unit 310 with a finger or an input pointer. Specifically, the terminal apparatus 300 includes a position detection unit configured to detect a touch position where a touch operation is performed on the screen of the display unit 310 and output touch position information indicating the detected touch position to the input control unit 75. Further, the storage unit 900 of the terminal apparatus 300 stores data on the image of the touch pad displayed on the display unit 310. When the original screen M is displayed on the display apparatus 20 and the image of the touch pad is displayed on the display unit 310, in response to the user performing a touch operation on the image of the touch pad, the input control unit 75 recognizes the content of the touch operation based on the touch position information transmitted from the position detection unit in response to the touch operation and data on the image of the touch pad stored in the storage unit 900, and controls the original screen M displayed on the display apparatus 20 according to the recognized content of the touch operation. Further, in a case where a personal computer is used as the terminal apparatus, the touch pad or keyboard attached to the personal computer can be used as the touch pad unit. The touch pad unit as used herein may have a mouse function, a simple keyboard function, or both a mouse function and a simple keyboard function. Further, the touch pad unit is not limited to such examples, and may have a numeric key panel, an operation panel, or the like.

In the fifth or sixth embodiment described above, the terminal apparatus may be used as a mouse for moving a cursor displayed on the screen of the display apparatus and selecting the target displayed on the screen. In other words, the terminal apparatus may have a mouse function. With this configuration, the terminal apparatus includes a movement information output unit configured to detect a movement direction of the terminal apparatus, measure a movement amount of the terminal apparatus, and output movement information indicating the detected movement direction and the measured movement amount to the input control unit. Further, the storage unit of the terminal apparatus stores data representing a correspondence between the movement information of the terminal apparatus and an operation related to a cursor displayed on the display apparatus. When the original screen is displayed on the display apparatus and the user moves the terminal apparatus, the input control unit recognizes the content of an operation related to the cursor based on the movement information of the movement transmitted from the movement information output unit and the data representing the correspondence stored in the storage unit, and controls the original screen displayed on the display apparatus according to the recognized content of the operation. For example, the data representing the above-mentioned correspondence includes correspondences in which, for example, moving the terminal apparatus in the right (left) direction of the screen of the display unit corresponds to moving the cursor in the right (left) direction; moving the terminal apparatus in the up (down) direction of the screen of the display unit corresponds to moving the cursor in the up (down) direction; slightly moving the terminal apparatus in the vertical direction of the screen of the display unit once corresponds to performing a tap operation; slightly moving the terminal apparatus in the vertical direction of the screen of the display unit twice corresponds to performing a double-tap operation; and greatly moving the terminal apparatus in the vertical direction of the screen of the display unit corresponds to performing a swipe operation. This allows the user to instruct the terminal apparatus that the cursor is to be moved in the right (left) direction by moving the terminal apparatus in the right (left) direction of the screen, and instruct the terminal apparatus that the cursor is to be moved in the up (down) direction by moving the terminal apparatus in the up (down) direction of the screen. FIG. 45 illustrates a state where the terminal apparatus is used as a mouse to instruct the movement of a cursor in a case where a smartphone is used as the terminal apparatus in the fifth embodiment. Note that, in a case where the terminal apparatus has not only the mouse function but also the above-mentioned touch pad function, the user is allowed to instruct the terminal apparatus to move the cursor by using the mouse function and instruct the terminal apparatus to perform tap operation, double tap operation, swipe operation, drag operation, or the like by using the touch pad function.

In the above-described embodiments, a case has been described in which the user wears the glasses-type terminal of the present invention on the head in the same manner as a pair of glasses. However, the glasses-type terminal of the present invention is not limited to types of terminals that are used over the ears as long as it includes the display apparatus, the image capturing apparatus, and the like. For example, the glasses-type terminal may be a type that is used over the head (e.g., the back of the head, the front of the head, or the top of the head), specifically, a headset terminal, head-mounted display (HMD) terminal, or a goggles-type terminal. In this respect, the glasses-type terminal of the present invention is, in a broad sense, a terminal worn and used by the user on the head.

INDUSTRIAL APPLICABILITY

As described above, in the glasses-type terminal according to the present invention, an image capturing apparatus is mounted on a main body and is configured to capture an image of an eye of a user to acquire an image of an original screen and a finger of the user or a specific input pointer reflected on the eye of the user when performing an operation on a visual confirmation screen with the finger or the input pointer. An operation determination unit is configured to determine what content of the operation is performed with the finger or the input pointer among the various types of operations, based on a series of image data of images captured by the image capturing apparatus. Further, an operation position identification unit is configured to identify a position on the original screen where the operation is performed with the finger or the input pointer, based on a series of image data of images captured by the image capturing apparatus. Further, an input control unit is configured to recognize a content of an input instruction corresponding to the operation performed on the visual confirmation screen with the finger or the input pointer, based on data on the content of the operation performed with the finger or the input pointer, obtained by the operation determination unit, data on the position on the original screen where the operation is performed with the finger or the input pointer, obtained by the operation position identification unit, and the data on the original screen stored in the storage unit, and control the original screen to be displayed on the display apparatus according to the recognized content of the input instruction. Accordingly, using the glasses-type terminal according to the present invention makes it possible for the user to easily and accurately perform character input operations and various screen operations such as enlargement and reduction by operating the visual confirmation screen in the same manner as in typical smartphone terminals or tablet terminals. Therefore, the present invention can be applied to any type of glasses-type terminal worn and used by a user in the same manner as a pair of glasses.

DESCRIPTION OF THE REFERENCE NUMERAL 1, 1a, 1b, 1c, 1d, 1e Glasses-type terminal
10, 10a Main body
11 Lens part
12 Shield part
13 Frame
20, 20a Display apparatus
21 Small projector
22 Optical system
23 Hologram sheet (or hologram film)
30, 30a Image capturing apparatus
31 Camera unit
32 Image processing unit
33, 33a Camera control unit
331 Autofocus control unit
40 Touch pad unit
50 Microphone unit
60 Speaker unit (notification device)
70, 70a, 70b, 70c, 700 Control unit
71,710 Display control unit
72 Image data extraction unit
73 Operation determination unit
74 Operation position identification unit
75 Input control unit
701 Iris and pupil image data generation unit
702 Image difference extraction unit
703 Image conversion unit
704 Eye presence/absence determination unit
705 Notification control unit
80 Communication unit
90,900 Storage unit
100 Housing
200 Character input screen
210 Keyboard image
220 Display area
221 Search screen
2211 Keyword input field
2212 Search result display field
300 Terminal apparatus
310 Display unit
320 Communication unit
500 Cable
M Original screen
S Visual confirmation screen

What is claimed is:

1. A glasses-type terminal comprising:
a main body worn by a user in a same manner as a pair of glasses; and
a display apparatus mounted on the main body and configured to display an original screen corresponding to a visual confirmation screen appearing to the user to be floating in midair, the glasses-type terminal being used by the user who wears the main body to perform various types of operations on the visual confirmation screen, the glasses-type terminal further comprising:
a storage unit configured to store various types of data including data on the original screen;
an image capturing apparatus mounted on the main body and configured to capture an image of an eye of the user to acquire an image of the original screen and a finger of the user or a specific input pointer reflected on the eye of the user when performing an operation on the visual confirmation screen with the finger or the input pointer;
an operation determination unit configured such that when the image capturing apparatus captures the image of the original screen and the finger or the input pointer reflected on the eye of the user, the operation determination unit determines what content of the operation is performed with the finger or the input pointer among various types of operations, based on a series of image data of images thus captured;
an operation position identification unit configured such that when the image capturing apparatus captures the image of the original screen and the finger or the input pointer reflected on the eye of the user, the operation position identification unit identifies a position on the original screen where the operation is performed with the finger or the input pointer, based on a series of image data of images thus captured; and
an input control unit configured such that when the user performs the operation on the visual confirmation screen with the finger or the input pointer, the input control unit recognizes a content of an input instruction corresponding to the operation performed on the visual confirmation screen with the finger or the input pointer, based on data on the content of the operation performed with the finger or the input pointer, obtained by the operation determination unit, data on the position on the original screen where the operation is performed with the finger or the input pointer, obtained by the operation position identification unit, and the data on the original screen stored in the storage unit, and controls the original screen to be displayed on the display apparatus according to the recognized content of the input instruction.

2. The glasses-type terminal according to claim 1, wherein
the operation position identification unit is configured such that when the image capturing apparatus captures the image of the original screen and the finger or the input pointer reflected on the eye of the user, the operation position identification unit obtains a range of the original screen within an image capture range capturable by the image capturing apparatus and a position of the finger or the input pointer within the image capture range, based on a series of image data of images thus captured, and identifies the position on the original screen where the operation is performed with the finger or the input pointer, based on the obtained range of the original screen within the image capture range and the obtained position of the finger or the input pointer within the image capture range.

3. The glasses-type terminal according to claim 1, wherein
the image capturing apparatus is configured to focus on the eye of the user in advance.

4. The glasses-type terminal according to claim 1, wherein
the image capturing apparatus includes an autofocus control unit configured to automatically focus on the eye of the user.

5. The glasses-type terminal according to claim 1, further comprising
an image data extraction unit configured to extract image data including an image of the finger or the input pointer from the series of image data captured by the image capturing apparatus, wherein
the operation determination unit is configured to determine what content of the operation is performed with the finger or the input pointer among the various types of operations, based on a series of the image data extracted by the image data extraction unit, and
the operation position identification unit is configured to identify the position on the original screen where the operation is performed with the finger or the input pointer, based on the series of the image data extracted by the image data extraction unit.

6. The glasses-type terminal according to claim 5, further comprising:
an iris and pupil image data generation unit configured such that when the image capturing apparatus captures an image of the eye of the user before the display apparatus displays the original screen, the iris and pupil image data generation unit generates image data of an iris and pupil based on image data of the captured image and stores the generated image data in the storage unit; and
an image difference extraction unit configured such that when the image capturing apparatus captures the image of the original screen and the finger or the input pointer reflected on the eye of the user, the image difference extraction unit performs a process of extracting a difference between image data of the captured image and the image data of the iris and pupil stored in the storage unit to generate image data in which an image of the iris and pupil is removed, wherein
the image data extraction unit is configured to perform a process of extracting the image data by using a series of the image data generated by the image difference extraction unit.

7. The glasses-type terminal according to claim 5, further comprising:
an iris and pupil image data generation unit configured such that when the image capturing apparatus captures an image of the eye of the user who wears a contact lens before the display apparatus displays the original screen, the iris and pupil image data generation unit generates image data of the contact lens, iris, and pupil based on image data of the captured image and stores the generated image data in the storage unit; and
an image difference extraction unit configured such that when the image capturing apparatus captures the image of the original screen and the finger or the input pointer reflected on the eye of the user, the image difference extraction unit performs a process of extracting a difference between image data of the captured image and the image data of the contact lens, iris, and pupil stored in the storage unit to generate image data in which an image of the contact lens, iris, and pupil is removed, wherein
the image data extraction unit is configured to perform a process of extracting the image data by using a series of the image data generated by the image difference extraction unit.

8. The glasses-type terminal according to claim 5, further comprising
an image conversion unit configured to perform image conversion on the image data of the images captured by the image capturing apparatus such that the image of the original screen and the finger or the input pointer reflected on the eye of the user having a spherical shape in nature becomes an image imaged on a plane, wherein
the image data extraction unit is configured to use a series of image data subjected to the image conversion by the image conversion unit to perform a process of extracting the image data.

9. The glasses-type terminal according to claim 1, further comprising:
an eye presence/absence determination unit configured to determine whether or not the image data of the image captured by the image capturing apparatus includes an image of the eye of the user to detect that image data not including the image of the eye of the user has been continuously acquired by the image capturing apparatus for a certain period of time; and
a notification control unit configured such that when the eye presence/absence determination unit detects that image data not including the image of the eye of the user has been continuously acquired by the image capturing apparatus for the certain period of time, the notification control unit controls a notification device to output sound or vibration from the notification device.

10. The glasses-type terminal according to claim 1, wherein
the original screen displayed on the display apparatus includes a screen corresponding to an operation unit for a remote controller for a remotely controllable device, and
the glasses-type terminal further comprises a remote control unit configured to cause the display apparatus to display a screen corresponding to the operation unit for the remote controller as the original screen, generate, when an operation is performed on the visual confirmation screen corresponding to the original screen, an instruction signal indicating a content of the operation, and wirelessly transmit the generated instruction signal to the remotely controllable device.

11. The glasses-type terminal according to claim 1, wherein
the display apparatus includes a projector including a display device, an optical system, and a projected unit onto which the original screen displayed on the display device is projected via the optical system, and
the projected unit is a translucent screen, a transmissive screen, a hologram sheet, a hologram film, a hologram optical element, or a half mirror.

12. The glasses-type terminal according to claim 11, wherein
the projector, the optical system, and the image capturing apparatus are attachable to and detachable from the main body.

13. The glasses-type terminal according to claim 1, wherein
the display apparatus includes a projector including a display device, an optical system, and a projected unit onto which the original screen displayed on the display device is projected via the optical system, and
the optical system is a prism, a light guide plate, or a waveguide.

14. The glasses-type terminal according to claim 1, wherein
the display apparatus is a transmissive or transparent display device, and
the display device is located in front of a face of the user and within a range of a field of view of the user.

15. The glasses-type terminal according to claim 1, wherein
the main body is a pair of glasses,
the display apparatus includes a projector including a display device, an optical system, and a hologram sheet or hologram film onto which the original screen displayed on the display device is projected via the optical system, and
the hologram sheet or hologram film is stuck to a lens part of the main body to which a lens is attached, or is embedded in or integrated with the lens part of the main body.

16. The glasses-type terminal according to claim 1, wherein
the main body is a pair of glasses,
the display apparatus includes a projector including a display device, an optical system, and a half mirror onto which the original screen displayed on the display device is projected via the optical system, and
the half mirror is embedded in or integrated with a prism located in front of a lens part of the main body to which a lens is attached, or is stuck to the prism located in front of the lens part of the main body.

17. The glasses-type terminal according to claim 1, wherein
the main body is a pair of glasses,
the display apparatus includes a projector including a display device, an optical system, and a half mirror onto which the original screen displayed on the display device is projected via the optical system, and
the half mirror is stuck to a lens part of the main body to which a lens is attached, or is embedded in or integrated with the lens part of the main body.

18. The glasses-type terminal according to claim 1, wherein
the main body is a face shield.

19. The glasses-type terminal according to claim 1, wherein
the main body is worn by the user on any site of a head of the user other than ears of the user, instead of being worn over the ears in a same manner as a pair of glasses.

20. The glasses-type terminal according to claim 1, wherein
a touch pad unit for inputting various instructions by the user performing a touch operation is attached to the main body.

21. The glasses-type terminal according to claim 1, further comprising
a terminal apparatus that is separate from the main body and is equipped with a display unit, wherein
the terminal apparatus is connected to the display apparatus by wireless or wire, and has a function of controlling the display apparatus such that a screen displayed on the display unit is displayed on the display apparatus as the original screen.

22. The glasses-type terminal according to claim 21, wherein
the terminal apparatus includes a position detection unit configured to detect a touch position where a touch operation is performed on the screen of the display unit and output touch position information indicating the detected touch position to the input control unit,
the storage unit stores data on an image of a touch pad to be displayed on the display unit, and
the input control unit is configured such that when the original screen is displayed on the display apparatus and the image of the touch pad is displayed on the display unit, in response to the user performing a touch operation on the image of the touch pad, the input control unit recognizes a content of the touch operation based on the touch position information transmitted from the position detection unit in response to the touch operation and the data on the image of the touch pad stored in the storage unit, and controls the original screen displayed on the display apparatus according to the recognized content of the touch operation.

23. The glasses-type terminal according to claim 21, wherein
the terminal apparatus includes a movement information output unit configured to detect a movement direction of the terminal apparatus, measure a movement amount of the terminal apparatus, and output movement information indicating the detected movement direction and the measured movement amount to the input control unit,
the storage unit stores data representing a correspondence between the movement information of the terminal apparatus and an operation related to a cursor displayed on the display apparatus, and
the input control unit is configured such that when the original screen is displayed on the display apparatus and the user moves the terminal apparatus, the input control unit recognizes a content of an operation related to the cursor based on the movement information of the movement transmitted from the movement information output unit and the data representing the correspondence stored in the storage unit, and controls the original screen displayed on the display apparatus according to the recognized content of the operation.

24. The glasses-type terminal according to claim 1, wherein
the display apparatus and the image capturing apparatus are attachable to and detachable from the main body.

* * * * *